United States Patent
Kobayashi

(10) Patent No.: US 8,585,924 B2
(45) Date of Patent: Nov. 19, 2013

(54) COMPOUND HAVING BICYCLO[3.3.0]OCTANE-2,6-DIYL, LIQUID CRYSTAL COMPOSITION AND LIQUID CRYSTAL DISPLAY DEVICE

(75) Inventor: Masahide Kobayashi, Ichihara (JP)

(73) Assignees: JNC Corporation, Tokyo (JP); JNC Petrochemical Corporation, Tokyo (JP)

(*) Notice: Subject to any disclaimer, the term of this patent is extended or adjusted under 35 U.S.C. 154(b) by 0 days.

(21) Appl. No.: 13/468,888

(22) Filed: May 10, 2012

(65) Prior Publication Data
US 2012/0286200 A1 Nov. 15, 2012

(30) Foreign Application Priority Data

May 12, 2011 (JP) ................................. 2011-107483
Mar. 19, 2012 (JP) ................................. 2012-061995

(51) Int. Cl.
| | |
|---|---|
| C09K 19/34 | (2006.01) |
| C09K 19/52 | (2006.01) |
| C09K 19/06 | (2006.01) |
| C09K 19/32 | (2006.01) |
| C09K 19/00 | (2006.01) |
| C07C 69/74 | (2006.01) |
| C07C 43/00 | (2006.01) |
| C07C 43/02 | (2006.01) |
| C07C 43/20 | (2006.01) |
| C07C 43/30 | (2006.01) |
| C07C 43/32 | (2006.01) |

(52) U.S. Cl.
USPC .............. 252/299.61; 252/299.01; 252/299.6; 252/299.62; 428/1.1; 560/119; 568/633; 568/634

(58) Field of Classification Search
USPC ............... 252/299.01, 299.6, 299.61, 299.62; 428/1.1; 560/119; 568/633, 634
See application file for complete search history.

(56) References Cited

FOREIGN PATENT DOCUMENTS

| | | | |
|---|---|---|---|
| CN | 1548412 | * | 11/2004 |
| CN | 1548412 A | | 11/2004 |

\* cited by examiner

*Primary Examiner* — Geraldina Visconti
(74) *Attorney, Agent, or Firm* — Hogan Lovells US LLP

(57) ABSTRACT

A liquid crystal compound having a high stability to heat, light or the like, a high clearing point, a low minimum temperature of a liquid crystal phase, a small viscosity, a suitable optical anisotropy, a large negative dielectric anisotropy, a suitable elastic constant and an excellent compatibility with other liquid crystal compounds, and a liquid crystal composition including this compound, and a liquid crystal display device containing this composition. A compound represented by formula (1-1).

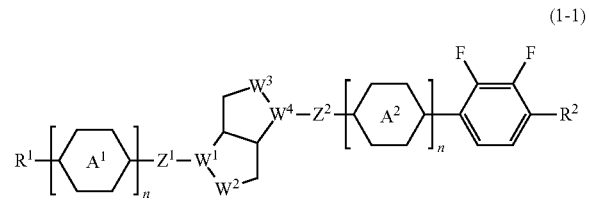

(1-1)

In the formula, for example, $R^1$ and $R^2$ are alkyl having 1 to 10 carbons or alkoxy having 1 to 9 carbons; ring $A^1$ and ring $A^2$ are 1,4-cyclohexylene, 1,4-phenylene or 2,3-difluoro-1,4-phenylene; $Z^1$ and $Z^2$ are a single bond or —$(CH_2)_2$—; >$W^1$—$W^2$— and >$W^4$—$W^3$— are >CH—$CH_2$— or >C=CH—; and m and n are 0, 1 or 2, and the sum of m and n is 1 or 2.

13 Claims, No Drawings

COMPOUND HAVING BICYCLO[3.3.0]OCTANE-2,6-DIYL, LIQUID CRYSTAL COMPOSITION AND LIQUID CRYSTAL DISPLAY DEVICE

This is a Non-Provisional application, which claims priority to Japanese Patent Application No. 2011-107483, filed on May 12, 2011 and Japanese Patent Application No. 2012-061995, filed on Mar. 19, 2012; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a liquid crystal compound, a liquid crystal composition and a liquid crystal display device. More specifically, it relates to a compound having bicyclo[3.3.0]octane-2,6-diyl and 2,3-difluoro-1,4-phenylene, a liquid crystal composition including this compound and a liquid crystal display device containing this composition.

TECHNICAL BACKGROUND

A liquid crystal display device is widely used for the display of personal computers, televisions and so forth. This device utilizes optical anisotropy, dielectric anisotropy and so forth of a liquid crystal compound. The operating modes of this liquid crystal display device are known, such as a PC (phase change) mode, a TN (twisted nematic) mode, a STN (super twisted nematic) mode, a BTN (bistable twisted nematic) mode, an ECB (electrically controlled birefringence) mode, an OCB (optically compensated bend) mode, an IPS (in-plane switching) mode, a VA (vertical alignment) mode and a PSA (polymer sustained alignment).

Among these, operating modes such as an ECB mode, an IPS mode and a VA mode utilize homeotropic orientation of liquid crystal molecules. It is known that a limited viewing angle, which is a disadvantage of a conventional display mode such as a TN mode and a STN mode, can be improved especially by means of the IPS mode and the VA mode.

A liquid crystal composition having negative dielectric anisotropy is mainly used for a liquid crystal display device operated by the IPS mode or the VA mode. It is desirable that a liquid crystal compound included in this composition should have physical properties shown in the following items (1) to (8), in order to further improve the characteristics of the liquid crystal display device.

(1) a high stability to heat, light or the like,
(2) a high clearing point,
(3) a low minimum temperature of a liquid crystal phase,
(4) a small viscosity (η),
(5) a suitable optical anisotropy (Δn),
(6) a large negative dielectric anisotropy (Δ∈),
(7) a suitable elastic constant ($K_{33}$: bend elastic constant), and
(8) an excellent compatibility with other liquid crystal compounds.

The effect of the physical properties of the liquid crystal compound on the characteristics of the device is as follows. A compound having a high stability to heat, light or the like, as described item (1), increases the voltage holding ratio of the device, as a result of which the service life of the device is increased. A compound having a high clearing point, as described in items (2), increases the temperature range in which the device can be used. A compound having a low minimum temperature of a liquid crystal phase such as a nematic phase and a smectic phase, especially of a nematic phase, as described in item (3), also increases the temperature range in which the device can be used. A compound having a small viscosity, as described in item (4), decreases the response time of the device.

A compound having a suitable optical anisotropy, as described in item (5), improves the contrast of the device. A compound having a large optical anisotropy or a small optical anisotropy, that is to say a suitable optical anisotropy, is necessary according to the design of the device. A compound having a large optical anisotropy is suitable when the response time is decreased by decreasing the cell gap of the device. A compound having a large negative dielectric anisotropy, as described in item (6), decreases the threshold voltage of the device, as a result of which the electric power consumption of the device is decreased.

In regard to the item (7), a compound having a large elastic constant decreases the response time of the device. A compound having a small elastic constant decreases the threshold voltage of the device. Thus, a suitable elastic constant is necessary according to the characteristics that should be improved. A compound having an excellent compatibility with other liquid crystal compounds is desirable as described in item (8). This is because the physical properties of the composition are adjusted by mixing liquid crystal compounds having different physical properties.

A variety of liquid crystal compounds having a large dielectric anisotropy have been prepared until now. This is because excellent physical properties which are not possessed by conventional compounds are expected. This is because a new compound is expected to possess a suitable balance between two physical properties which are required for the preparation of a liquid crystal composition. The compound (A) having bicyclo[3.3.0]octane-2,6-diyl has been reported (Patent document No. 1). This compound has positive dielectric anisotropy. However, a compound having bicyclo[3.3.0]octane-3,7-diyl and negative dielectric anisotropy is not known. In view of the circumstances, some new compounds are expected to have excellent properties.

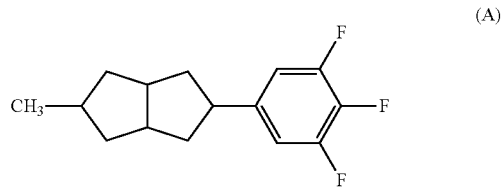

(A)

Patent Document

Patent document No. 1: CN 1548412 A.

SUMMARY OF THE INVENTION

Subject to be Solved by the Invention

The first subject of the invention is to provide a liquid crystal compound having a high stability to heat, light or the like, a high clearing point, a low minimum temperature of a liquid crystal phase, a small viscosity, a suitable optical anisotropy, a large negative dielectric anisotropy, a suitable elastic constant, an excellent compatibility with other liquid crystal compounds. The subject is to provide a compound having an especially large negative dielectric anisotropy. The subject is to provide a compound having an especially excellent compatibility. The second subject is to provide a liquid crystal composition including this compound and having a high maximum temperature of a nematic phase, a low minimum temperature of a nematic phase, a small viscosity, a suitable optical anisotropy, a large negative dielectric anisotropy and a suitable elastic constant. The subject is to provide a liquid crystal composition having a suitable balance regarding at least two of the physical properties. The third subject is to provide a liquid crystal display device containing this composition and having a wide temperature range in which the device can be used, a short response time, a large voltage holding ratio, a large contrast ratio and a long service life.

Means for Solving the Subject

The invention concerns a compound represented by formula (1-1), a liquid crystal composition including this compound, and a liquid crystal display device containing this composition.

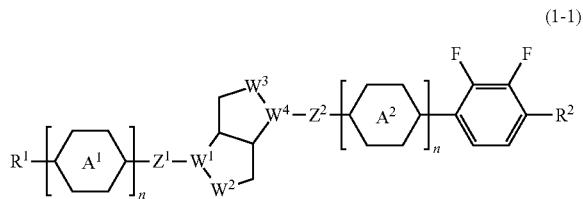

(1-1)

In formula (1-1),
$R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
ring $A^1$ and ring $A^2$ are independently 1,4-cyclohexylene, 1,4-cyclohexenylene, 1,4-phenylene, 2-fluoro-1,4-phenylene or 2,3-difluoro-1,4-phenylene;
$Z^1$ and $Z^2$ are independently a single bond, —(CH$_2$)$_2$—, —CH$_2$O—, —OCH$_2$—, —COO— or —OCO—;
>W$^1$—W$^2$— and >W$^4$—W$^3$— are independently >CH—CH$_2$— or >C=CH—; and
m and n are independently 0, 1 or 2, and the sum of m and n is 1 or 2.

Effect of the Invention

The first advantage of the invention is to provide a liquid crystal compound having a high stability to heat, light or the like, a high clearing point, a low minimum temperature of a liquid crystal phase, a small viscosity, a suitable optical anisotropy, a large negative dielectric anisotropy, a suitable elastic constant, an excellent compatibility with other liquid crystal compounds. The advantage is to provide a compound having an especially large negative dielectric anisotropy. The advantage is to provide a compound having an especially excellent compatibility. The second advantage is to provide a liquid crystal composition including this compound and having a high maximum temperature of a nematic phase, a low minimum temperature of a nematic phase, a small viscosity, a suitable optical anisotropy, a large negative dielectric anisotropy and a suitable elastic constant. The advantage is to provide a liquid crystal composition having a suitable balance regarding at least two of the physical properties. The third advantage is to provide a liquid crystal display device containing this composition and having a wide temperature range in which the device can be used, a short response time, a large voltage holding ratio, a large contrast ratio and a long service life.

EMBODIMENTS TO CARRY OUT THE INVENTION

Usage of the terms in this specification is as follows. A liquid crystal compound is a generic term for a compound having a liquid crystal phase such as a nematic phase or a smectic phase, and also for a compound having no liquid crystal phases but useful as a component of a liquid crystal composition. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. A clearing point is the transition temperature between a liquid crystal phase and an isotropic phase in a liquid crystal compound. The minimum temperature of a liquid crystal phase is the transition temperature between solids and a liquid crystal phase (a smectic phase, a nematic phase and so forth) in a liquid crystal compound. The maximum temperature of a nematic phase is the transition temperature between a nematic phase and an isotropic phase in a liquid crystal composition, and may be abbreviated to the maximum temperature. The minimum temperature of a nematic phase may be abbreviated to the minimum temperature. A compound represented by formula (1-1) may be abbreviated to the compound (1-1). This abbreviation may apply to a compound represented by formula (2) or the like. In formula (1-1), formula (2) and so forth, the symbol $A^1$, $D^1$ or the like surrounded by a hexagonal shape corresponds to ring $A^1$, ring $D^1$ or the like, respectively. A plurality of $R^1$ were described in the same or different formulas. Two groups represented by arbitrary two of $R^1$ may be the same or different in these compounds. The same rule applies to symbols such as ring $A^1$ and $Z^1$. The amount of a compound, which is expressed as a percentage, means a weight percentage (% by weight) based on the total weight of the composition.

The expression "at least one of 'A' may be replaced by 'B'" means that the position of one 'A' is arbitrary when the number of 'A' is one, and that the positions of 'A' can also be selected without restriction when the numbers of 'A' is two or more. The expression "at least one of A may be replaced by B, C or D" includes cases where arbitrary A has been replaced by B, and arbitrary A has been replaced by C, and arbitrary A has been replaced by D, and also cases where a plurality of A are replaced by at least two of B, C and/or D. For example, "alkyl in which at least one of —CH$_2$— may be replaced by —O— or —CH=CH—" includes alkyl, alkenyl, alkoxy, alkoxyalkyl, alkoxyalkenyl and alkenyloxyalkyl. Incidentally, it is undesirable that two successive —CH$_2$— should be replaced by —O— to give —O—O—. It is also undesirable that —CH$_2$— of a methyl moiety (—CH$_2$—H) in alkyl and so forth should be replaced by —O— to give —O—H.

2-Fluoro-1,4-phenylene means the following two divalent groups. Fluorine may be facing left or facing right. The rule applies to an asymmetric divalent group such as tetrahydropyran-2,5-diyl.

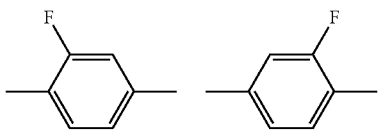

The invention includes the contents described in the following items 1 to 14.

Item 1. A compound represented by formula (1-1).

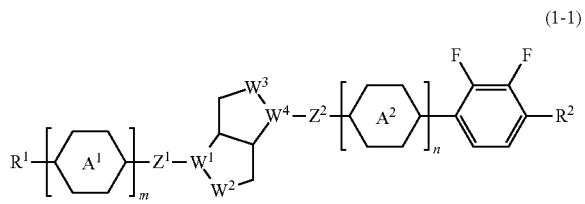

In formula (1-1), $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; ring $A^1$ and ring $A^2$ are independently 1,4-cyclohexylene, 1,4-cyclohexenylene, 1,4-phenylene, 2-fluoro-1,4-phenylene or 2,3-difluoro-1,4-phenylene; $Z^2$ and $Z^2$ are independently a single bond, —(CH$_2$)$_2$—, —CH$_2$O—, —OCH$_2$—, —COO— or —OCO—; >W$^1$—W$^2$— and >W$^4$—W$^3$— are independently >CH—CH$_2$— or >C=CH—; and m and n are independently 0, 1 or 2, and the sum of m and n is 1 or 2.

Item 2. The compound according to item 1, wherein the compound is represented by formula (1-2).

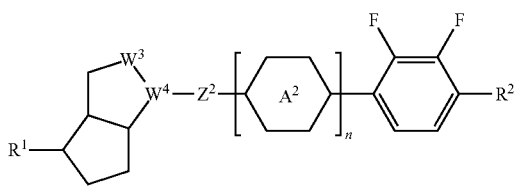

In formula (1-2), $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; ring $A^2$ is 1,4-cyclohexylene, 1,4-cyclohexenylene, 1,4-phenylene, 2-fluoro-1,4-phenylene or 2,3-difluoro-1,4-phenylene; $Z^2$ is a single bond, —(CH$_2$)$_2$—, —CH$_2$O—, —OCH$_2$—, —COO— or —OCO—; >W$^4$—W$^3$— is >CH—CH$_2$— or >C=CH—; and n is 0 or 1.

Item 3. The compound according to item 2, wherein in formula (1-2) according to item 2, $Z^2$ is a single bond.

Item 4. The compound according to item 2, wherein the compound is represented by formula (1-3).

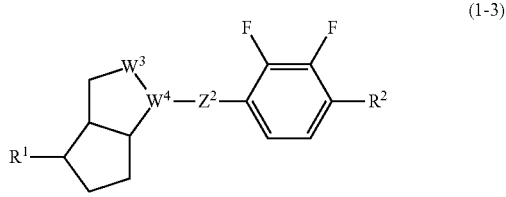

In formula (1-3), $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; $Z^2$ is a single bond, —(CH$_2$)$_2$—, —CH$_2$O—, —OCH$_2$—, —COO— or —OCO—; and >W$^4$—W$^3$— is >CH—CH$_2$— or >C=CH—.

Item 5. The compound according to item 2, wherein the compound is represented by formula (1-4).

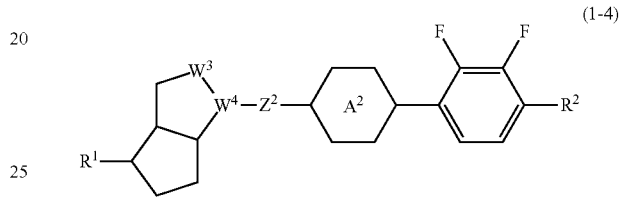

In formula (1-4), $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; ring $A^2$ is 1,4-cyclohexylene, 1,4-cyclohexenylene, 1,4-phenylene or 2,3-difluoro-1,4-phenylene; $Z^2$ is a single bond, —(CH$_2$)$_2$—, —CH$_2$O—, —OCH$_2$—, —COO— or —OCO—; and >W$^4$—W$^3$— is >CH—CH$_2$— or >C=CH—.

Item 6. The compound according to item 1, wherein the compound is represented by formula (1-5).

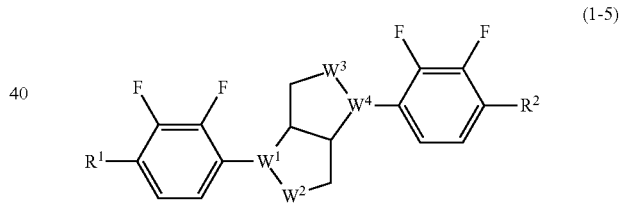

In formula (1-5), $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and >W$^1$—W$^2$— and >W$^4$—W$^3$— are independently >CH—CH$_2$— or >C=CH—.

Item 7. Use of at least one compound according to any one of items 1 to 6, as a component of a liquid crystal composition.

Item 8. A liquid crystal composition including at least one of compounds according to any one of items 1 to 6.

Item 9. The liquid crystal composition according to item 8, further including at least one compound selected from the group of compounds represented by formulas (2) to (7).

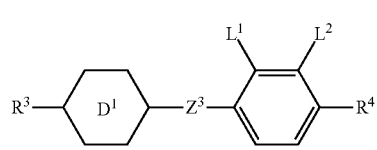

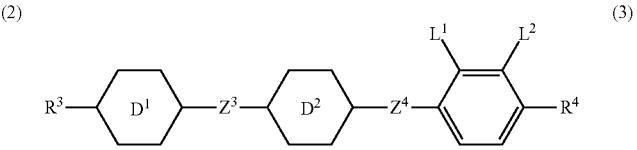

-continued (4)
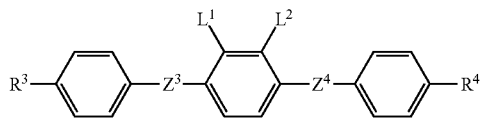

(5)
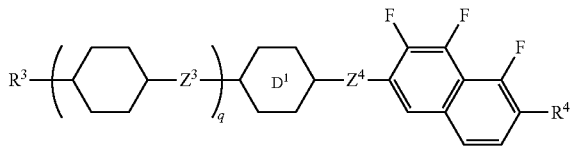

(6)
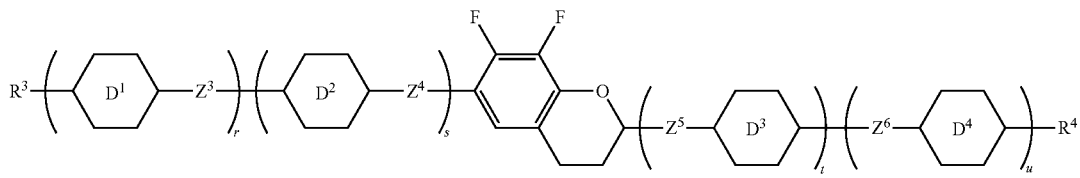

(7)
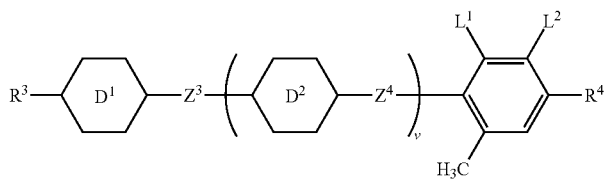

In formulas (2) to (7), $R^3$ and $R^4$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—; ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl; $Z^3$, $Z^4$, $Z^5$ and $Z^6$ are independently a single bond, —$(CH_2)_2$—, —OCO—, —$CH_2O$—, —$OCF_2$— or —$OCF_2(CH_2)_2$—; $L^1$ and $L^2$ are independently fluorine or chlorine; and q, r, s, t, u and v are independently 0 or 1, and the sum of r, s, t and u is 1 or 2.

Item 10. The liquid crystal composition according to item 8, further including at least one compound selected from the group of compounds represented by formulas (8) to (10).

(8)
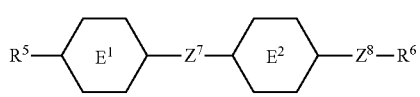

(9)
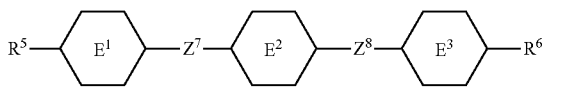

(10)
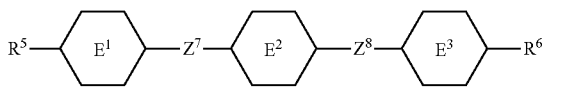

In formulas (8) to (10), $R^5$ and $R^6$ are independently alkyl having 1 to 10 carbons or alkenyl having 2 to 10 carbons, and in the alkyl and the alkenyl, at least one of —$CH_2$— may be replaced by —O—; ring $E^1$, ring $E^2$ and ring $E^3$ are independently 1,4-cyclohexylene, 1,4-phenylene, 2-fluoro-1,4-phenylene, 2,5-difluoro-1,4-phenylene or pyrimidine-2,5-diyl; and $Z^7$ and $Z^8$ are independently a single bond, —$(CH_2)_2$—, —CH=CH—, —C≡C— or —COO—.

Item 11. The liquid crystal composition according to item 9, further including at least one compound selected from the group of compounds represented by formulas (8) to (10) according to item 10.

Item 12. The liquid crystal composition according to any one of items 8 to 11, further including at least one optically active compound and/or at least one polymerizable compound.

Item 13. The liquid crystal composition according to any one of items 8 to 12, further including at least one antioxidant and/or at least one ultraviolet light absorber.

Item 14. A liquid crystal display device containing the liquid crystal composition according to any one of items 8 to 13.

The compound, the liquid crystal composition and the liquid crystal display device of the invention will be explained in this order.

1-1. The Compound (1-1)

The compound (1-1) of the invention will be explained. Desirable examples of the terminal group, the ring structure, the bonding group and so forth of the compound (1-1) and the effects of these groups on the physical properties are applied to the sub-formulas of the compound (1-1).

(1-1)
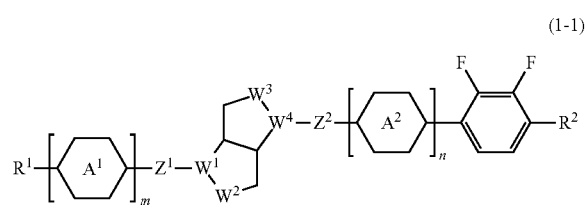

In formula (1-1), $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons. These groups area straight-chain or a branched chain, and do not include a cyclic group such as cyclohexyl. In the groups, a straight chain is preferable to a branched chain.

Desirable examples of $R^1$ or $R^2$ are alkyl, alkoxy, alkoxyalkyl and alkenyl. More desirable examples of $R^1$ or $R^2$ are alkyl, alkoxy or alkenyl.

Examples of the alkyl are —$CH_3$, —$C_2H_5$, —$C_3H_7$, —$C_4H_9$, —$O_5H_{11}$, —$C_6H_{13}$ and —$C_7H_{15}$. Examples of the alkoxy are —$OCH_3$, —$OC_2H_5$, —$OC_3H_7$, —$OC_4H_9$, —$OC_5H_{11}$ and —$OC_6H_{13}$. Examples of the alkoxyalkyl are —$CH_2OCH_3$, —$CH_2OC_2H_5$, —$CH_2OC_3H_7$, —$(CH_2)_2OCH_3$, —$(CH_2)_2OC_2H_5$, —$(CH_2)_2OC_3H_7$, —$(CH_2)_3OCH_3$, —$(CH_2)_4OCH_3$ and —$(CH_2)_5OCH_3$. Examples of the alkenyl are —CH=$CH_2$, —CH=$CHCH_3$, —$CH_2$CH=$CH_2$, —CH=$CHC_2H_5$, —$CH_2$CH=$CHCH_3$, —$(CH_2)_2$CH=$CH_2$, —CH=$CHC_3H_7$, —$CH_2$CH=$CHC_2H_5$, —$(CH_2)_2$CH=$CHCH_3$ and —$(CH_2)_3$CH=$CH_2$. Examples of the alkenyloxy are —$OCH_2$CH=$CH_2$, —$OCH_2$CH=$CHCH_3$ and —$OCH_2$CH=$CHC_2H_5$.

Desirable examples of $R^1$ or $R^2$ are —$CH_3$, —$C_3H_5$, —$C_3H_7$, —$C_4H_9$, —$C_5H_{11}$, —$OCH_3$, —$OC_2H_5$, —$OC_3H_7$, —$OC_4H_9$, —$OC_5H_{11}$, —$CH_2OCH_3$, —$(CH_2)_2OCH_3$, —$(CH_2)_3OCH_3$, —$CH_2$CH=$CH_2$, —$CH_2$CH=$CHCH_3$, —$(CH_2)_2$CH=$CH_2$, —$CH_2$CH=$CHC_2H_5$, —$(CH_2)_2$CH=$CHCH_3$, —$(CH_2)_3$CH=$CH_2$, —$(CH_2)_3$CH=$CHCH_3$, —$(CH_2)_3$CH=$CHC_2H_5$, —$(CH_2)_3$CH=$CHC_3H_7$, —$OCH_2$CH=$CH_2$, —$OCH_2$CH=$CHCH_3$ and —$OCH_2$CH=$CHC_2H_5$. More desirable examples of $R^1$ or $R^2$ are —$CH_3$, —$C_2H_5$, —$C_3H_7$, —$OCH_3$, —$OC_2H_5$, —$OC_3H_7$, —$OC_4H_9$, —$(CH_2)_2$CH=$CH_2$, —$(CH_2)_2$CH=$CHCH_3$ and —$(CH_2)_2$CH=$CHC_3H_7$.

When $R^1$ or $R^2$ is a straight chain, the temperature range of a liquid crystal phase is wide and the viscosity is small. When $R^1$ or $R^2$ is a branched chain, the compatibility with other liquid crystal compounds is excellent. A compound in which $R^1$ is optically active is useful as a chiral dopant. A reverse twisted domain which will occur in a liquid crystal display device can be prevented by the addition of this compound to a composition. A compound in which $R^1$ is not optically active is useful as a component of a composition.

A desirable configuration of —CH=CH— in the alkenyl depends on the position of the double bond. The trans-configuration is preferable in the alkenyl having the double bond in the odd position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. The cis-configuration is preferable in the alkenyl having the double bond in the even position, such as —$CH_2$CH=$CHCH_3$, —$CH_2$CH=$CHC_2H_5$ and —$CH_2$CH=$CHC_3H_7$. An alkenyl compound having a desirable configuration has a wide temperature range of a liquid crystal phase, a small viscosity and a large elastic constant ($K_{33}$: bend elastic constant).

In formula (1-1), ring $A^1$ and ring $A^2$ are independently 1,4-cyclohexylene, 1,4-cyclohexenylene, 1,4-phenylene or 2,3-difluoro-1,4-phenylene.

Desirable examples of ring $A^1$ or ring $A^2$ are 1,4-cyclohexylene and 1,4-phenylene. There are cis and trans configurations concerning 1,4-cyclohexylene. The trans configuration is preferable in view of a high maximum temperature. A more desirable example of ring $A^1$ or ring $A^2$ is 1,4-phenylene.

The viscosity is small when at least one of ring $A^1$ and ring $A^2$ is 1,4-cyclohexylene. The viscosity of a composition can be decreased by the addition of the compound. The dielectric anisotropy is large negatively when at least one of ring $A^1$ and ring $A^2$ is 2,3-difluoro-1,4-phenylene. The dielectric anisotropy of a composition can be increased negatively by the addition of the compound.

In formula (1-1), $Z^2$ and $Z^2$ are independently a single bond, —$(CH_2)_2$—, —$CH_2O$—, —$OCH_2$—, —COO— or —OCO—.

A compound where $Z^2$ or $Z^2$ is —COO— or —OCO— is desirable since the maximum temperature is high. A compound where $Z^2$ or $Z^2$ is —$CH_2O$— or —$OCH_2$— is desirable, since the dielectric anisotropy is large negatively. A compound where $Z^2$ or $Z^2$ is a single bond or —$(CH_2)_2$— is desirable, since the viscosity is small.

A single bond, —$(CH_2)_2$—, —$CH_2O$— or —$OCH_2$— is desirable in consideration of the stability of the compound, and a single bond or —$(CH_2)_2$— is more desirable. It is desirable that one of $Z^2$ and $Z^2$ should be a single bond in consideration of a high clearing point of the compound, when the other is —$(CH_2)_2$—, —$CH_2O$—, —$OCH_2$—, —COO— or —OCO—. It is more desirable that both of $Z^2$ and $Z^2$ should be a single bond.

In formula (1-1), >$W^1$—$W^2$— and >$W^4$—$W^3$— are independently >CH—$CH_2$— or >C=CH—. That is to say that the compound (1-1) has the following four structures.

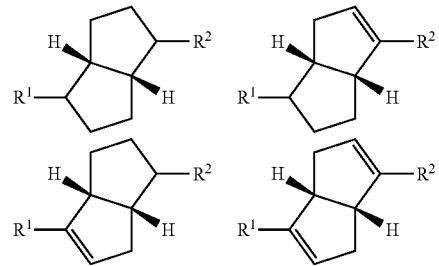

The position number of a bicyclo[3.3.0]octane ring is shown in the following (a).

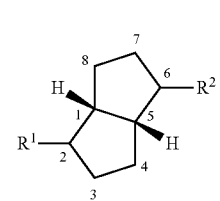

(a)

There are cis and trans configurations concerning bicyclo [3.3.0]octane-2,6-diyl. It is desirable that 2- and 6-positions should be a trans configuration, and it is desirable that 1- and 5-positions (bridgehead part) should be a cis configuration, in view of a high maximum temperature when added to a composition. A desirable example of the isomer includes the compound (b).

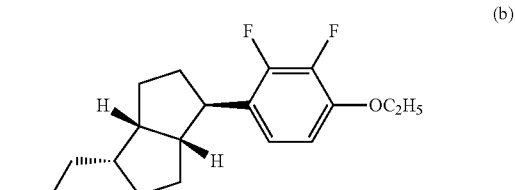

(b)

The optical anisotropy is large when both >$W^1$—$W^2$— and >$W^4$—$W^3$— are >C=CH—. The optical anisotropy of a composition can be increased by the addition of the compound. It is desirable that both >$W^1$—$W^2$— and >$W^4$—$W^3$— should be >$CH$—$CH_2$— in consideration of the stability of the compound.

In formula (1-1), m and n are independently 0, 1 or 2, and the sum of m and n is 1 or 2. The viscosity is small when the sum of n and m is 1. The maximum temperature is high when the sum of n and m is 2.

The compound (1-1) has bicyclo[3.3.0]octane-2,6-diyl and 1,4-phenylene in which hydrogens in the 2- and 3-positions have been replaced by fluorines. It has a suitable optical anisotropy, a large negative dielectric anisotropy, a suitable elastic constant by the effect of such a structure. The compound has an excellent compatibility by the effect of bicyclo[3.3.0]octane-2,6-diyl. The compound is especially excellent in view of a large negative dielectric anisotropy and an excellent compatibility.

As described above, a compound having objective physical properties can be obtained by a suitable selection of the kinds of terminal groups, ring structures, bonding groups and so forth. The compound (1-1) may also contain isotopes such as $^2H$ (deuterium) and $^{13}C$ in a larger amount than the amount of the natural abundance, since there are no major differences in physical properties of the compound.

1-2. Desirable Compounds

Desirable examples of the compound (1-1) include the compound (1-2) described in item 2, the compound (1-3) described in item 4, the compound (1-4) described in item 5 and the compound (1-5) described in item 6.

The compounds (1-2) to (1-4) have bicyclo[3.3.0]octane-2,6-diyl and 2,3-difluoro-1,4-phenylene, and their structures are asymmetric. Accordingly, these compounds are more desirable in view of a high stability to heat, light or the like, a low minimum temperature of a liquid crystal phase, a high maximum temperature, a large negative dielectric anisotropy and a suitable elastic constant. The compound (1-2) where $Z^2$ is a single bond is further desirable in view of a high maximum temperature.

The compound (1-5) is more desirable in view of a high stability to heat, a low minimum temperature of a liquid crystal phase, a large optical anisotropy, a large negative dielectric anisotropy and a suitable elastic constant, since it has bicyclo[3.3.0]octane-2,6-diyl and 2,3-difluoro-1,4-phenylene.

A composition including the compound (1-1), especially the compounds (1-2) to (1-5), has a high maximum temperature, a low minimum temperature, a small viscosity, a suitable optical anisotropy, a large negative dielectric anisotropy and a suitable elastic constant. The composition is stable under conditions in which a liquid crystal display device is usually used, and the compound does not deposit its crystals (or its smectic phase) even when the composition is kept in storage at a low temperature. Accordingly, the compound (1-1) can suitably utilized for a liquid crystal composition that is used for a liquid crystal display device having a driving mode such as IPS, VA or PSA.

1-3. Preparation of the Compound (1-1)

The method for synthesizing the compound (1-1) will be explained. The compound (1-1) can be prepared by a suitable combination of methods in synthetic organic chemistry. Methods of introducing objective terminal groups, rings and bonding groups into starting materials are described in books such as "Organic Syntheses" (John Wiley & Sons, Inc.), "Organic Reactions" (John Wiley & Sons, Inc.), "Comprehensive Organic Synthesis" (Pergamon Press) and "Shin Jikken Kagaku Kouza" (New Experimental Chemistry Course, in English; Maruzen Co., Ltd., Japan).

1-3-1. Formation of the Bonding Group

Examples of the formation of the bonding group in the compound (1-1) are shown in the following schemes. In these schemes, $MSG^1$ (or $MSG^2$) is a monovalent organic group having at least one ring. Monovalent organic groups represented by a plurality of the $MSG^1$ (or $MSG^2$) may be the same or different. The compounds (1A) to (1D) correspond to the compound (1-1).

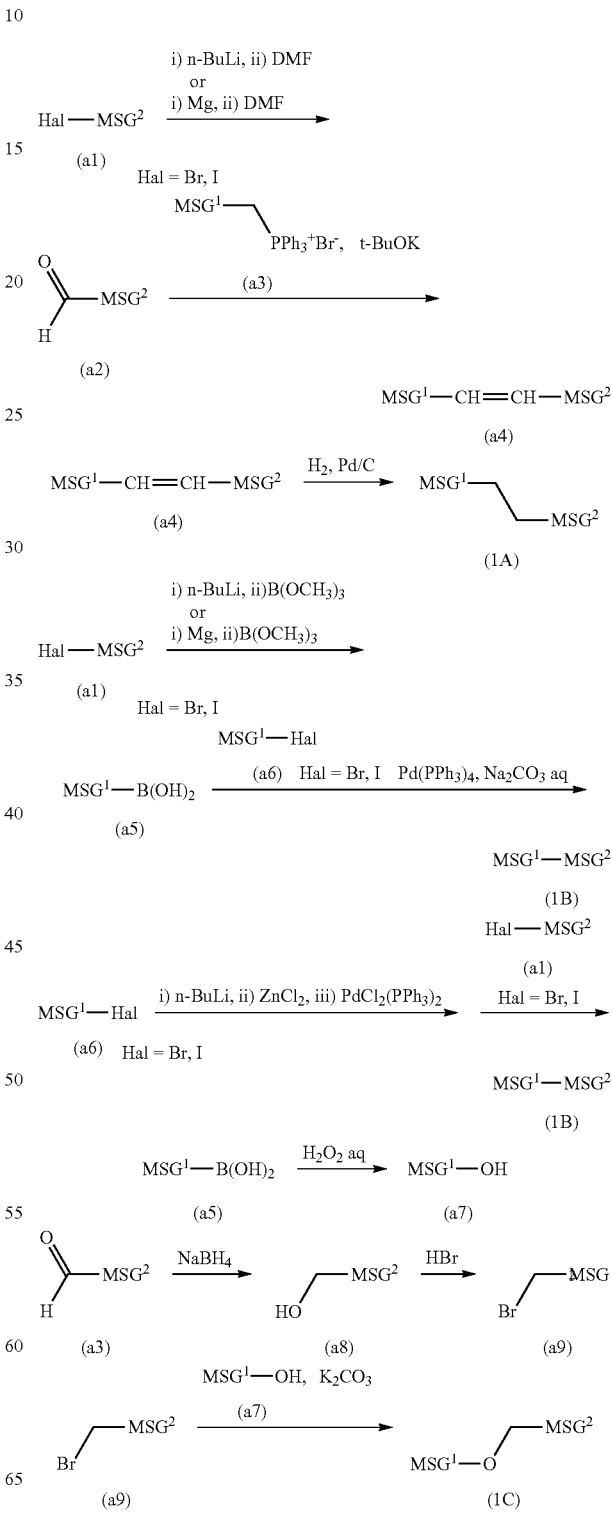

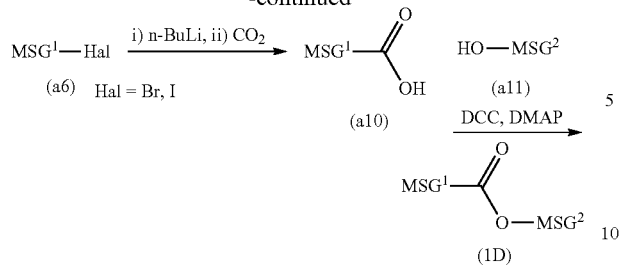

(1) Formation of —(CH$_2$)$_2$—

The organohalogen compound (a1) is allowed to react with butyllithium (or magnesium) to give an intermediate, which is reacted with a formamide such as N,N-dimethylformamide (DMF), giving the aldehyde (a2). The aldehyde (a2) is allowed to react with a phosphorus ylide that is prepared by the treatment of the phosphonium salt (a3) with a base such as potassium tert-butoxide to give the compound (a4) having a double bond. The compound (1A) is prepared by the hydrogenation of the compound (a4) in the presence of a catalyst such as palladium on carbon (Pd/C).

(2) Formation of a Single Bond

The organohalogen compound (a1) is allowed to react with magnesium (or butyllithium) to give the Grignard reagent (or lithium salt). The reaction of the Grignard reagent (or lithium salt) with a boric acid ester such as trimethyl borate, and then the hydrolysis of the product in the presence of an acid such as hydrochloric acid gives the dihydroxyborane (a5). The compound (1B) is prepared by the reaction of the compound (a5) with the organohalogen compound (a6) in an aqueous solution of a carbonate in the presence of a tetrakis(triphenylphosphine)palladium (Pd(PPh$_3$)$_4$) catalyst.

The following method is also available. The organohalogen compound (a6) is allowed to react with butyllithium, and then with zinc chloride. The reaction of the resulting intermediate with the compound (a1) in the presence of bistriphenylphosphinedichloropalladium (Pd(PPh$_3$)$_2$Cl$_2$) gives the compound (1B).

(3) Formation of —CH$_2$O— or —OCH$_2$—

The oxidation of the dihydroxyborane (a5) with an oxidizing agent such as hydrogen peroxide gives the alcohol (a7). In another run, the aldehyde (a3) is reduced with a reducing agent such as sodium borohydride to give the alcohol (a8). The halogenation of the alcohol (a8) with hydrobromic acid or the like gives the halides (a9). The compound (1C) is prepared by the reaction of the halides (a9) with the alcohol (a7) prepared previously in the presence of potassium carbonate or the like.

(4) Formation of —COO— or —OCO—

The compound (a6) is allowed to react with n-butyllithium, and then with carbon dioxide to give the carboxylic acid (a10). The dehydration of the carboxylic acid (a10) and the phenol (a11) in the presence of DCC (1,3-dicyclohexylcarbodiimide) and DMAP (4-dimethylaminopyridine) gives the compound (1D) having —COO—. The compound having —OCO— is also prepared by this method.

1-3-2. Synthetic Example

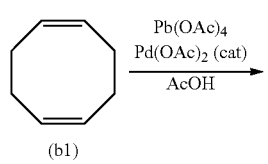

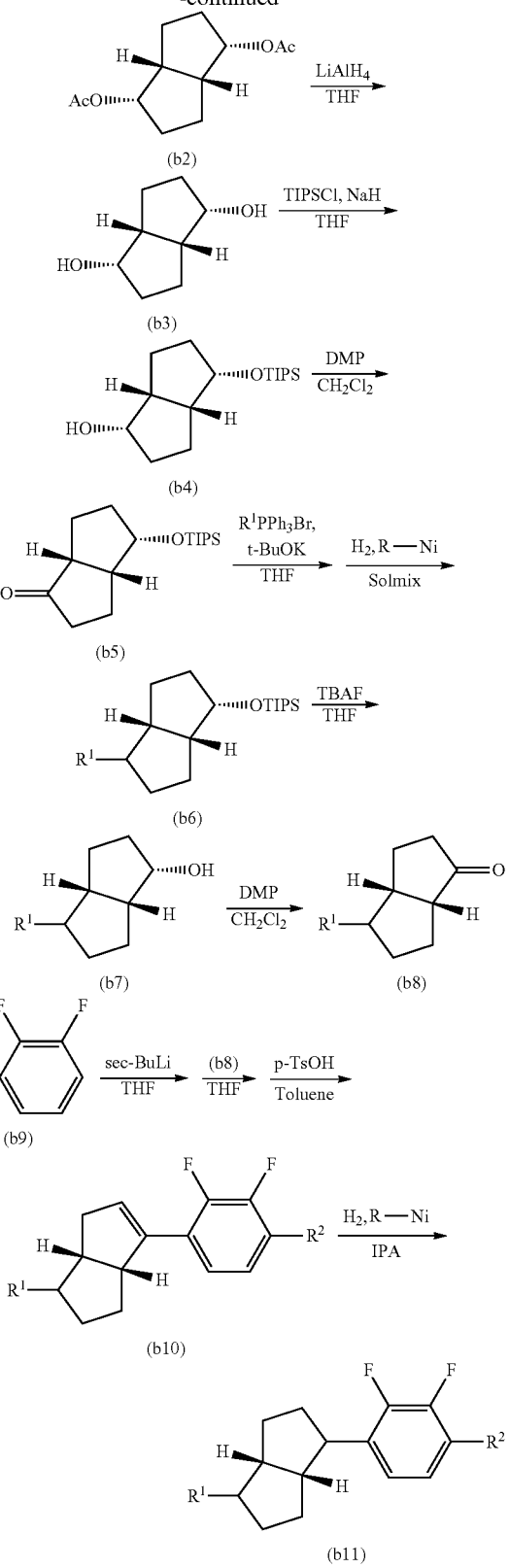

Examples for the synthesis of the compound (1-1) are as follows. The reaction of 1,5-cyclooctadiene (b1) with lead (IV) acetate in acetic acid in the presence of a catalytic amount of palladium (II) acetate gives the compound (b2).

The reduction of the compound (b2) with lithium aluminum hydride gives the compound (b3). The compound (b3) is allowed to react with sodium hydride, and then with triisopropylsilyl chloride to give the compound (b4). The reaction of the compound (b4) with Dess-Martin periodinane (DMP) gives the compound (b5). The reaction of the compound (b5) with the Wittig reagent having a $R^1$ group, and the hydrogenation of the product in the presence of a catalyst such as Raney nickel gives the compound (b6). The compound (b6) is allowed to react with tetrabutylammonium fluoride (TBAF) to give the compound (b7). The reaction of the compound (b7) with Dess-Martin periodinane (DMP) gives the compound (b8).

A lithium salt is prepared by the reaction of the difluorobenzene (b9) with sec-butyllithium. The reaction of the lithium salt with the compound (b8), followed by the dehydration of the resulting alcohol derivative in the presence of an acid catalyst such as p-toluenesulfonic acid gives the compound (b10), which is one example of the compound (1-1). The hydrogenation of the compound (b10) in the presence of Raney nickel or the like gives the compound (b11), which is one example of the compound (1-1).

2. The Composition (1)

The liquid crystal composition (1) of the invention will be explained. The composition (1) includes at least one of the compound (1-1) as a component A. The composition (1) may include two or more of the compound (1-1). The component of the liquid crystal compounds may be the compound (1-1) alone. It is desirable that the composition (1) should include at least one of the compound (1-1) in the range of 1% to 99% by weight in order to exhibit excellent physical properties. A more desirable ratio is in the range of 5% to 60% by weight. The composition (1) may include the compound (1-1) and a variety of liquid crystal compounds that are not described in this specification.

A desirable composition includes a compound selected from the component D and the component E, which will be shown below. When the composition (1) is prepared, the component can be selected in consideration of, for example, the dielectric anisotropy of the compound (1-1). The composition in which the component is suitably selected has a high maximum temperature, a low minimum temperature, a small viscosity, a suitable optical anisotropy, a large negative dielectric anisotropy and a suitable elastic constant.

The component D is the compounds (2) to (7). These are compounds having negative dielectric anisotropy. The component E is the compounds (8) to (10). These are compounds having a small dielectric anisotropy. These components will be explained in due order.

The component D has a benzene ring that is substituted with two halogens in the lateral positions, such as 2,3-difluoro-1,4-phenylene. Desirable examples of the component D include the compounds (2-1) to (2-6), the compounds (3-1) to (3-15), the compounds (4-1), the compounds (5-1) to (5-3), the compounds (6-1) to (6-11) and the compounds (7-1) to (7-10).

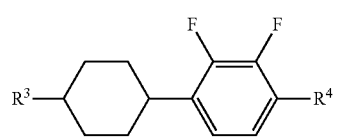
(2-1)

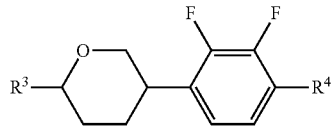
(2-2)

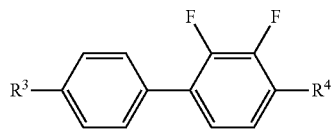
(2-3)

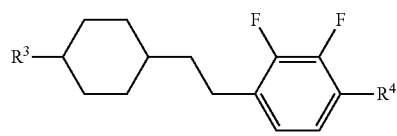
(2-4)

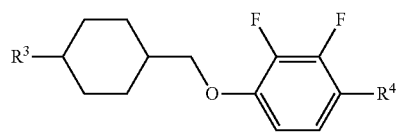
(2-5)

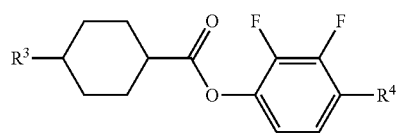
(2-6)

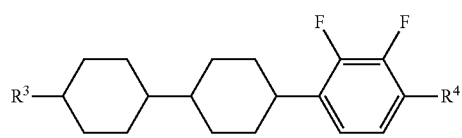
(3-1)

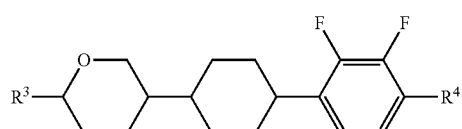
(3-2)

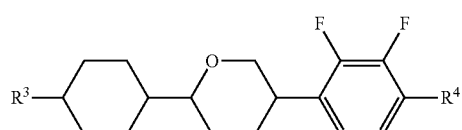
(3-3)

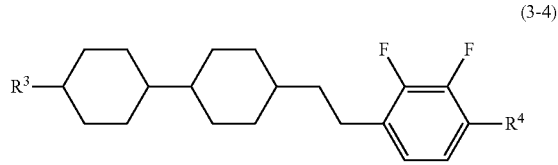
(3-4)

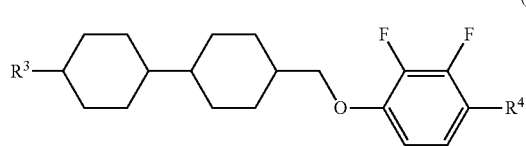
(3-5)

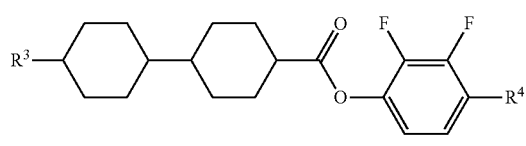
(3-6)

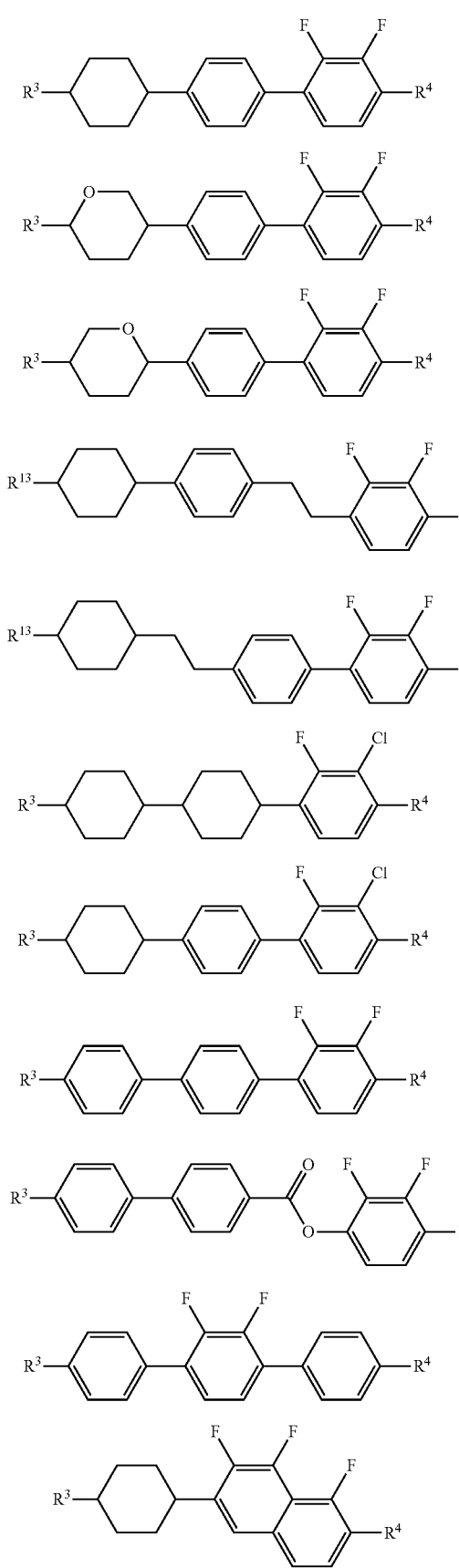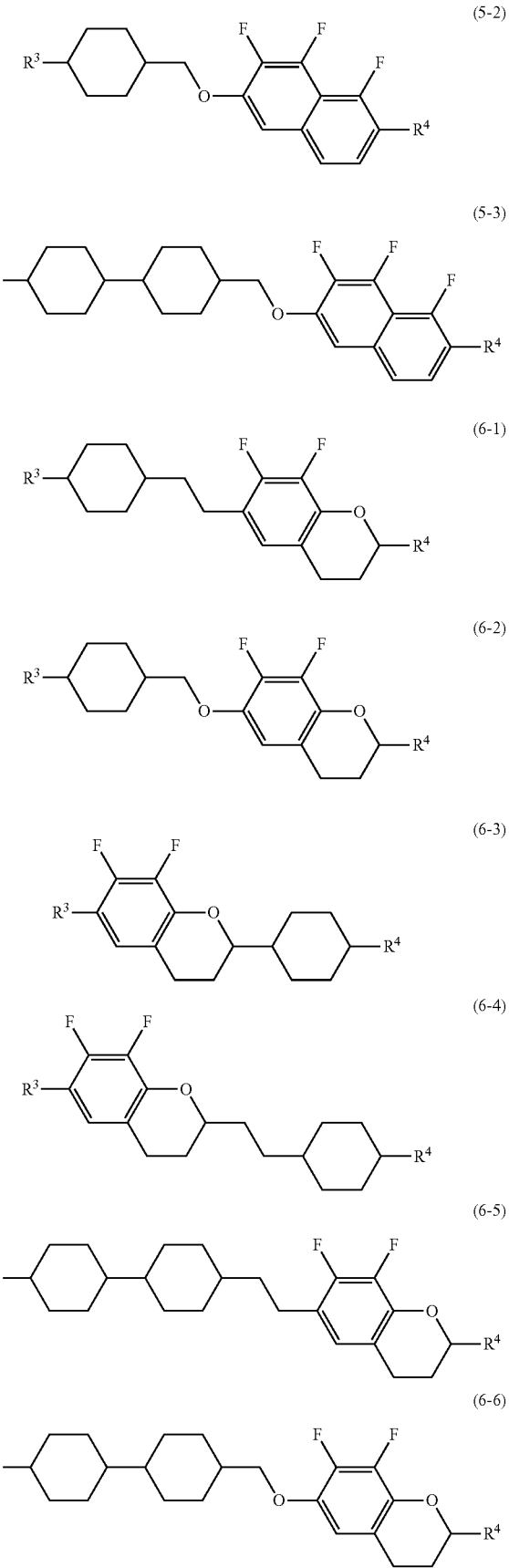

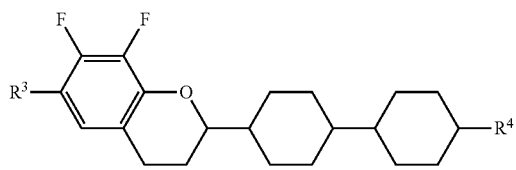
(6-7)

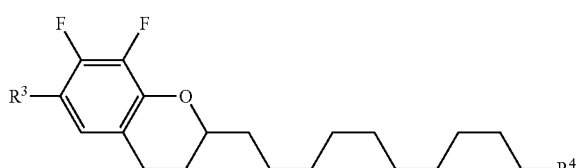
(6-8)

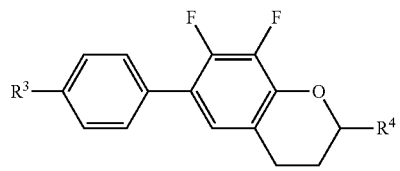
(6-9)

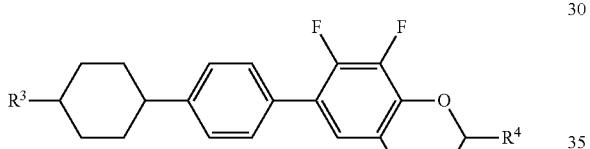
(6-10)

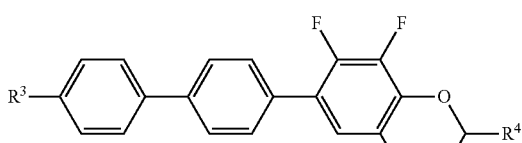
(6-11)

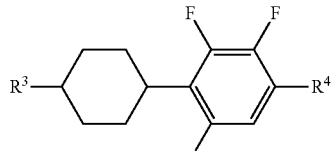
(7-1)

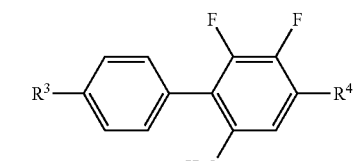
(7-2)

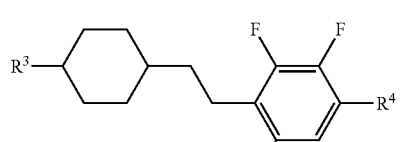
(7-3)

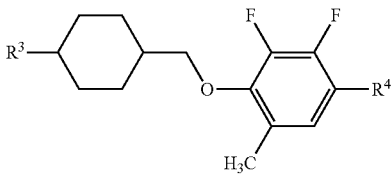
(7-4)

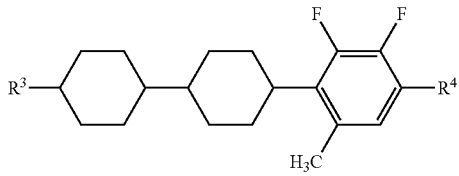
(7-5)

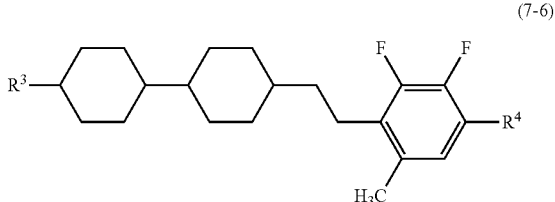
(7-6)

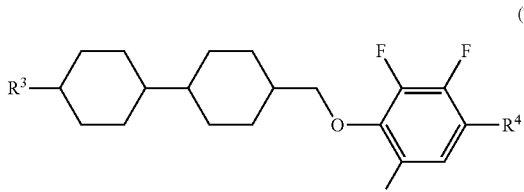
(7-7)

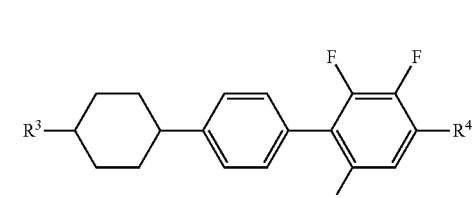
(7-8)

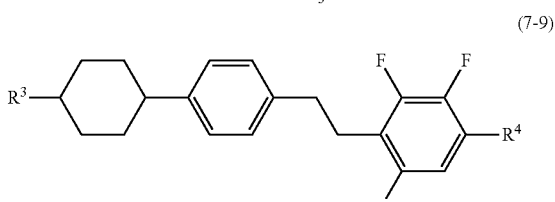
(7-9)

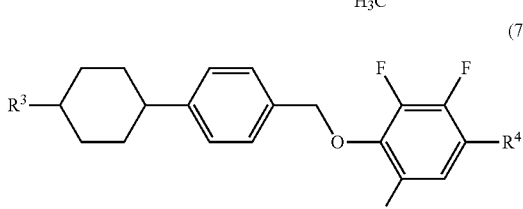
(7-10)

In these compounds (the component D), the definitions of $R^3$ and $R^4$ are just the same as described previously.

The component D is a compound in which the dielectric anisotropy is negative. The component D is mainly used for the preparation of a composition for use in a VA mode or a PSA mode. As the content of the component D is increased, the dielectric anisotropy of the composition increases. However, the viscosity increases. Thus, it is desirable that the content should decrease as long as the required value of the dielectric anisotropy is satisfied. Accordingly, the content is preferably 40% by weight or more in order to ensure adequate voltage drive, in consideration that the absolute value of the dielectric anisotropy is about 5.

In the component D, the compound (2) is mainly effective in adjusting the viscosity, adjusting the optical anisotropy or adjusting the dielectric anisotropy, since it is a two-ring compound. The compounds (3) and (4) are effective in increasing the maximum temperature, increasing the optical anisotropy or increasing the dielectric anisotropy, since it is a three-ring compound. The compounds (5) to (7) are effective in increasing the dielectric anisotropy.

The content of the component D is preferably 40% by weight or more, and more preferably in the range of 50% to 95% by weight, based on the total weight of the composition, in the preparation of a composition for use in a VA mode or a PSA mode. The elastic constant of the composition can be adjusted and the voltage-transmission curve of the device can be adjusted by the addition of the component D. It is desirable that the content of the component D should 30% by weight or less based on the total weight of the composition when the component D is added to a composition having positive dielectric anisotropy The component E is a compound where two terminal groups are alkyl or the like. Desirable examples of the component E include the compounds (8-1) to (8-11), the compounds (9-1) to (9-19) and the compounds (10-1) to (10-6).

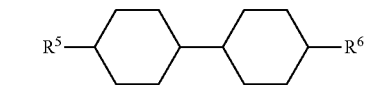 (8-1)

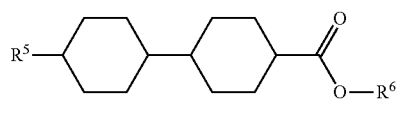 (8-2)

 (8-3)

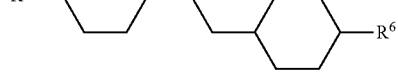 (8-4)

 (8-5)

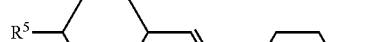 (8-6)

 (8-7)

-continued

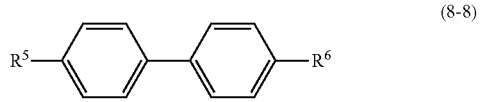 (8-8)

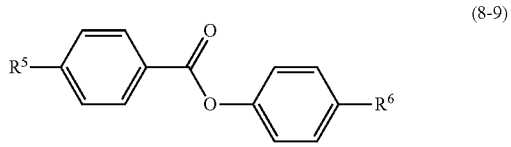 (8-9)

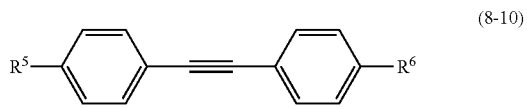 (8-10)

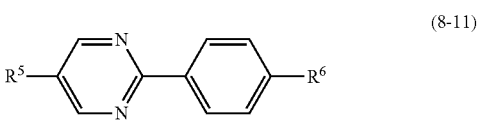 (8-11)

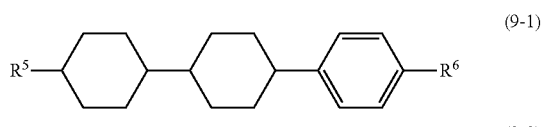 (9-1)

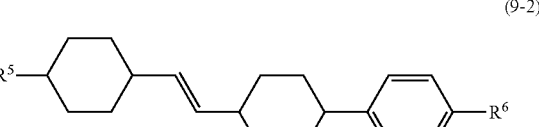 (9-2)

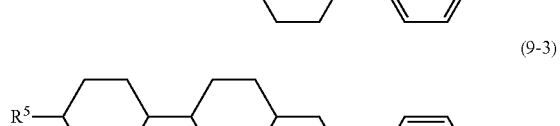 (9-3)

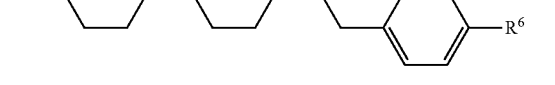 (9-4)

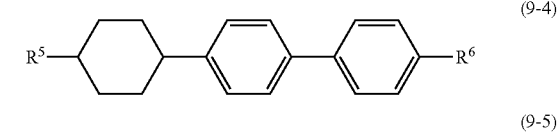 (9-5)

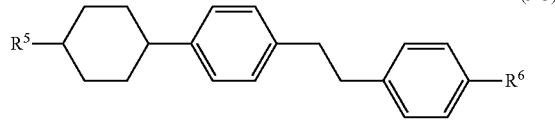 (9-6)

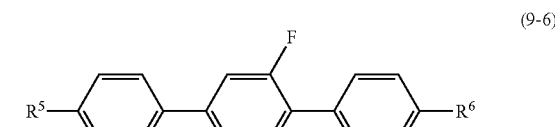 (9-7)

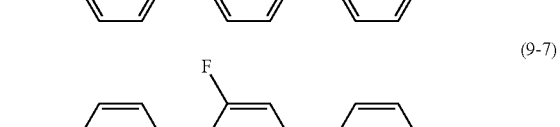 (9-8)

-continued

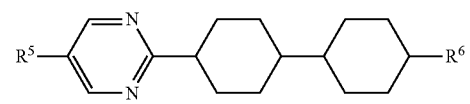
(9-9)

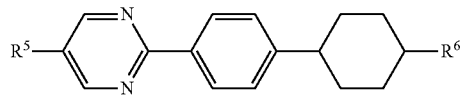
(9-10)

(9-11)

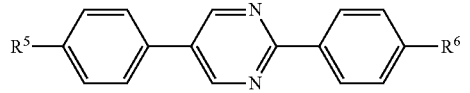
(9-12)

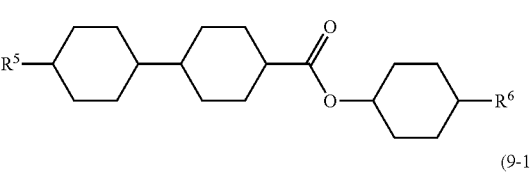
(9-13)

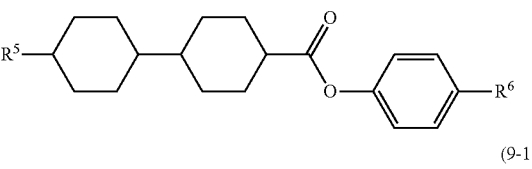
(9-14)

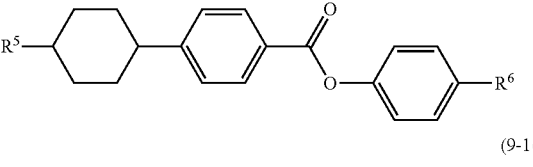
(9-15)

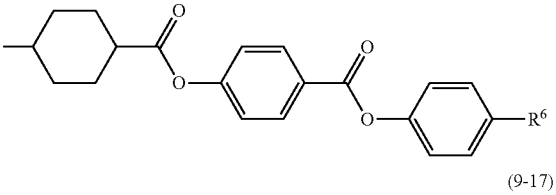
(9-16)

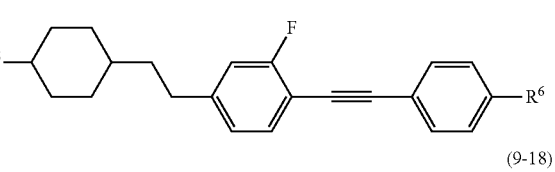
(9-17)

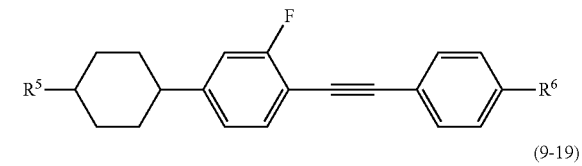
(9-18)

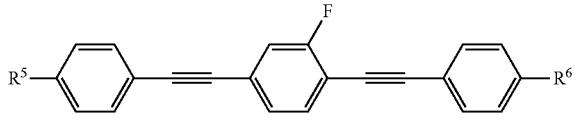
(9-19)

-continued

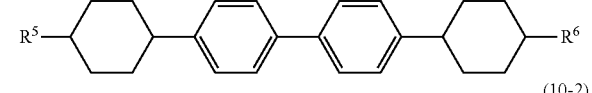
(10-1)

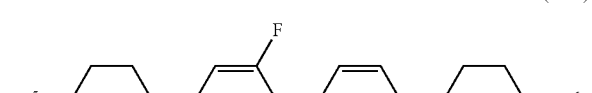
(10-2)

(10-3)

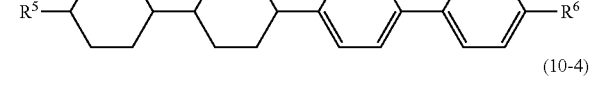
(10-4)

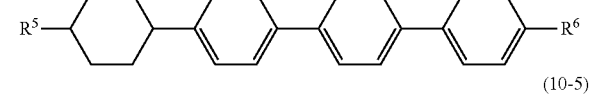
(10-5)

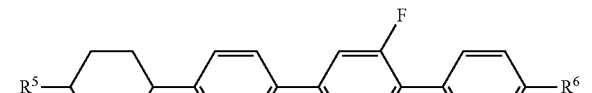
(10-6)

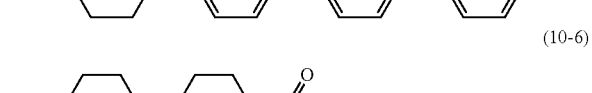

In these compounds (component E), the definitions of $R^5$ and $R^6$ are just the same as described previously.

The component E is close to neutral, since the absolute value of the dielectric anisotropy is small. The compound (12) is mainly effective in adjusting the viscosity or adjusting the optical anisotropy. The compounds (13) and (14) are effective in increasing the temperature range of a nematic phase that is caused by an increase in the maximum temperature, or adjusting the optical anisotropy.

As the content of the component E is increased, the viscosity of the composition decreases. However, the dielectric anisotropy decreases. Thus, it is desirable that the content should increase as long as the required value of the dielectric anisotropy is satisfied. Accordingly, the content of the component E is preferably 30% by weight or more, and more preferably 40% by weight or more based on the total weight of the composition, in the preparation of a composition for use in a VA mode or a PSA mode.

The preparation of the composition (1) is carried out according to known methods such as the mutual dissolution of necessary components at a high temperature. An additive may be added to the composition depending on its intended use. Examples of the additive are an optically active compound, a polymerizable compound, a polymerization initiator, an antioxidant, an ultraviolet light absorber and so forth. These kinds of additives are known to a person skilled in the art, and have been described in the literature.

The composition (1) may further include at least one optically active compound. A known chiral dopant can be added as an optically active compound. The chiral dopant is effective in inducing a helical structure in liquid crystals, giving a necessary twist angle and thus preventing a reverse twist. Desirable examples of the chiral dopant include the following optically active compounds (Op-1) to (Op-13).

25
(Op-1)
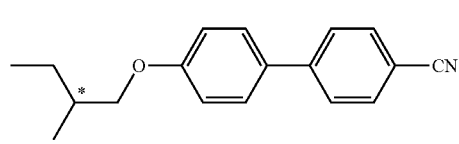
26
(Op-2)
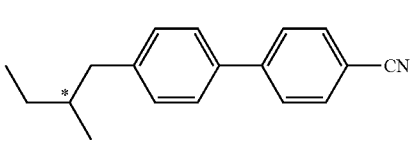
(Op-3)
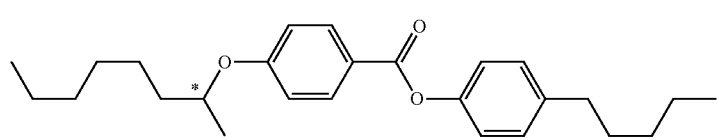
(Op-4)
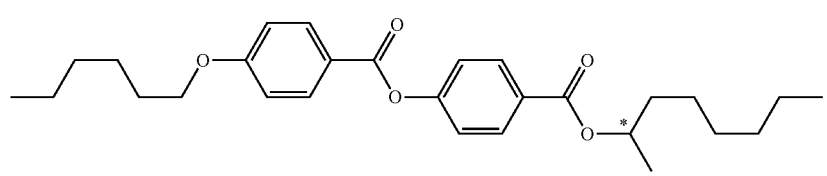
(Op-5)
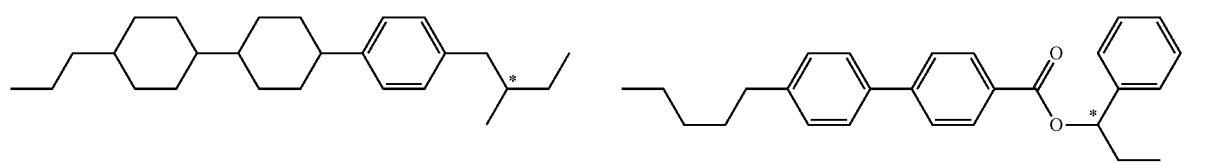
(Op-6)
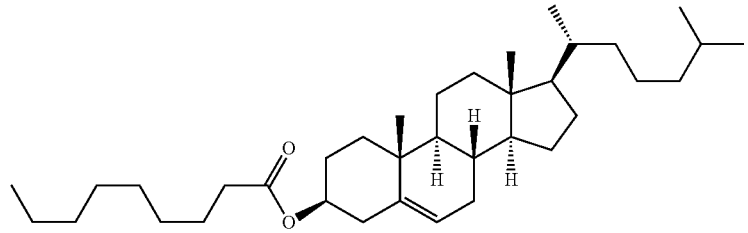
(Op-7)
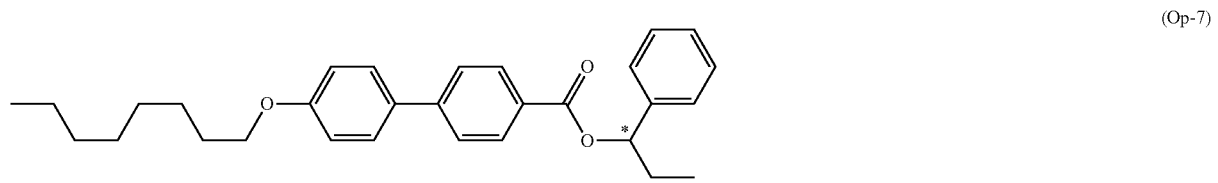
(Op-8)
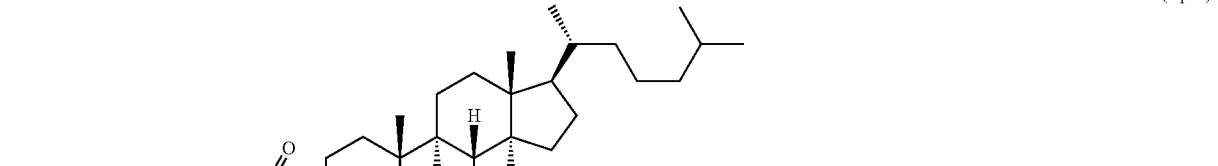
(Op-9)
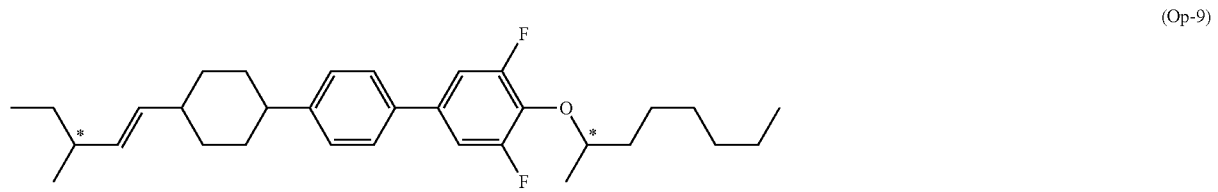
(Op-10)
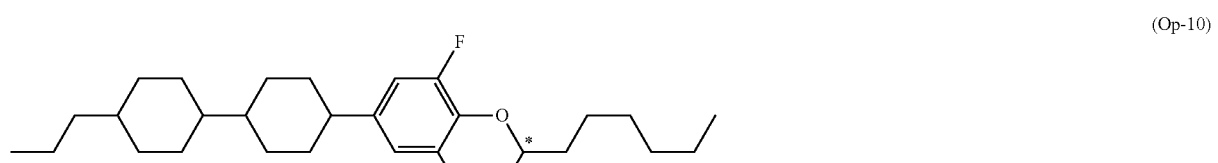
(Op-11)
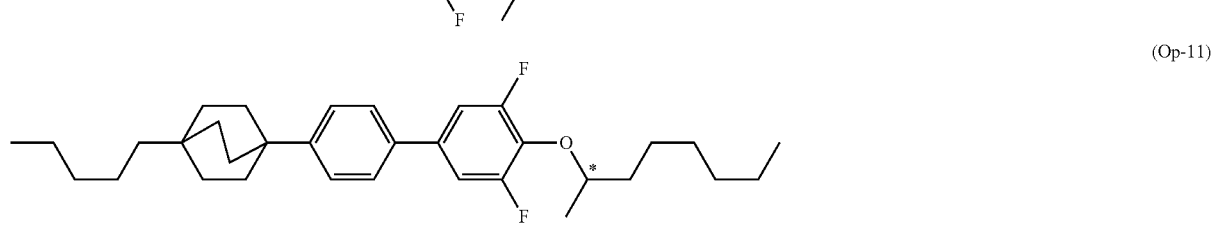

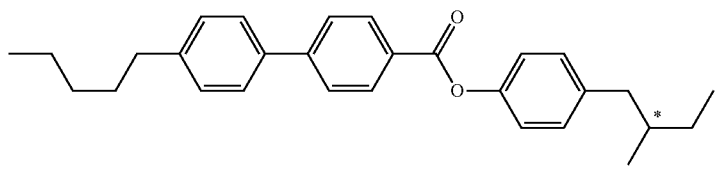

(Op-12)

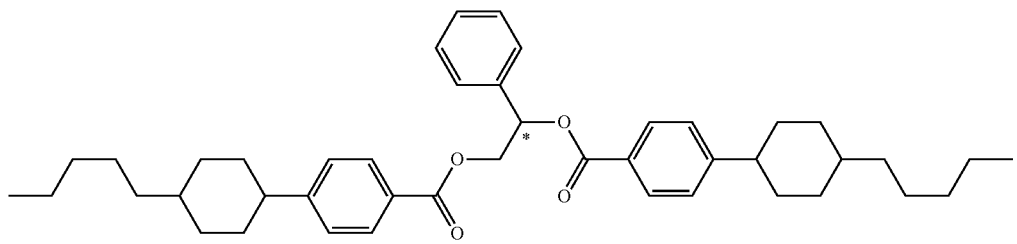

(Op-13)

A helical pitch is adjusted by the addition of an optically active compound to the composition (1). It is desirable to adjust the helical pitch to the range of 40 to 200 micrometers in a composition for use in a TFT mode and a TN mode. It is desirable to adjust the helical pitch to the range of 6 to 20 micrometers in a composition for use in a STN mode. It is desirable to adjust the helical pitch to the range of 1.5 to 4 micrometers in a composition for use in a BTN mode. Two or more optically active compounds may be added for the purpose of adjusting the temperature dependence of the helical pitch.

The composition (1) can be used for use in a PSA mode by the addition of a polymerizable compound. Examples of the polymerizable compound include acrylates, methacrylates, vinyl compounds, vinyloxy compounds, propenyl ethers, epoxy compounds (oxiranes, oxetanes) and vinyl ketones. The polymerizable compound is polymerized on irradiation with ultraviolet light or the like, preferably in the presence of a suitable initiator such as a photopolymerization initiator. Suitable conditions for the polymerization, and a suitable type and a suitable amount of the initiator are known to a person skilled in the art and are described in the literature.

The antioxidant is effective in maintaining a large voltage holding ratio. Desirable examples of the antioxidant include 2,6-di-tert-butyl-4-alkylphenol. The ultraviolet light absorber is effective for preventing a decrease in the maximum temperature. Desirable examples of the ultraviolet light absorber include a benzophenone derivative, a benzoate derivative and a triazole derivative. A light stabilizer such as an amine having steric hindrance is also desirable.

The composition (1) can be used for use in a GH mode by the addition of a dichroic dye such as a merocyanine, stylyl, azo, azomethine, azoxy, quinophthalone, anthraquinone or tetrazine compound.

The composition (1) has a wide temperature range of a nematic phase, since the maximum temperature can be 70° C. or more, and the minimum temperature can be −10° C. or less by suitably adjusting the kinds and the ratios of component compounds. Accordingly, a liquid crystal display device containing this composition can be used in a wide temperature range.

In the composition (1), the optical anisotropy can be in the range of 0.10 to 0.13, or in the range of 0.05 to 0.18 by suitably adjusting the kinds and the ratios of component compounds. Similarly, the dielectric anisotropy can be adjusted to the range of −5.0 to −2.0. Desirable dielectric anisotropy is in the range of −4.5 to −2.5. The composition (1) having the dielectric anisotropy in the range is suitably used for a liquid crystal display device operated in an IPS mode, a VA mode or a PSA mode.

3. The Liquid Crystal Display Device

The composition (1) can be used for a liquid crystal display device having an operating mode such as a PC mode, a TN mode, a STN mode, an OCB mode or a PSA mode, which is driven by means of an AM (active matrix) mode. The composition (1) can also be used for a liquid crystal display device having an operating mode such as a PC mode, a TN mode, a STN mode, an OCB mode, a VA mode or an IPS mode, which is driven by means of a PM (passive matrix) mode. These devices having the AM mode and the PM mode can be applied to any type of a reflection type, a transmission type, and a semi-transmission type.

The composition (1) has a driving mode such as a VA mode, an IPS mode or a PSA mode, and can suitably be used for a liquid crystal display device which is driven by means of the AM mode, since it has negative dielectric anisotropy. The composition can suitably be used for a liquid crystal display device which has a VA mode and is driven by means of the AM mode.

The composition (1) can be used for a nematic curvilinear aligned phase (NCAP) device containing nematic liquid crystals microencapsulated, and a polymer dispersed-liquid crystal display device (PDLCD) having a three-dimensional network polymer formed in the liquid crystal composition, and a polymer network-liquid crystal display device (PDLCD).

The direction of an electric field is perpendicular to liquid crystal layers in a liquid crystal display device operated in the TN mode, the VA mode or the like. On the other hand, the direction of an electric field is parallel to liquid crystal layers in a liquid crystal display device operated in the IPS mode or the like. The structure of the liquid crystal display device operated in the VA mode is reported by K. Ohmuro, S. Kataoka, T. Sasaki and Y. Koike, SID '97 Digest of Technical Papers, 28, 845 (1997). The structure of the liquid crystal display device operated in the IPS mode is reported in WO 1991-010936 A (patent family: U.S. Pat. No. 5,576,867).

EXAMPLES

The invention will be explained in more detail based on examples. The invention is not limited by the examples.

1-1. Examples of the Compound (1-1)

The compound (1-1) was prepared by the procedures described below. Compounds prepared herein were identified by means of NMR analysis and so forth. Physical properties of the compounds were measured by the methods described below.

NMR Analysis

A model DRX-500 apparatus (made by Bruker BioSpin Corporation) was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane (TMS) was used as the internal standard. In the measurement of $^{19}$F-NMR, $CFCl_3$ was used as the internal standard, and the accumulation of 24 scans was performed. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Sample for Measurement

A liquid crystal compound itself was used as a sample when the phase structure and the transition temperature were measured. A composition prepared by mixing the compound and mother liquid crystals was used as a sample, when physical properties such as the maximum temperature of a nematic phase, viscosity, optical anisotropy and dielectric anisotropy were measured.

When a sample in which a compound is mixed with mother liquid crystals was used, the measurement was carried out according to the following method. The sample was prepared by mixing 15% by weight of the compound and 85% by weight of the mother liquid crystals. Extrapolated values were calculated from the measured values of the sample by means of an extrapolation method represented by the following equation, and their values were reported.

[Extrapolated value]=(100×[Measured value of sample]−[% by weight of mother liquid crystals]×[Measured value of mother liquid crystals])/[% by weight of compound].

When crystals (or a smectic phase) deposited at 25° C. even at this ratio of the compound to the mother liquid crystals, the ratio of the compound to the mother liquid crystals was changed in the order of (10% by weight:90% by weight), (5% by weight:95% by weight) and (1% by weight:99% by weight). The physical properties of the sample were measured at the ratio in which the crystals (or the smectic phase) did not deposit at 25° C. Incidentally, the ratio of the compound to the mother liquid crystals is (15% by weight:85% by weight), unless otherwise noted.

The following mother liquid crystals (i) were used as mother liquid crystals. The ratio of each component in the mother liquid crystals (i) is expressed as a percentage by weight.

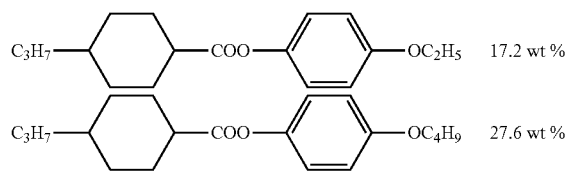

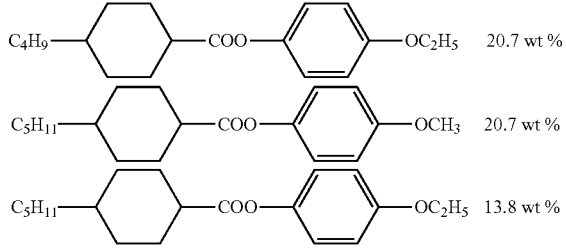

Measurement Method

The physical properties of compounds were measured according to the following methods. Most were methods described in the JEITA standards (JEITA-ED-2521B) which was deliberated and established by Japan Electronics and Information Technology Industries Association (abbreviated to JEITA), or the modified methods. No TFT was attached to a TN device used for measurement.

(1) Phase Structure

A sample was placed on a hot plate of a melting point apparatus (Hot Stage Model FP-52 made by Mettler Toledo International Inc.) equipped with a polarizing microscope, and the phase conditions and their changes were observed with the polarizing microscope while the sample was heated at the rate of 3° C. per minute, and the kinds of phases were specified.

(2) Transition Temperature (° C.)

A sample was heated and then cooled at the rate of 3° C. per minute using a Perkin-Elmer differential scanning calorimeter, a DSC-7 System or a Diamond DSC System. The starting point of an endothermic peak or an exothermic peak caused by the phase change of the sample was obtained by means of the extrapolation, and thus the transition temperature was determined. The transition temperature of a compound from solid to a liquid crystal phase such as a smectic phase or a nematic phase may be abbreviated to "the minimum temperature of a liquid crystal phase". The transition temperature of a compound from a liquid crystal phase to liquid may be abbreviated to "a clearing point".

The symbol C stood for crystals, which were expressed as $C_1$ and $C_2$ when the kinds of crystals were distinguishable. The symbols S and N stood for a smectic phase and a nematic phase, respectively. When a smectic A phase, a smectic B phase, a smectic C phase or a smectic F was distinguishable in the smectic phases, it was expressed as $S_A$, $S_B$, $S_C$ or $S_F$, respectively. The symbol I stood for a liquid (isotropic). Transition temperatures were expressed as, for example, "C 50.0 N 100.0 Iso", which means that the transition temperature from crystals to a nematic phase was 50.0° C., and the transition temperature from the nematic phase to a liquid was 100.0° C.

(3) Compatibility at Low Temperatures

Samples were prepared by mixing a compound with mother liquid crystals so that the ratio of the compound became 20% by weight, 15% by weight, 10% by weight, 5% by weight, 3% by weight and 1% by weight, and placed in glass vials. After these glass vials had been kept in a freezer at −10° C. or −20° C. for a certain period of time, they were observed as to whether or not crystals (or a smectic phase) had been deposited.

(4) Maximum Temperature of a Nematic Phase ($T_{NI}$ or NI; ° C.)

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature." The symbol $T_{NI}$ means that the sample was a mixture of a compound and mother liquid crystals. The symbol NI means that the sample was a mixture of a compound and the component B and so forth.

(5) Minimum Temperature of a Nematic Phase ($T_C$; ° C.)

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., $T_C$ was expressed as ≤−20° C. A lower limit of the temperature range of a nematic phase may be abbreviated to "the minimum temperature."

(6) Viscosity (Bulk Viscosity; η; Measured at 20° C.; mPa·s)

An E-type viscometer was used for measurement.

(7) Viscosity (Rotational Viscosity; γ1; Measured at 25° C.; mPa·s)

Rotational viscosity was measured according to the method described in M. Imai, et al., Molecular Crystals and Liquid Crystals, Vol. 259, p. 37 (1995). A sample was poured into a VA device in which the distance between the two glass substrates (cell gap) was 20 micrometers. A voltage in the range of 30 V to 50 V was applied stepwise with an increment of 1 volt to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al. The value of the dielectric anisotropy necessary for the present calculation was obtained by the method described below, under the heading "Dielectric anisotropy."

(8) Optical Anisotropy (Refractive Index Anisotropy; Δn; Measured at 25° C.)

Measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of the rubbing. The refractive index (n⊥) was measured when the direction of polarized light was perpendicular to that of the rubbing. The value of the optical anisotropy (Δn) was calculated from the equation: Δn=n∥−n⊥.

(9) Dielectric Anisotropy (Δ∈; Measured at 25° C.)

The value of dielectric anisotropy was calculated from the equation: Δ∈=∈∥−∈⊥. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrates. The glass substrates were rotated with a spinner, and then heated at 150° C. for one hour. A sample was poured into a VA device in which the distance between the two glass substrates (cell gap) was 4 micrometers, and then the device was sealed with an adhesive curable on irradiation with ultraviolet light. Sine waves (0.5 V, 1 kHz) were applied to the device, and a dielectric constant (∈∥) in the major axis direction of liquid crystal molecules was measured after 2 seconds.

2) Measurement of a dielectric constant (∈⊥): A polyimide solution was applied to a thoroughly cleaned glass substrate. The glass substrates were burned, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to the device, and a dielectric constant (∈⊥) in the minor axis direction of liquid crystal molecules was measured after 2 seconds.

(10) Elastic Constant ($K_{11}$ and $K_{33}$; Measured at 25° C.; pN)

Elastic Constant Measurement System Model EC-1 made by Toyo Corporation was used for measurement. A sample was poured into a homeotropic device in which the distance between the two glass substrates (cell gap) was 20 micrometers. An electric charge of 20 volts to 0 volts was applied to the device, and electrostatic capacity and applied voltage were measured. The values of the electrostatic capacity (C) and the applied voltage (V) were fitted to the equation (2.98) and the equation (2.101) in page 75 of the "Ekisho Debaisu Handobukku" (Liquid Crystal Device Handbook, in English; The Nikkan Kogyo Shimbun, Ltd., Japan), and the value of the elastic constant was obtained from the equation (2.100).

(11) Threshold Voltage (Vth; Measured at 25° C.; V)

Measurement was carried out with an LCD evaluation system Model LCD-5100 made by Otsuka Electronics Co., Ltd. The light source was a halogen lamp. A sample was poured into a VA device having a normally black mode, in which the distance between the two glass substrates (cell gap) was 4 micrometers and the rubbing direction was antiparallel, and then the device was sealed with an adhesive curable on irradiation with ultraviolet light. The voltage to be applied to the device (60 Hz, rectangular waves) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

(12) Voltage Holding Ratio (VHR-1; measured at 25° C.; %)

A TN device used for measurement had a polyimide-alignment film, and the distance between the two glass substrates (cell gap) was 5 micrometers. A sample was poured into the device, and then the device was sealed with an adhesive curable on irradiation with ultraviolet light. A pulse voltage (60 microseconds at 5 V) was applied to the TN device and the device was charged. A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

(13) Voltage Holding Ratio (VHR-2; measured at 80° C.; %)

A TN device used for measurement had a polyimide-alignment film, and the distance between the two glass substrates (cell gap) was 5 micrometer. A sample was poured into the device, and then the device was sealed with an adhesive curable on irradiation with ultraviolet light. A pulse voltage (60 microseconds at 5 V) was applied to the TN device and the device was charged. A decreasing voltage was measured for 16.7 milliseconds with a high-speed voltmeter and the area A between a voltage curve and a horizontal axis in a unit cycle was obtained. The area B was an area without the decrease. The voltage holding ratio was a percentage of the area A to the area B.

Materials

Solmix A-11 (registered trademark) was a mixture of ethanol (85.5%), methanol (13.4%) and isopropanol (1.1%), and was available from Japan Alcohol Trading Co., Ltd. Tetrahydrofuran may be abbreviated to THF.

Example 1

Preparation of the Compound (No. 22)

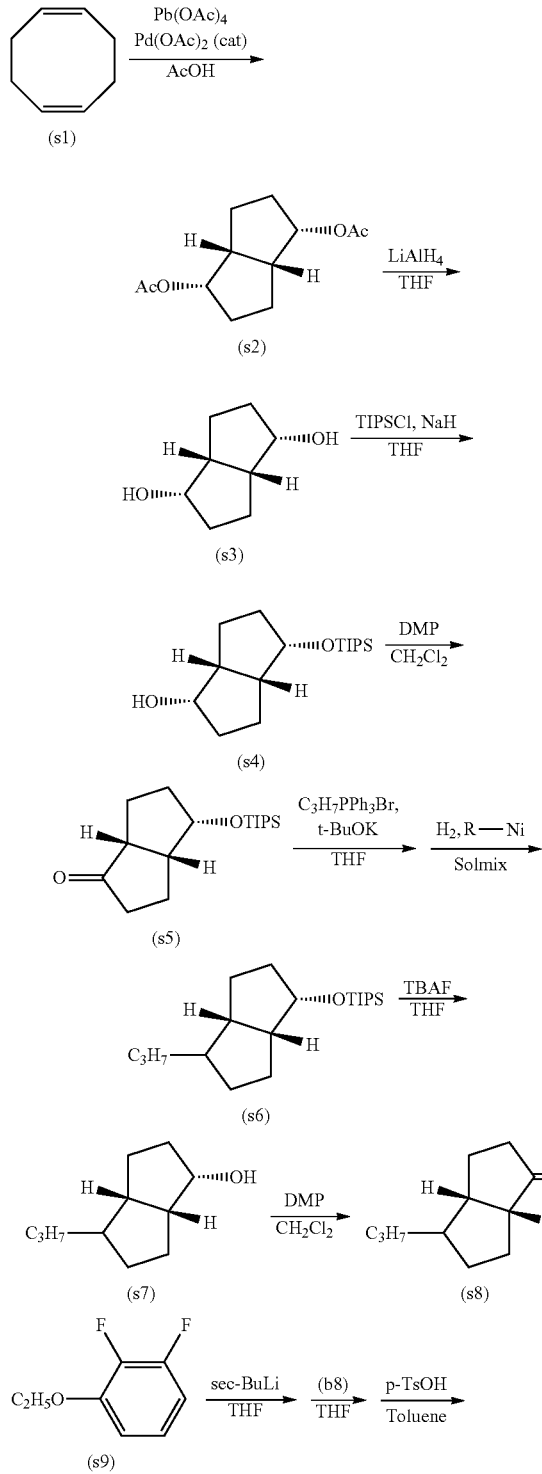

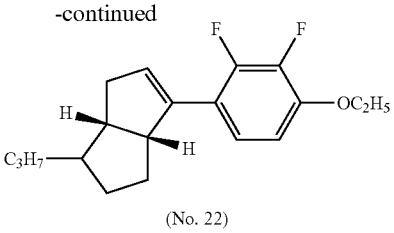

(No. 22)

First Step:

Lead (IV) acetate (250 g), palladium (II) acetate (5.0 g) and acetic acid (564 ml) were placed in a reaction vessel under an atmosphere of nitrogen. 1,5-Cyclooctadiene (s1) (40.7 g) was added at room temperature, and the stirring was continued for 16 hours. The reaction mixture was poured into water, and the mixture was extracted with toluene. The combined organic layers were washed with water, and then dried over anhydrous magnesium sulfate. The solution was concentrated under reduced pressure, and the residue was purified by silica gel chromatography (by volume, toluene:ethyl acetate=9:1) to give the compound (s2) (73.2 g; 86.00).

Second Step:

Lithium aluminum hydride (24.5 g) was suspended in THF (500 ml). The compound (s2) (73.2 g) was added dropwise to the suspension in the temperature range of −20° C. to −10° C., and the mixture was stirred at the same temperature range for another 2 hours. After the completion of reaction had been confirmed by means of GC analysis, ethyl acetate and a saturated aqueous solution of ammonia were added successively to the reaction mixture under ice-cooling. The deposits were removed by filtration through Celite, and the filtrate was extracted with ethyl acetate. The combined organic layers were washed with water and brine, and then dried over anhydrous magnesium sulfate. The solution was concentrated under reduced pressure to give the compound (s3) (36.5 g; 79.3%).

Third Step:

The compound (s3) (23.0 g), sodium hydride (7.2 g) and THF (200 ml) were placed in a reaction vessel. Triisopropylsilyl chloride (TIPSCl; 32.7 g) was slowly added dropwise at room temperature, and the mixture was heated to reflux for 8 hours. The reaction mixture was cooled to 30° C., and poured into brine, and then the mixture was extracted with ethyl acetate. The combined organic layers were washed with water and brine, and then dried over anhydrous magnesium sulfate. The solution was concentrated under reduced pressure, and the residue was purified by silica gel chromatography (by volume, toluene:ethyl acetate=4:1) to give the compound (s4) (45.0 g; 93.2%).

Fourth Step:

The compound (s4) (45.0 g) and methylene chloride (300 ml) were placed in a reaction vessel under an atmosphere of nitrogen. The solution was cooled to 0° C., and Dess-Martin periodinane (DMP; 76.7 g) was added in three portions. The stirring was continued for another 2 hours while the mixture was allowed to come to room temperature. A saturated aqueous solution of sodium hydrogencarbonate and a saturated aqueous solution of sodium sulfite were poured into the reaction mixture, and the mixture was extracted with ethyl acetate. The combined organic layers were washed with brine, and then dried over anhydrous magnesium sulfate. The solution was concentrated under reduced pressure, and the residue was purified by silica gel chromatography (by volume, toluene:ethyl acetate=4:1) to give the compound (s5) (42.0 g; 94.0%).

Fifth Step:

Well-dried propyltriphenylphosphonium bromide (35.1 g) in a THF (300 ml) solution was cooled to −40° C. under an atmosphere of nitrogen. Potassium tert-butoxide (10.2 g) was added in two portions in the temperature range of −40° C. to −35° C. After the reaction mixture had been stirred at −40° C. for 60 minutes, the compound (s5) (22.5 g) in a THF (100 ml) solution was added dropwise in the temperature range of −40° C. to −35° C. The stirring was continued for another 2 hours while the mixture was allowed to come to room temperature. The reaction mixture was poured into water, and the mixture was extracted with toluene. The combined organic layers were washed with water, and then dried over anhydrous magnesium sulfate. The solution was concentrated under reduced pressure, and the residue was purified by silica gel chromatography (toluene). Raney nickel (4.5 g) was added to the product in a 2-propanol (250 ml) solution, and the mixture was stirred at room temperature under a hydrogen atmosphere until hydrogen absorption had ceased. After the completion of the reaction, Raney nickel was filtered off, and then the solvent was distilled off. The residue was purified by silica gel chromatography (toluene) to give the compound (s6) (23.0 g; 93.4%).

Sixth Step:

The compound (s6) (23.0 g) and THF (100 ml) were placed in a reaction vessel under an atmosphere of nitrogen, and cooled to 0° C. Tetrabutylammonium fluoride (TBAF; 141.8 ml) was added dropwise, and the stirring was continued for another 8 hours while the mixture was allowed to come to room temperature. The reaction mixture was poured into water, and the mixture was extracted with ethyl acetate. The combined organic layers were washed with brine, and then dried over anhydrous magnesium sulfate. The solution was concentrated under reduced pressure, and the residue was purified by silica gel chromatography (by volume, toluene: ethyl acetate=9:1) to give the compound (s7) (10.8 g; 90.6%).

Seventh Step:

The compound (s7) (10.8 g) and methylene chloride (100 ml) were placed in a reaction vessel under an atmosphere of nitrogen, and cooled to 0° C. DMP (32.7 g) was added in three portions. The stirring was continued for another 2 hours while the mixture was allowed to come to room temperature. A saturated aqueous solution of sodium hydrogencarbonate and a saturated aqueous solution of sodium sulfite were poured into the reaction mixture, and the mixture was extracted with ethyl acetate. The combined organic layers were washed with water and brine, and then dried over anhydrous magnesium sulfate. The solution was concentrated under reduced pressure, and the residue was purified by silica gel chromatography (by volume, toluene:ethyl acetate=9:1) to give the compound (s8) (10.6 g; 99.3%).

Eighth Step:

4-Ethoxy-2,3-difluorobenzene (s9) (5.7 g) and THF (100 ml) were placed in a reaction vessel under an atmosphere of nitrogen, and cooled to −74° C. sec-Butyllithium (1.00M; n-hexane/cyclohexane solution; 39 ml) was added dropwise in the temperature range of −74° C. to 70° C., and the stirring was continued for another 2 hours. The compound (s8) (10.6 g) in a THF (20 ml) solution was added dropwise in the temperature range of −75° C. to −70° C., and the stirring was continued for another 8 hours while the mixture was allowed to come to 25° C. The reaction mixture was poured into an aqueous solution of ammonium chloride, and then the mixture was extracted with ethyl acetate. The combined organic layers were washed with water, a saturated aqueous solution of sodium hydrogencarbonate and water, and then dried over anhydrous magnesium sulfate. The solution was concentrated under reduced pressure. p-Toluenesulfonic acid (p-TsOH, 0.2 g) and toluene (100 ml) were added to the residue, and the mixture was heated to reflux for 2 hours. The reaction mixture was cooled to 30° C., and poured into water, and then the mixture was extracted with toluene. The combined organic layers were washed with a saturated aqueous solution of sodium hydrogencarbonate and water, and then dried over anhydrous magnesium sulfate. The solution was concentrated under reduced pressure, and the residue was purified by silica gel chromatography (toluene), and further purified by recrystallization from Solmix A-11 to give the compound (No. 22) (7.4 g; 80.3%).

$^1$H-NMR (δ ppm; CDCl$_3$): 6.95 (td, 1H), 6.67 (t, 1H), 6.17 (s, 1H), 4.11 (q, 2H), 3.54 (t, 1H), 2.85 (quin, 1H), 2.48-2.35 (m, 2H), 1.92 (m, 1H), 1.73 (m, 1H), 1.61 (m, 1H), 1.53-1.42 (m, 4H), 1.37 (m, 4H), 1.11 (m, 1H) and 0.93 (t, 3H).

The physical properties of the compound (No. 22) were as follows. Transition temperature: C 45.6 I. $T_{NI}$=15.3° C.; Δn=0.115; Δ∈=−6.26.

Example 2

Preparation of the Compound (No. 2)

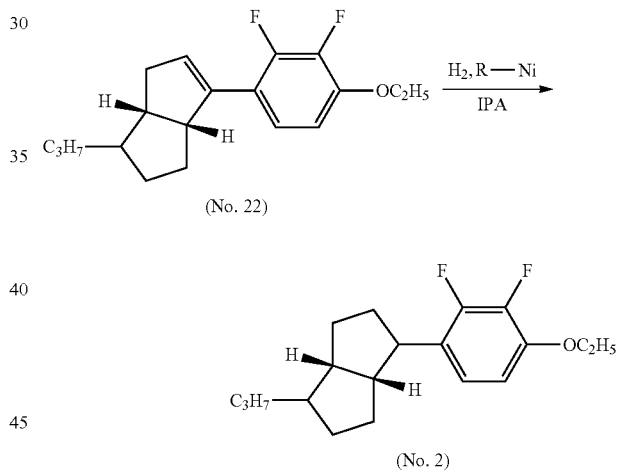

First Step:

Raney nickel (4.5 g) was added to the compound (No. 22) (6.0 g) in a 2-propanol (250 ml) solution, and the mixture was stirred at room temperature under a hydrogen atmosphere until hydrogen absorption had cease. After the completion of the reaction, Raney nickel was filtered off, and then the solvent was distilled off. The residue was purified by silica gel chromatography (toluene), and further purified by recrystallization from Solmix A-11 to give the compound (No. 2) (4.5 g; 74.5%).

$^1$H-NMR (δ ppm; CDCl$_3$): 6.83 (t, 1H), 6.64 (t, 1H), 4.09 (q, 2H), 3.31 (m, 1H), 2.89 (m, 1H), 2.60 (m, 1H), 1.90 (m, 1H), 1.79 (m, 1H), 1.71-1.52 (m, 4H), 1.44 (t, 3H), 1.41-1.25 (m, 5H) and 1.06-0.87 (m, 5H).

The physical properties of the compound (No. 2) were as follows. Transition temperature: C 40.71. $T_{NI}$=−52.7° C.; Δn=0.038; Δ∈=−3.79.

Example 3

Preparation of the Compound (No. 62)

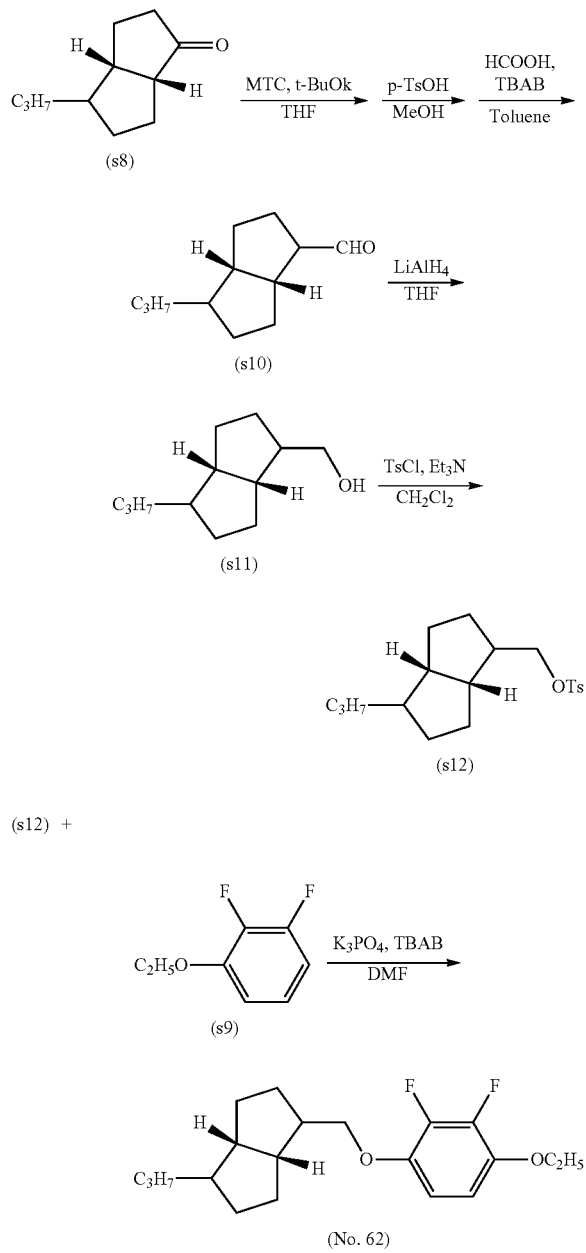

First Step:

Well-dried methoxymethyltriphenylphosphonium chloride (MTC; 14.4 g) in a THF (100 ml) solution was cooled to −30° C. under an atmosphere of nitrogen. Potassium tert-butoxide (4.7 g) was added in four portions in the temperature range of −30° C. to −20° C. After the reaction mixture had been stirred at −20° C. for 60 minutes, the compound (s8) (5.8 g) in a THF (50 ml) solution was added dropwise in the temperature range of −30° C. to −20° C. The stirring was continued for another 2 hours while the mixture was allowed to come to room temperature. The reaction mixture was poured into water, and the mixture was extracted with toluene. The combined organic layers were washed with water, and then dried over anhydrous magnesium sulfate. The solution was concentrated under reduced pressure, and the residue was purified by silica gel chromatography (toluene) to give 3-propyl-7-methoxymethyl-cis-4,8-bicyclo[3.3.0]octane.

Formic acid (87%; 4.8 g), tetrabutylammonium bromide (TBAB; 3.4 g) and toluene (100 ml) were added to the compound, and the mixture was stirred at room temperature for 2 hours. The reaction mixture was poured into water, and the mixture was extracted with toluene. The combined organic layers were washed with water, a saturated aqueous solution of sodium hydrogencarbonate and water, and then dried over anhydrous magnesium sulfate. The solution was concentrated under reduced pressure, and the residue was purified by silica gel chromatography (toluene) to give the compound (s10) (5.1 g; 82.7%).

Second Step:

Lithium aluminum hydride (0.4 g) was suspended in THF (100 ml). The compound (s10) (3.0 g) was added dropwise to the suspension in the temperature range of −20° C. to −10° C., and the mixture was stirred at the same temperature range for another 2 hours. After the completion of reaction had been confirmed by means of GC analysis, ethyl acetate and a saturated aqueous solution of ammonia were added successively to the reaction mixture under ice-cooling. The deposits were removed by filtration through Celite, and the filtrate was extracted with ethyl acetate. The combined organic layers were washed with water and brine, and then dried over anhydrous magnesium sulfate. The solution was concentrated under reduced pressure, and the residue was purified by silica gel chromatography (by volume, toluene:ethyl acetate=9:1) to give the compound (s11) (1.9 g; 62.6%).

Third Step:

The compound (s11) (1.9 g) and methylene chloride (100 ml) were placed in a reaction vessel under an atmosphere of nitrogen, and cooled to 0° C. p-Toluenesulfonly chloride (p-TsCl; 2.2 g) and diazabicyclooctane (DABCO; 3.5 g) were added, and the mixture was stirred at room temperature for 8 hours. The reaction mixture was poured into water, and the mixture was extracted with toluene. The combined organic layers were washed with water, and then dried over anhydrous magnesium sulfate. The solution was concentrated under reduced pressure, and the residue was purified by silica gel chromatography (by volume, toluene:heptane=1:1) to give the compound (s12) (3.2 g; 91.2%).

Fourth Step:

The compound (s12) (3.2 g), 4-ethoxy-2,3-difluorophenol (1.8 g), tripotassium phosphate ($K_3PO_4$), TBAB (0.9 g) and toluene (100 ml) were placed in a reaction vessel under an atmosphere of nitrogen, and he mixture was stirred at 70° C. for 5 hours. The reaction mixture was cooled to 25° C., and the deposits were filtered off, and then the filtrate was concentrated. The residue was purified by silica gel chromatography (by volume, toluene: heptane=1:1), and further purified by recrystallization from Solmix A-11 to give the compound (No. 62) (2.1 g; 65.2%).

$^1$H-NMR (δ ppm; $CDCl_3$): 6.62 (d, 2H), 4.05 (q, 2H), 3.98 (m, 1H), 3.89 (t, 1H), 2.43 (quin, 1H), 2.15 (q, 1H), 1.89 (m, 1H), 1.82 (m, 1H), 1.73 (m, 1H), 1.66-1.51 (m, 3H), 1.46 (m, 1H), 1.42 (t, 3H), 1.33-1.09 (m, 7H) and 0.90 (m, 3H).

The physical properties of the compound (No. 62) were as follows. Transition temperature: C 48.1 I. $T_{NI}$=−19.4° C.; Δn=0.058; Δε=−7.17.

Example 4

Preparation of the Compound (No. 222)

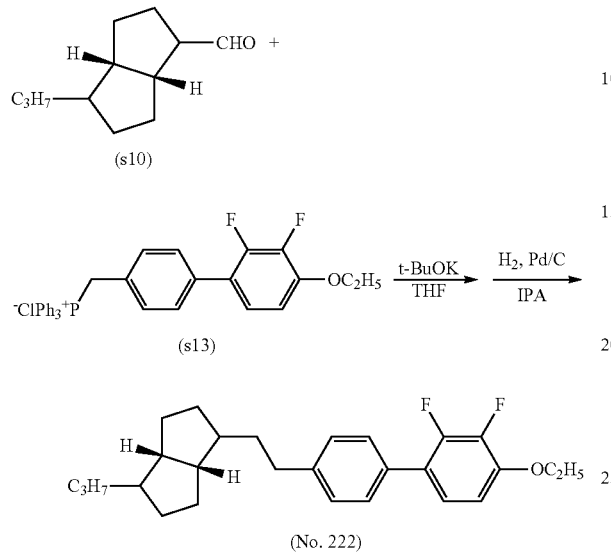

Example 5

Preparation of the Compound (No. 447)

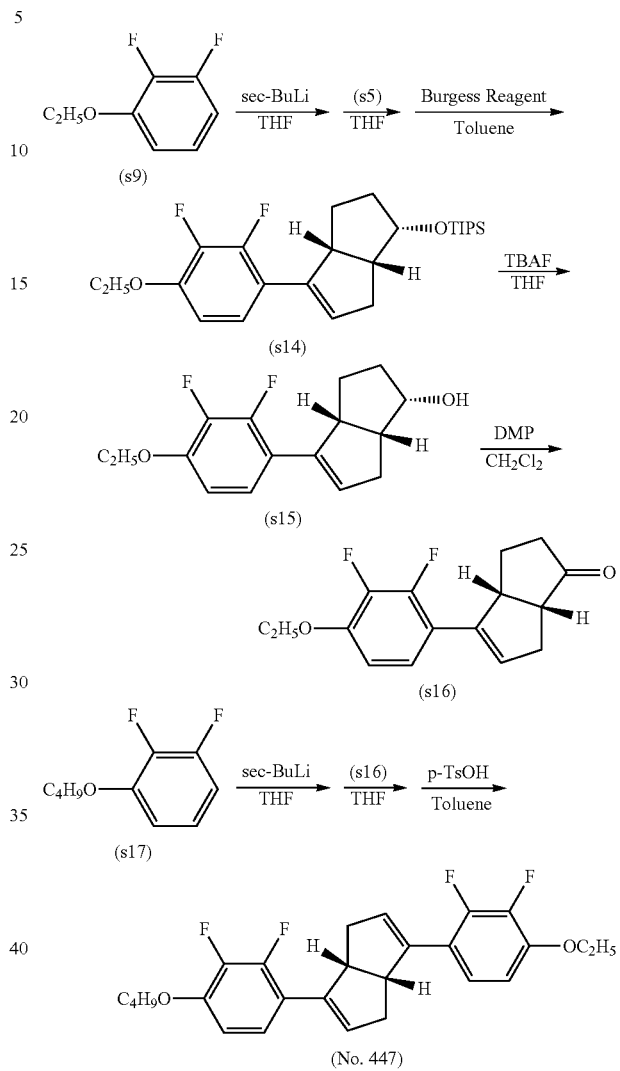

First Step:

Well-dried the compound (s13) (7.6 g) in a THF (100 ml) solution was cooled to −10° C. under an atmosphere of nitrogen. Potassium tert-butoxide (1.6 g) was added in two portions in the temperature range of −10° C. to −5° C. After the reaction mixture had been stirred at −10° C. for 60 minutes, the compound (s10) (2.1 g) in a THF (30 ml) solution was added dropwise in the temperature range of −10° C. to −5° C. The stirring was continued for another 2 hours while the mixture was allowed to come to room temperature. The reaction mixture was poured into water, and the mixture was extracted with toluene. The combined organic layers were washed with water, and then dried over anhydrous magnesium sulfate. The solution was concentrated under reduced pressure, and the residue was purified by silica gel chromatography (toluene). Pd/C (0.2 g) was added to the product in a 2-propanol (50 ml) solution, and the mixture was stirred at room temperature under a hydrogen atmosphere until hydrogen absorption had ceased. After the completion of the reaction, Pd/C was filtered off, and then the solvent was distilled off. The residue was purified by silica gel chromatography (toluene), and further purified by recrystallization from Solmix A-11 to give the compound (No. 222) (0.95 g; 19.8%).

$^1$H-NMR (δ ppm; CDCl$_3$): 7.41 (d, 2H), 7.25 (d, 2H), 7.08 (td, 1H), 6.78 (t, 1H), 4.15 (q, 2H), 2.66 (m, 2H), 2.45-2.23 (m, 2H), 2.00 (m, 1H), 1.86-1.44 (m, 12H), 1.23-0.95 (m, 4H) and 0.90 (m, 5H).

The physical properties of the compound (No. 222) were as follows. Transition temperature: C 45.2 N 57.4 I. $T_{NI}$=53.3° C.; Δn=0.104; Δ∈=−3.98.

First Step:

The compound (s9) (6.9 g) and THF (100 ml) were placed in a reaction vessel under an atmosphere of nitrogen, and cooled to −74° C. sec-Butyllithium (1.00 M; n-hexane/cyclohexane solution (1/19 by volume); 48 ml) was added dropwise in the temperature range of −74° C. to −70° C., and the stirring was continued for another 2 hours. 3-Triisopropoxy-cis-4,8-bicyclo[3.3.0]octan-7-one (s5) (11.8 g) in a THF (50 ml) solution was added dropwise in the temperature range of −75° C. to −70° C., and the stirring was continued for another 8 hours while the mixture was allowed to come to 25° C. The reaction mixture was poured into an aqueous solution of ammonium chloride, and then the mixture was extracted with ethyl acetate. The combined organic layers were washed with water, a saturated aqueous solution of sodium hydrogencarbonate and water, and then dried over anhydrous magnesium sulfate. The solution was concentrated under reduced pressure. (Methoxycarbonylsulfamoyl)triethylammonium hydroxide inner salt (Burgess reagent; 10.0 g) and toluene (100 ml) were added to the residue, and the mixture was stirred at 50° C. for 2 hours. The reaction mixture was cooled to 30° C., and poured into water, and then the mixture was extracted with toluene. The combined organic layers were washed with a saturated aqueous solution of sodium hydrogencarbonate and water, and then dried over anhydrous magnesium sulfate. The solution was concentrated under reduced pressure, and the residue was purified by silica gel chromatography (toluene) to give the compound (s14) (11.9 g; 68.5%).

Second Step:

The compound (s14) (11.9 g) and THF (50 ml) were placed in a reaction vessel under an atmosphere of nitrogen, and cooled to 0° C. Tetrabutylammonium fluoride (TBAF; 54.5 ml) was added dropwise, and the stirring was continued for another 8 hours while the mixture was allowed to come to room temperature. The reaction mixture was poured into water, and the mixture was extracted with ethyl acetate. The combined organic layers were washed with water and brine, and then dried over anhydrous magnesium sulfate. The solution was concentrated under reduced pressure, and the residue was purified by silica gel chromatography (by volume, toluene:ethyl acetate=9:1) to give the compound (s15) (7.4 g; 96.9%).

Third Step:

The compound (s15) (13.4 g) and methylene chloride (100 ml) were placed in a reaction vessel under an atmosphere of nitrogen, and cooled to 0° C. DMP (13.4 g) was added in three portions, and the stirring was continued for another 2 hours while the mixture was allowed to come to room temperature. A saturated aqueous solution of sodium hydrogencarbonate and a saturated aqueous solution of sodium sulfite were poured into the reaction mixture, and the mixture was extracted with ethyl acetate. The combined organic layers were washed with water and brine, and then dried over anhydrous magnesium sulfate. The solution was concentrated under reduced pressure, and the residue was purified by silica gel chromatography (by volume, toluene: ethyl acetate=9:1) to give the compound (s16) (7.3 g; 99.4%).

Fourth Step:

4-Butoxy-2,3-difluorobenzene (s17) (5.4 g) and THF (100 ml) were placed in a reaction vessel under an atmosphere of nitrogen, and cooled to −74° C. sec-Butyllithium (1.00M; n-hexane/cyclohexane solution; 33 ml) was added dropwise in the temperature range of −74° C. to −70° C., and the stirring was continued for another 2 hours. The compound (s16) (7.3 g) in a THF (50 ml) solution was added dropwise in the temperature range of −75° C. to −70° C., and the stirring was continued for another 8 hours while the mixture was allowed to come to 25° C. The reaction mixture was poured into an aqueous solution of ammonium chloride, and then the mixture was extracted with ethyl acetate. The combined organic layers were washed with water, a saturated aqueous solution of sodium hydrogencarbonate and water, and then dried over anhydrous magnesium sulfate. The solution was concentrated under reduced pressure. p-Toluenesulfonic acid (p-TsOH, 0.2 g) and toluene (100 ml) was added to the residue, and the mixture was heated to reflux for 2 hours. The reaction mixture was cooled to 30° C., and poured into water, and then the mixture was extracted with toluene. The combined organic layers were washed with a saturated aqueous solution of sodium hydrogencarbonate and water, and then dried over anhydrous magnesium sulfate. The solution was concentrated under reduced pressure, and the residue was purified by silica gel chromatography (toluene), and further purified by recrystallization from Solmix A-11 to give the compound (No. 447) (6.8 g; 68.5%).

$^1$H-NMR (δ ppm; CDCl$_3$): 6.98 (tt, 2H), 6.70 (td, 2H), 6.05 (s, 2H), 4.13 (q, 2H), 4.05 (t, 2H), 4.00 (m, 2H), 2.86 (m, 2H), 2.37 (m, 1H), 2.34 (m, 1H), 1.81 (m, 2H), 1.52 (m, 2H), 1.46 (t, 3H) and 0.98 (t, 3H).

The physical properties of the compound (No. 447) were as follows. Transition temperature: C 113.4 N 123.3 I. T$_{NI}$=112.6° C.; Δn=0.202; Δ∈=−7.67.

Example 6

Preparation of the Compound (No. 407)

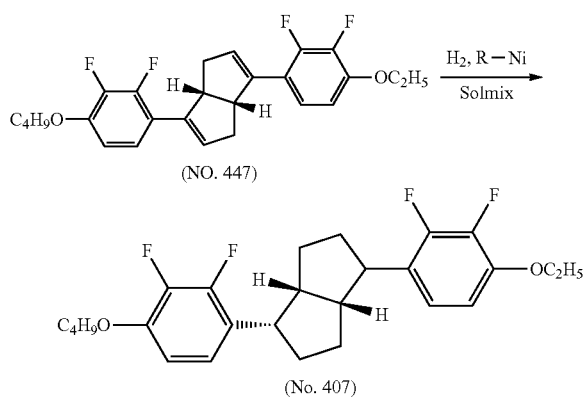

First Step:

Raney nickel (0.6 g) was added to the compound (No. 447) (5.8 g) in a 2-propanol (100 ml) solution, and the mixture was stirred at room temperature under a hydrogen atmosphere until hydrogen absorption had ceased. After the completion of the reaction, Raney nickel was filtered off, and then the solvent was distilled off. The residue was purified by silica gel chromatography (toluene), and further purified by recrystallization from Solmix A-11 to give the compound (No. 407) (3.0 g; 51.3%).

$^1$H-NMR (δ ppm; CDCl$_3$): 6.85 (t, 2H), 6.67 (t, 2H), 4.11 (q, 2H), 4.03 (t, 2H), 3.37 (m, 2H), 3.09 (m, 2H), 1.80 (m, 2H), 1.74 (m, 2H), 1.63 (m, 2H), 1.54-1.43 (m, 7H), 1.21 (m, 2H) and 0.98 (t, 3H).

The physical properties of the compound (No. 407) were as follows. Transition temperature: C 97.8 I. T$_{NI}$=27.3° C.; Δn=0.074; Δ∈=−12.69.

Example 7

The following compounds were prepared from the corresponding starting materials according to the synthetic methods shown in Examples 1 to 6.

The Compound (No. 122)

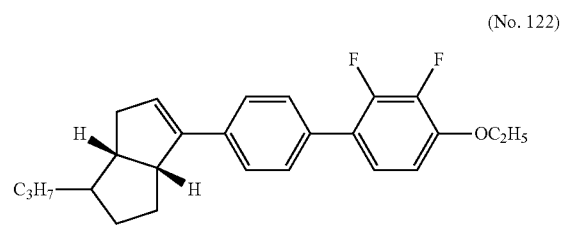

$^1$H-NMR (δ ppm; CDCl$_3$): 7.49 (d, 2H), 7.45 (d, 2H), 7.10 (t, 1H), 6.79 (t, 1H), 6.14 (s, 1H), 5.36 (m, 1H), 4.15 (q, 2H), 3.57 (m, 1H), 2.94 (quin, 1H), 2.48-2.31 (m, 2H), 1.96 (m, 1H), 1.85-1.70 (m, 1H), 1.63 (m, 1H), 1.48 (t, 3H), 1.42-1.27 (m, 4H), 1.27-1.08 (m, 1H) and 0.93 (t, 3H).

The physical properties of the compound (No. 122) were as follows. Transition temperature: $S_B$ 57.2 N 147.1 I. $T_{NI}$=138.6° C.; Δn=0.220; Δ∈=−5.67.

The Compound (No. 102)

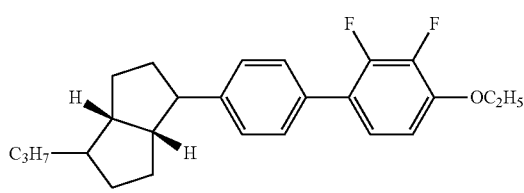

(No. 102)

$^1$H-NMR (δ ppm; CDCl$_3$): 7.42 (d, 2H), 7.28 (d, 2H), 7.09 (td, 1H), 6.78 (t, 1H), 4.14 (q, 2H), 3.29 (m, 1H), 2.86 (m, 1H), 2.61 (m, 1H), 1.93 (m, 2H), 1.74-1.55 (m, 4H), 1.47 (t, 3H), 1.43-1.28 (m, 5H), 1.15 (m, 1H), 1.12 (m, 1H) and 0.92 (t, 3H).

The physical properties of the compound (No. 102) were as follows. Transition temperature: C 98.0 N 100.2 I. $T_{NI}$=98.6° C.; Δn=0.160; Δ∈=−4.68.

The Compound (No. 242)

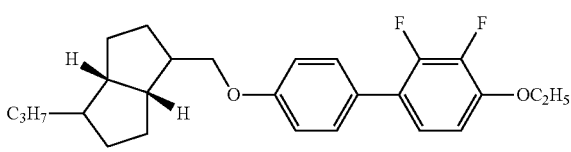

(No. 242)

$^1$H-NMR (δ ppm; CDCl$_3$): 7.42 (d, 2H), 7.05 (t, 1H), 6.96 (d, 2H), 6.77 (t, 1H), 4.13 (q, 2H), 4.00 (m, 1H), 3.90 (t, 1H), 2.45 (quin, 1H), 2.18 (q, 1H), 1.91 (m, 1H), 1.83 (m, 1H), 1.74 (m, 1H), 1.68-1.56 (m, 4H), 1.47 (t, 3H), 1.38-1.11 (m, 7H) and 0.91 (t, 3H).

The physical properties of the compound (No. 242) were as follows. Transition temperature: C 66.8 N 105.4 I. $T_{NI}$=103.9° C.; Δn=0.158; Δ∈=−4.98.

The Compound (No. 362)

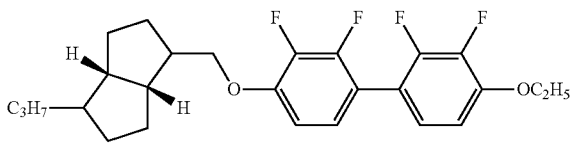

(No. 362)

$^1$H-NMR (δ ppm; CDCl$_3$): 7.00 (m, 2H), 6.79 (m, 2H), 4.16 (q, 2H), 4.08 (q, 1H), 4.00 (t, 1H), 2.46 (quin, 1H), 2.19 (q, 1H), 1.96-1.82 (m, 2H), 1.75 (m, 1H), 1.58-1.52 (m, 4H), 1.48 (t, 3H), 1.38-1.11 (m, 7H) and 0.91 (t, 3H).

The physical properties of the compound (No. 362) were as follows. Transition temperature: C 86.6 (N 75.1) I. $T_{NI}$=71.3° C.; Δn=0.142; Δ∈=−10.75.

The Compound (No. 382)

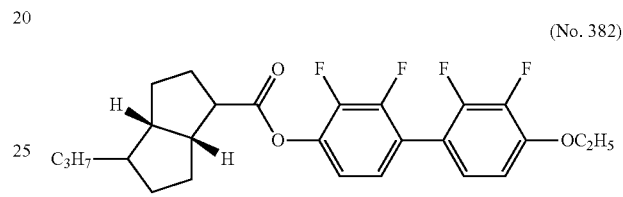

(No. 382)

$^1$H-NMR (δ ppm; CDCl$_3$): 7.11 (t, 1H), 7.03 (t, 1H), 6.99 (t, 1H), 6.81 (t, 1H), 4.17 (q, 2H), 2.83 (q, 1H), 2.59 (quin, 1H), 2.54 (m, 1H), 2.09 (m, 1H), 1.85-1.68 (m, 3H), 1.65 (quin, 2H), 1.49 (t, 3H), 1.35 (m, 5H), 1.27-1.14 (m, 2H) and 0.92 (t, 3H).

The physical properties of the compound (No. 382) were as follows. Transition temperature: C 70.1 N 102.4 I. $T_{NI}$=91.3° C.; Δn=0.134; Δ∈=−7.89.

Example 8

The compounds (No. 1) to (No. 460) shown below can be prepared by synthetic methods similar to those described in Examples 1 to 7. Appended data were obtained according to the methods described above. A compound itself was used as a sample when the transition temperature was measured. A mixture of the compound (15% by weight) and the mother liquid crystals (i) (85% by weight) was used as a sample when maximum temperature ($T_{NI}$), optical anisotropy (Δn) and dielectric anisotropy (Δ∈) were measured. The extrapolated values calculated from these measured values according to the extrapolation described above were reported herein. Incidentally, each compound (15% by weight) prepared was well soluble in the mother liquid crystals (i) (85% by weight).

| No. |  |
|---|---|
| 1 | 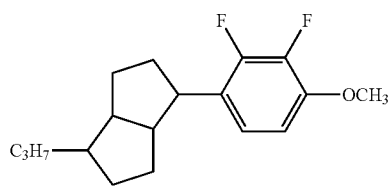 |

| No. | |
|---|---|
| 2 | 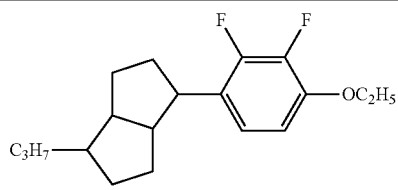
C 40.7 I
$T_{NI}$; −52.7° C., Δ ε; −3.79, Δ n; 0.038 |
| 3 | 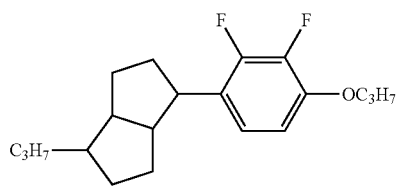 |
| 4 | 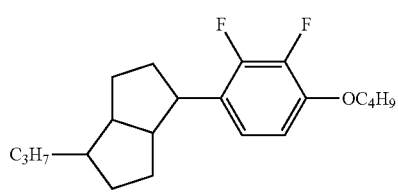 |
| 5 | 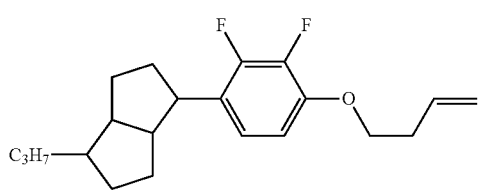 |
| 6 | 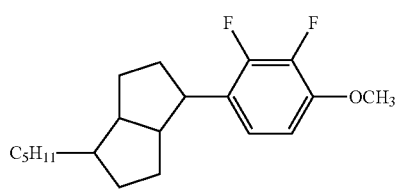 |
| 7 | 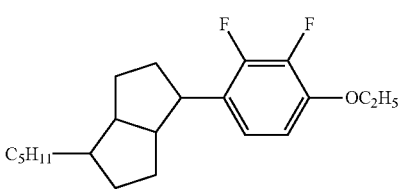 |
| 8 | 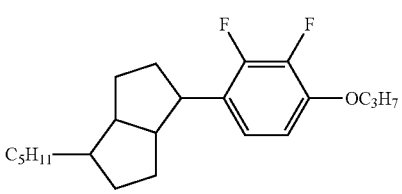 |
| 9 | 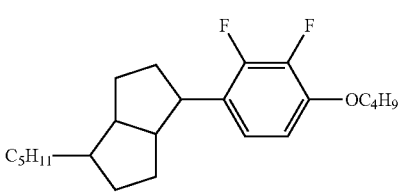 |

-continued
| No. | |
|---|---|
| 10 | 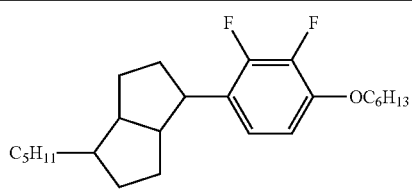 |
| 11 | 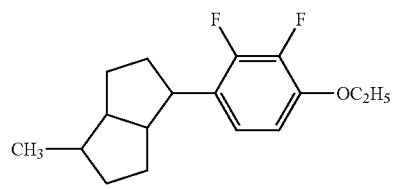 [SMILES: CCOc1ccc(C2CCC3C(C)CCC23)c(F)c1F] |
| 12 | 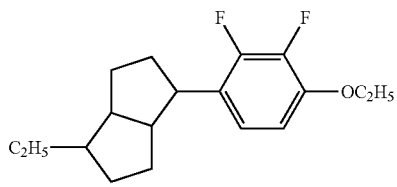 |
| 13 | 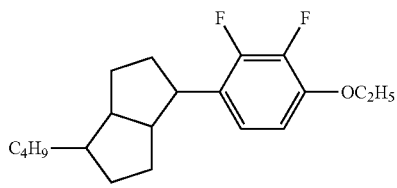 |
| 14 | 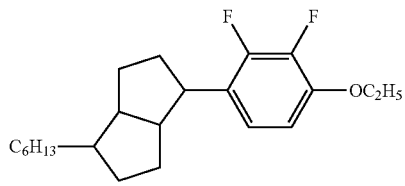 |
| 15 | 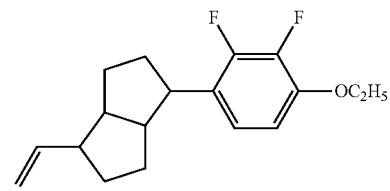 |
| 16 | 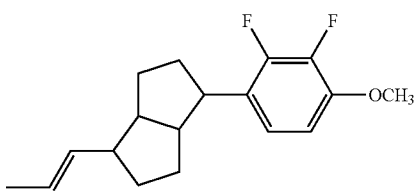 [SMILES: C/C=C/C1CCC2C(c3ccc(OC)c(F)c3F)CCC12] |
| 17 | 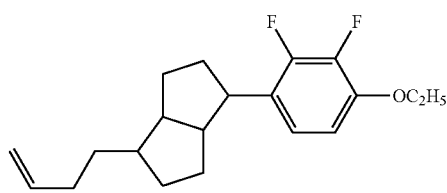 [SMILES: C=CCCC1CCC2C(c3ccc(OCC)c(F)c3F)CCC12] |

-continued
| No. | |
|---|---|
| 18 | 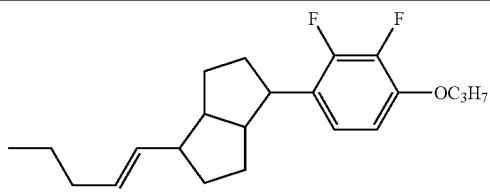 |
| 19 | 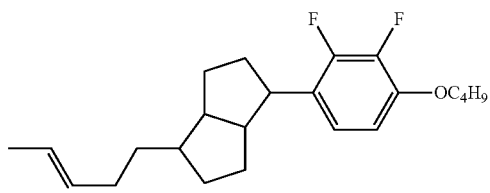 |
| 20 | 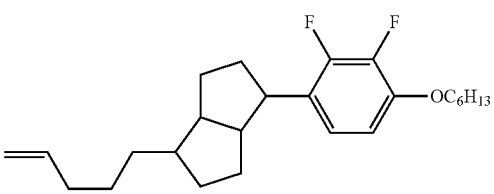 |
| 21 | 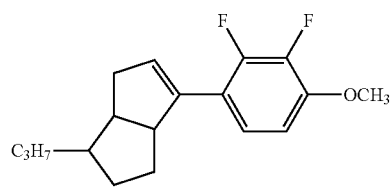 |
| 22 | 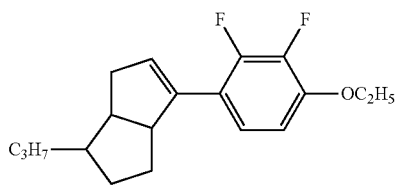 |
C 45.6 I
$T_{NI}$; 15.3° C., $\Delta \epsilon$; −6.26, $\Delta$ n; 0.115
| 23 | 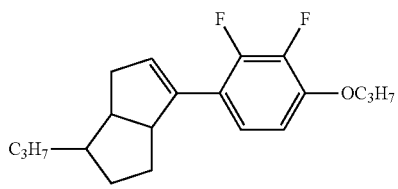 |
|---|---|
| 24 | 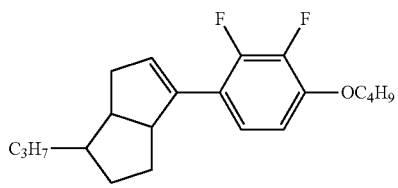 |
| 25 | 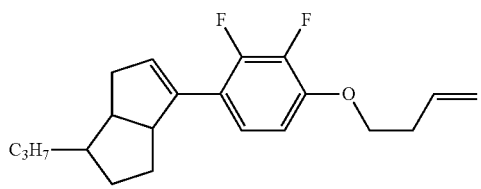 |

-continued
| No. | |
|---|---|
| 26 | 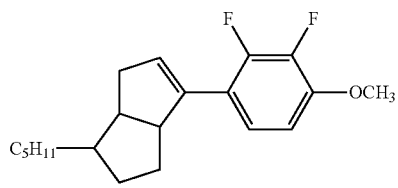 |
| 27 | 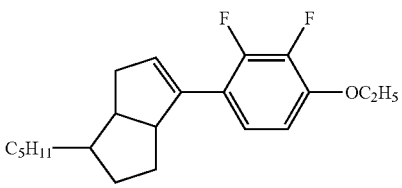 |
| 28 | 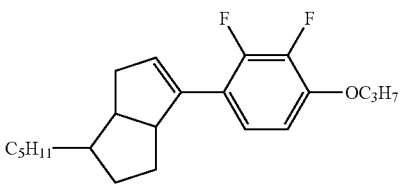 |
| 29 | 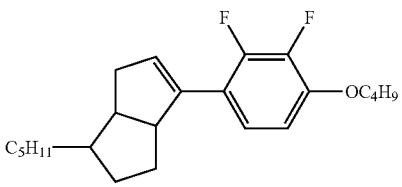 |
| 30 | 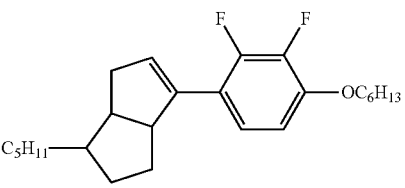 |
| 31 | 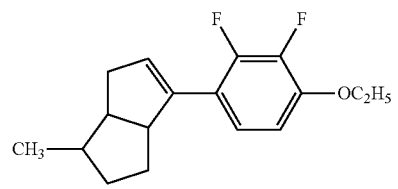 [SMILES: CCOc1ccc(C2=CCC3C(C)CCC23)c(F)c1F] |
| 32 | 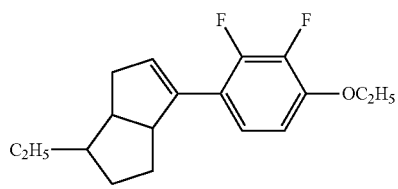 |
| 33 | 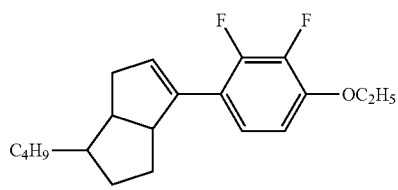 |

| No. | |
|---|---|
| 34 | 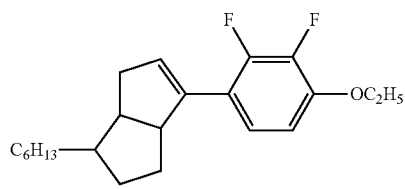 |
| 35 | 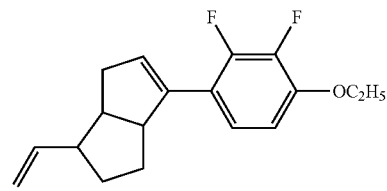 [SMILES: C=CC1CCC2C(c3ccc(OCC)c(F)c3F)=CCC12] |
| 36 | 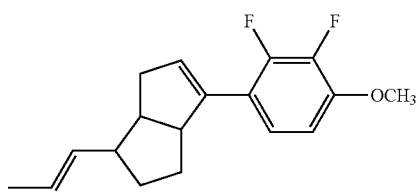 [SMILES: C/C=C/C1CCC2C(c3ccc(OC)c(F)c3F)=CCC12] |
| 37 | 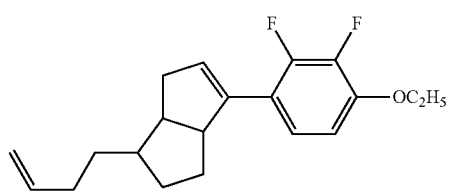 [SMILES: C=CCCC1CCC2C(c3ccc(OCC)c(F)c3F)=CCC12] |
| 38 | 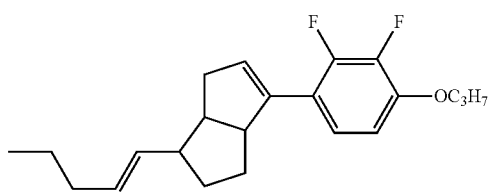 |
| 39 | 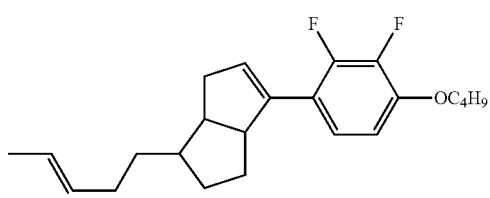 |
| 40 | 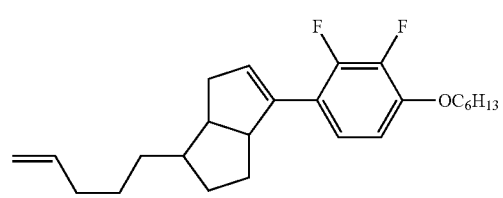 |
| 41 | 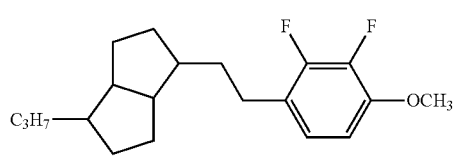 |

-continued
| No. | |
|---|---|
| 42 | 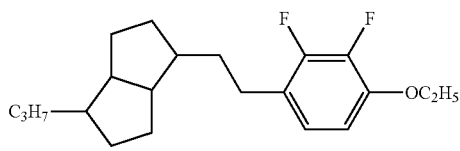 |
| 43 | 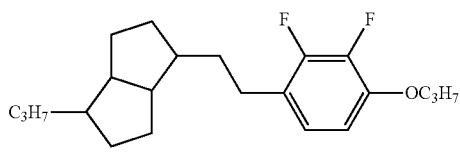 |
| 44 | 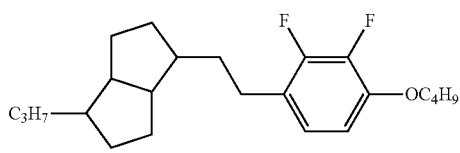 |
| 45 | 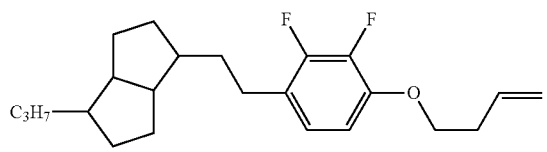 |
| 46 | 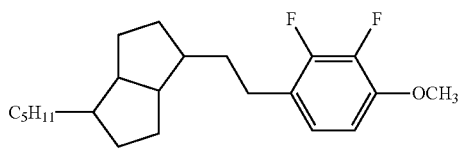 |
| 47 | 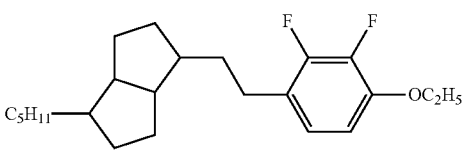 |
| 48 | 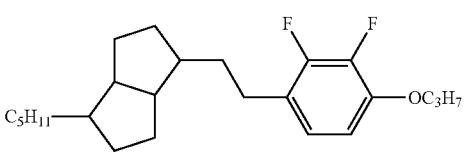 |
| 49 | 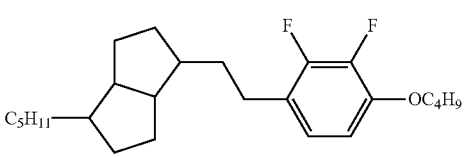 |
| 50 | 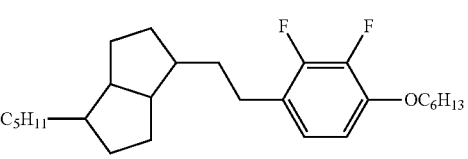 |
| 51 | 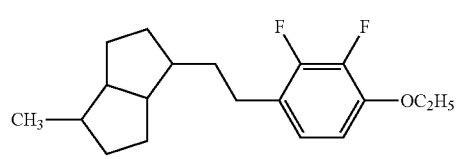 [SMILES: CCOc1ccc(CCC2CCC3C(C)CCC23)c(F)c1F] |

| No. | |
|---|---|
| 52 | 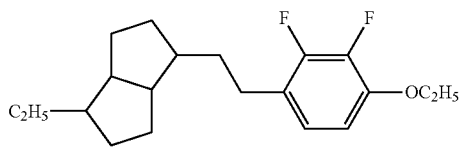 |
| 53 | 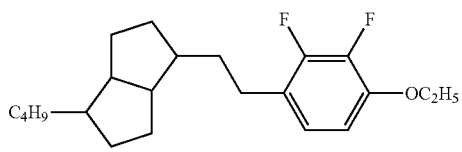 |
| 54 | 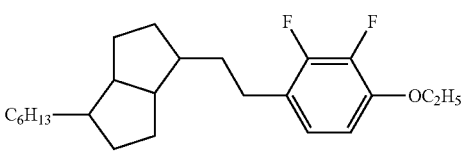 |
| 55 | 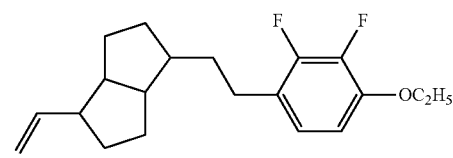 [SMILES: C=CC1CCC2C(CCc3ccc(OCC)c(F)c3F)CCC12] |
| 56 | 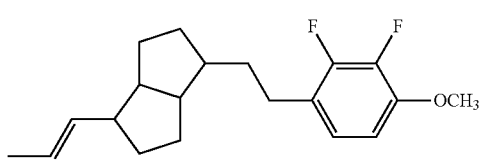 [SMILES: C/C=C/C1CCC2C(CCc3ccc(OC)c(F)c3F)CCC12] |
| 57 | 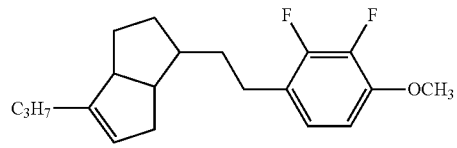 |
| 58 | 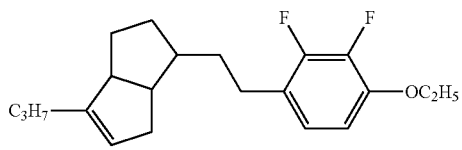 |
| 59 | 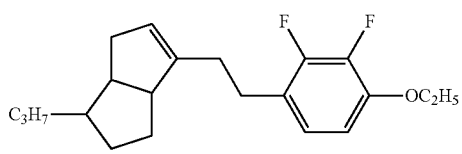 |
| 60 | 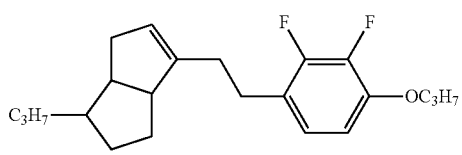 |
| 61 | 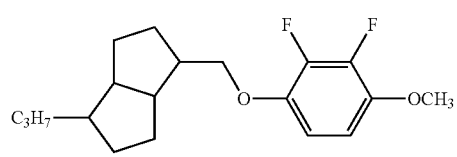 |

-continued
| No. | |
|---|---|
| 62 | 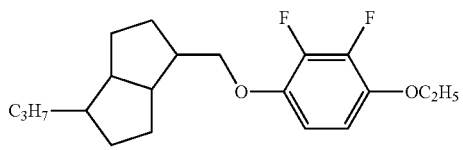 <br> C 48.1 I <br> $T_{NI}$; −19.4° C., $\Delta \epsilon$; −7.17, $\Delta$ n; 0.058 |
| 63 | 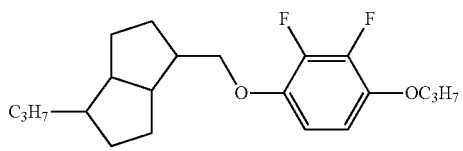 |
| 64 | 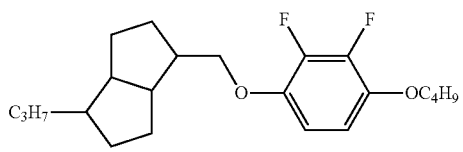 |
| 65 | 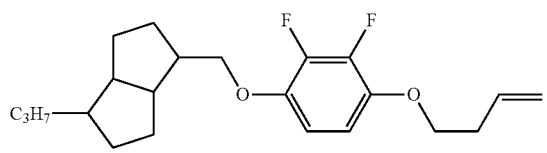 |
| 66 | 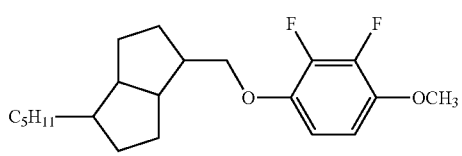 |
| 67 | 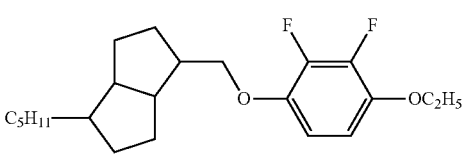 |
| 68 | 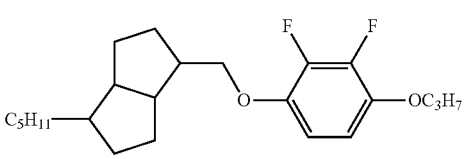 |
| 69 | 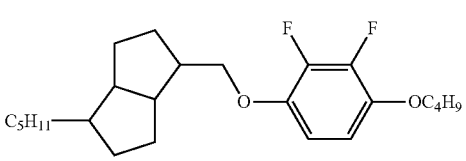 |
| 70 | 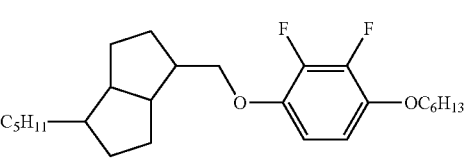 |

-continued
| No. | |
|---|---|
| 71 | 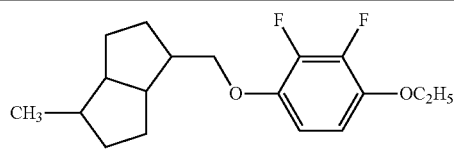 |
| 72 | 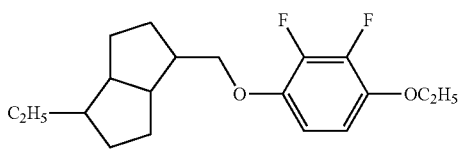 |
| 73 | 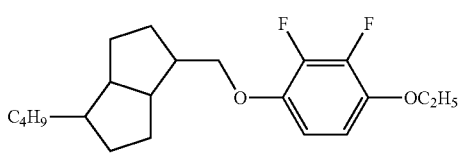 |
| 74 | 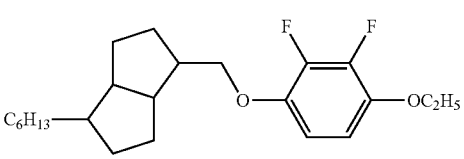 |
| 75 | 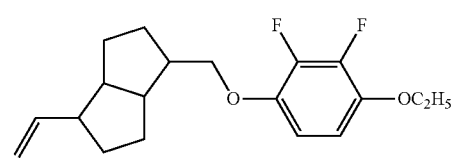 [SMILES: C=CC1CCC2C(COc3ccc(OCC)c(F)c3F)CCC12] |
| 76 | 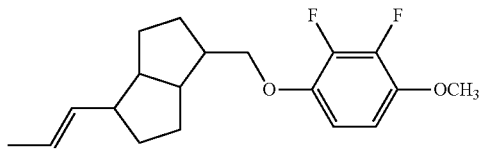 |
| 77 | 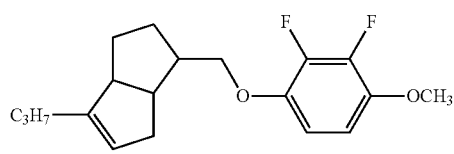 |
| 78 | 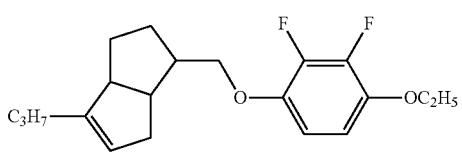 |
| 79 | 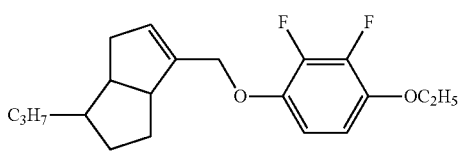 |
| 80 | 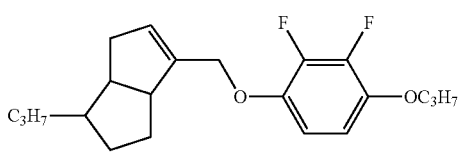 |

-continued
| No. | |
|---|---|
| 81 | 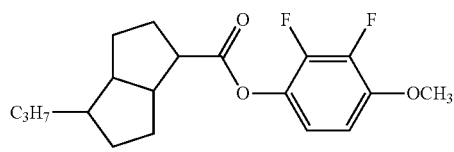 |
| 82 | 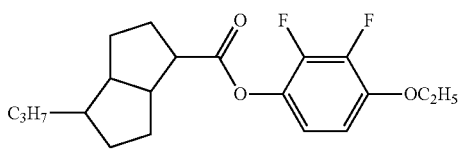 |
| 83 | 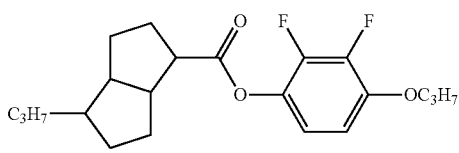 |
| 84 | 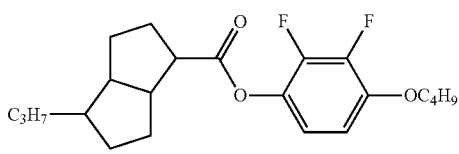 |
| 85 | 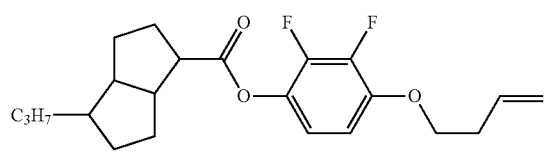 |
| 86 | 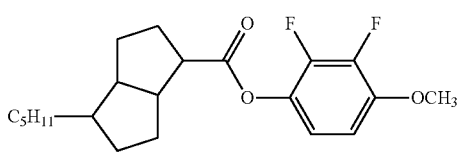 |
| 87 | 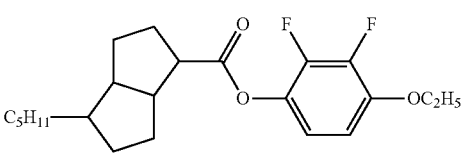 |
| 88 | 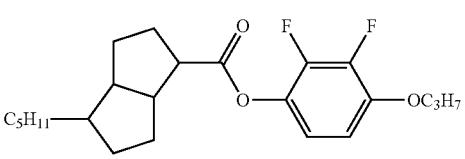 |
| 89 | 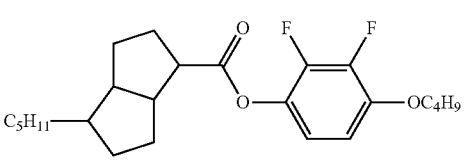 |
| 90 | 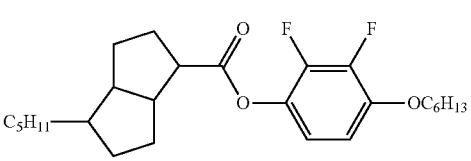 |

| No. | |
|---|---|
| 91 | 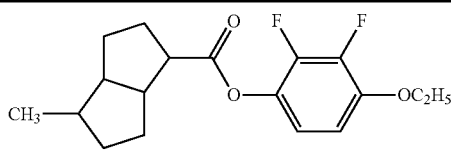 |
| 92 | 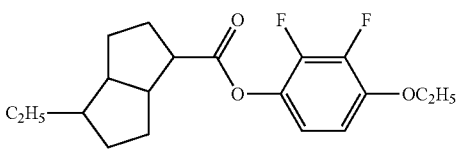 |
| 93 | 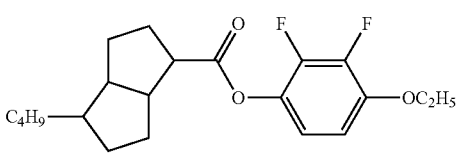 |
| 94 | 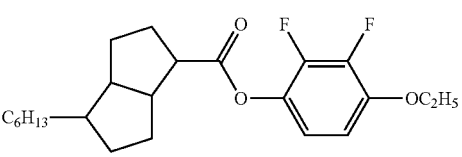 |
| 95 | 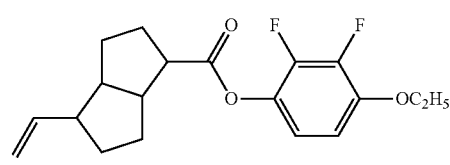 [SMILES: C=CC1CCC2C(C(=O)Oc3ccc(OCC)c(F)c3F)CCC12] |
| 96 | 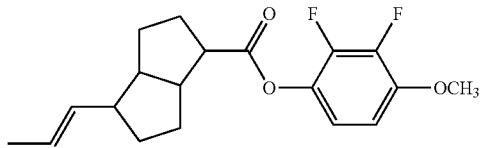 [SMILES: C/C=C/C1CCC2C(C(=O)Oc3ccc(OC)c(F)c3F)CCC12] |
| 97 | 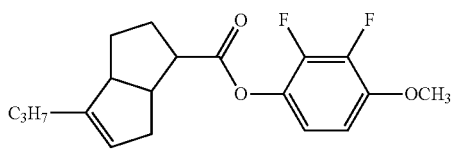 |
| 98 | 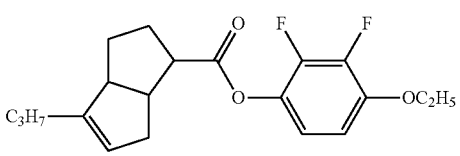 |
| 99 | 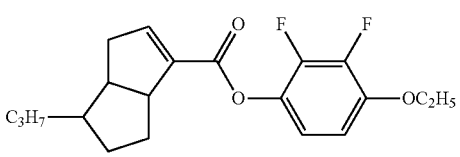 |
| 100 | 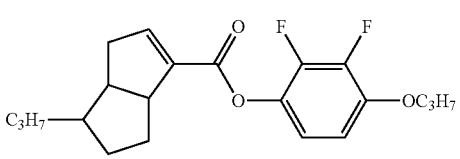 |

| No. | |
|---|---|
| 101 | 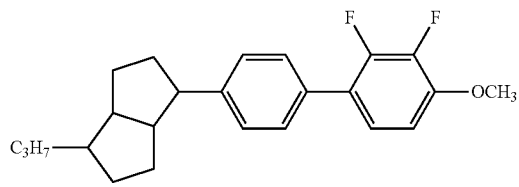 |
| 102 | 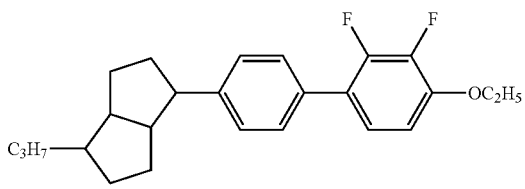
C 98.0 N 100.2 I
T$_{NI}$; 98.6° C., Δ ε; −4.68, Δ n; 0.160 |
| 103 | 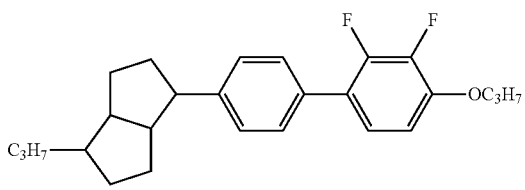 |
| 104 | 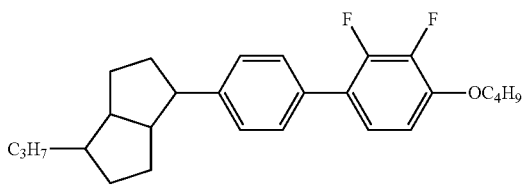 |
| 105 | 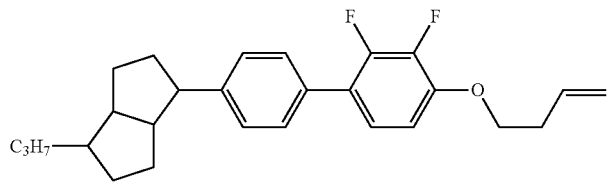 |
| 106 | 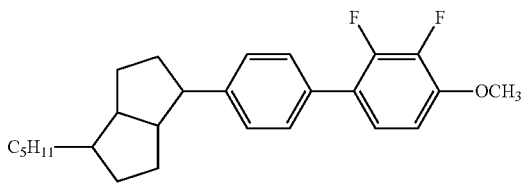 |
| 107 | 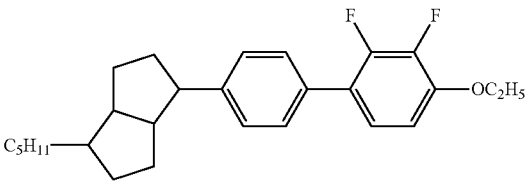 |
| 108 | 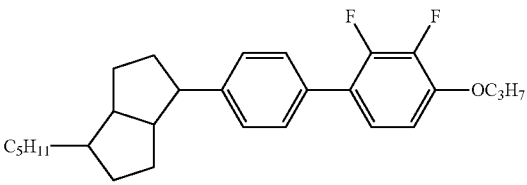 |

-continued
| No. | |
|---|---|
| 109 | 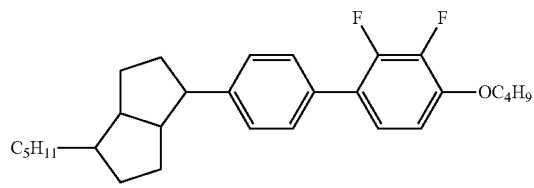 |
| 110 | 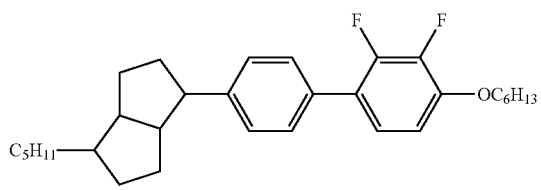 |
| 111 | 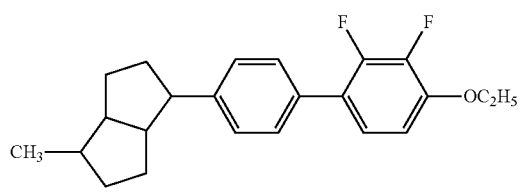 |
| 112 | 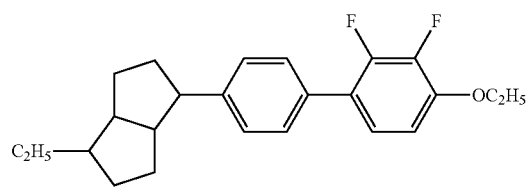 [SMILES: CCOc1ccc(-c2ccc(C3CCC4C(CC)CCC34)cc2)c(F)c1F] |
| 113 | 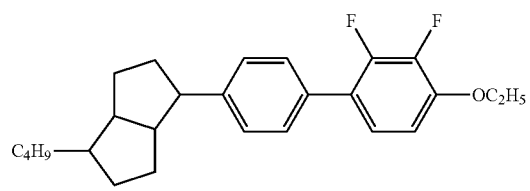 |
| 114 | 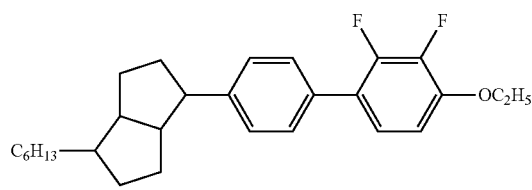 |
| 115 | 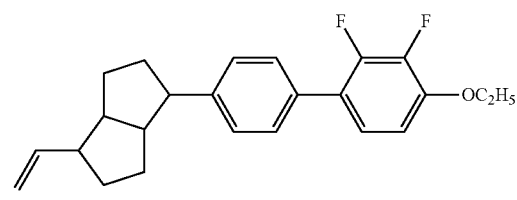 [SMILES: C=CC1CCC2C(c3ccc(-c4ccc(OCC)c(F)c4F)cc3)CCC12] |
| 116 | 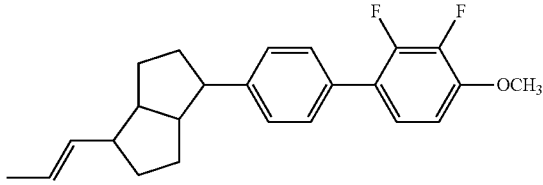 [SMILES: C/C=C/C1CCC2C(c3ccc(-c4ccc(OC)c(F)c4F)cc3)CCC12] |

-continued
| No. | |
|---|---|
| 117 | 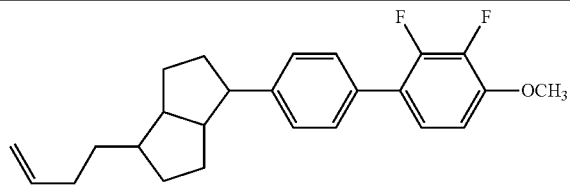 |
| 118 | 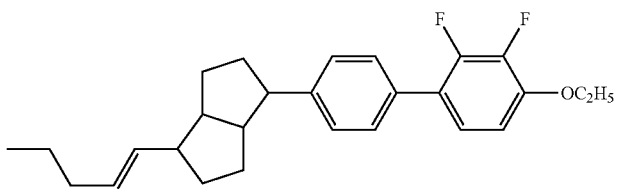 [SMILES: CCC/C=C/C1CCC2C(c3ccc(-c4ccc(OCC)c(F)c4F)cc3)CCC12] |
| 119 | 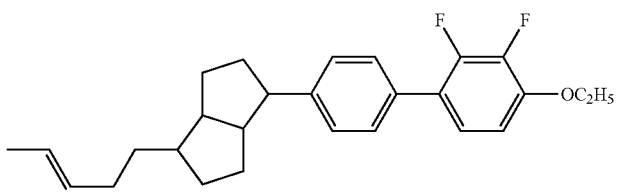 [SMILES: C/C=C/CCC1CCC2C(c3ccc(-c4ccc(OCC)c(F)c4F)cc3)CCC12] |
| 120 | 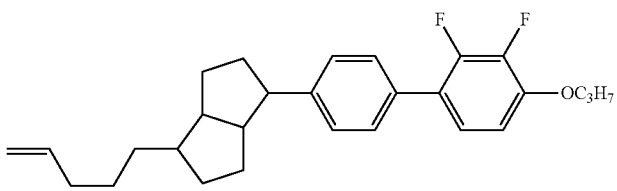 |
| 121 | 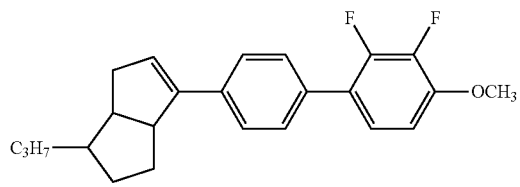 |
| 122 | 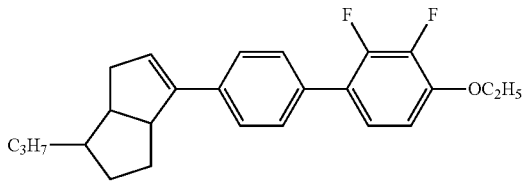<br>$S_B$ 57.2 N 147.1 I<br>$T_{NI}$; 138.6° C., Δ ε; −5.67, Δ n; 0.220 |
| 123 | 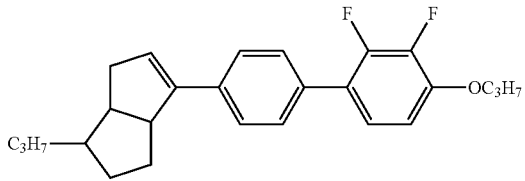 |
| 124 | 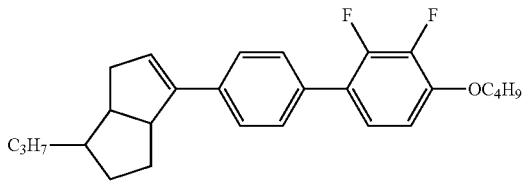 |

| No. | |
|---|---|
| 125 | 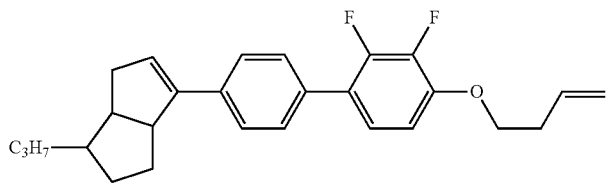 |
| 126 | 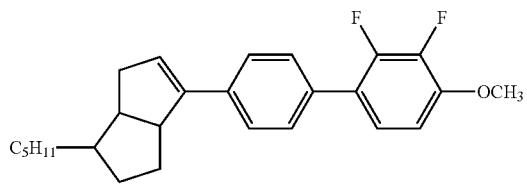 |
| 127 | 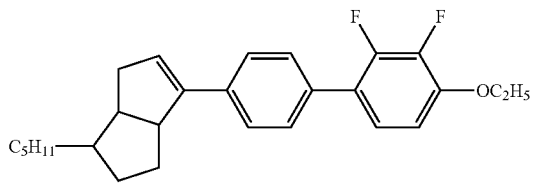 |
| 128 | 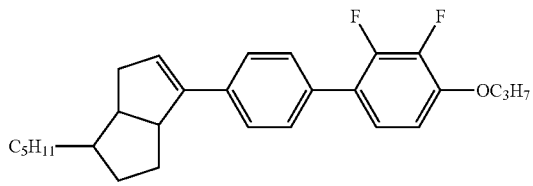 |
| 129 | 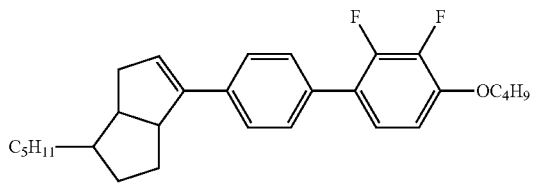 |
| 130 | 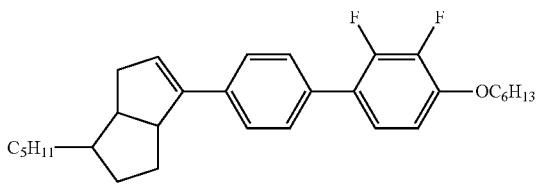 |
| 131 | 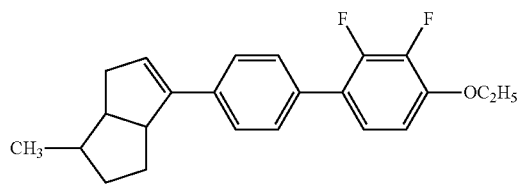 [SMILES: CCOc1ccc(-c2ccc(C3=CCC4C(C)CCC34)cc2)c(F)c1F] |
| 132 | 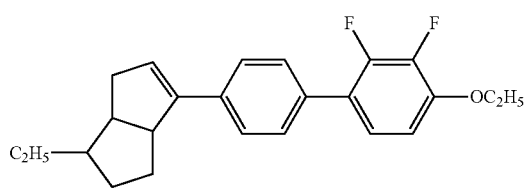 |

-continued
| No. | |
|---|---|
| 133 | 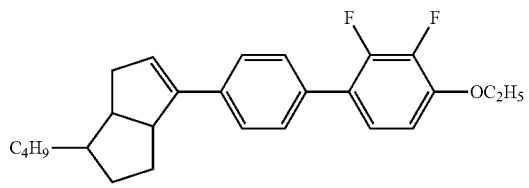 |
| 134 | 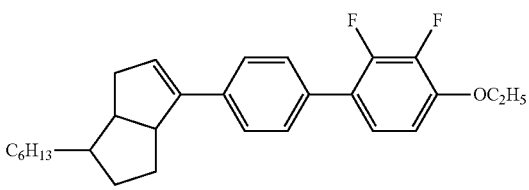 |
| 135 | 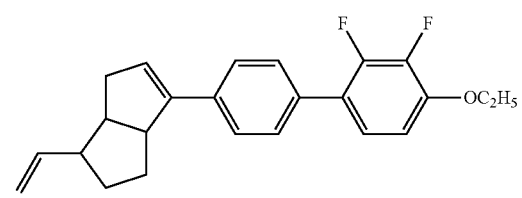 [SMILES: C=CC1CCC2C(c3ccc(-c4ccc(OCC)c(F)c4F)cc3)=CCC12] |
| 136 | 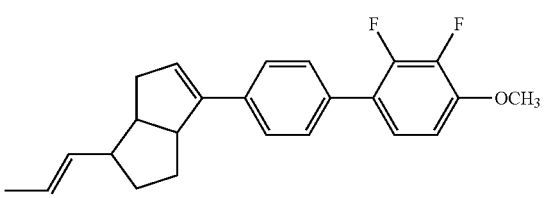 [SMILES: C/C=C/C1CCC2C(c3ccc(-c4ccc(OC)c(F)c4F)cc3)=CCC12] |
| 137 | 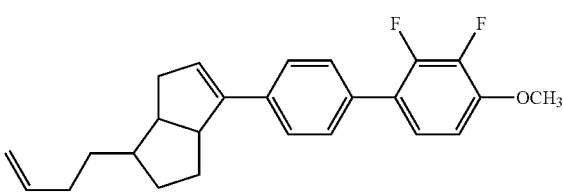 [SMILES: C=CCCC1CCC2C(c3ccc(-c4ccc(OC)c(F)c4F)cc3)=CCC12] |
| 138 | 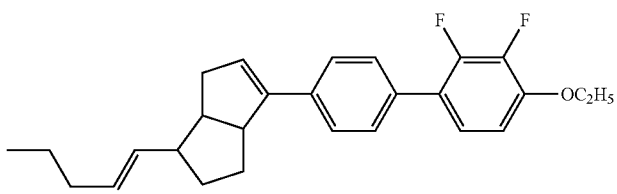 [SMILES: CCC/C=C/C1CCC2C(c3ccc(-c4ccc(OCC)c(F)c4F)cc3)=CCC12] |
| 139 | 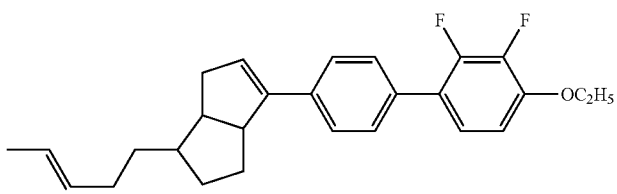 [SMILES: C/C=C/CCC1CCC2C(c3ccc(-c4ccc(OCC)c(F)c4F)cc3)=CCC12] |
| 140 | 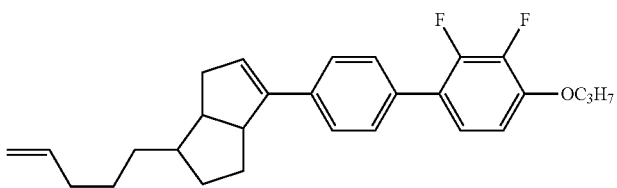 |

-continued
| No. | |
|---|---|
| 141 | 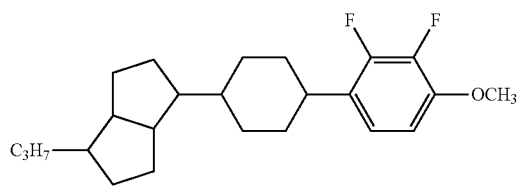 |
| 142 | 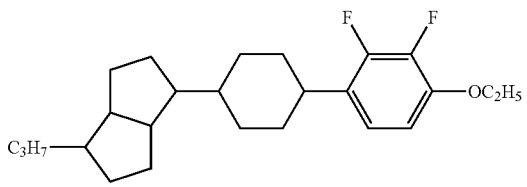 |
| 143 | 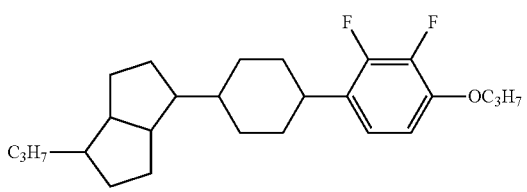 |
| 144 | 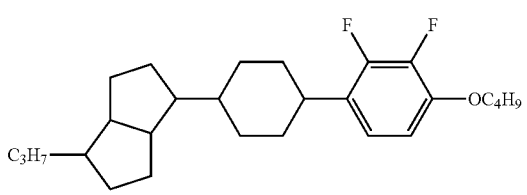 |
| 145 | 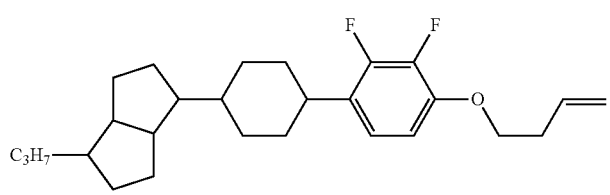 |
| 146 | 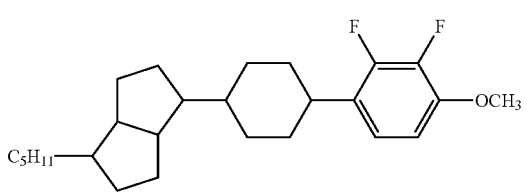 |
| 147 | 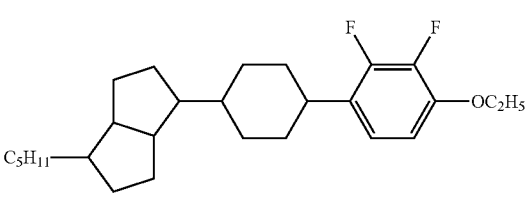 |
| 148 | 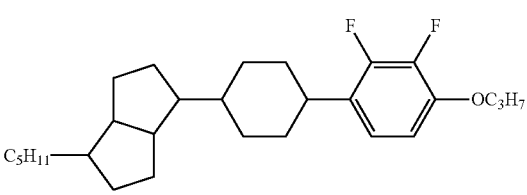 |

-continued
| No. | |
|---|---|
| 149 | 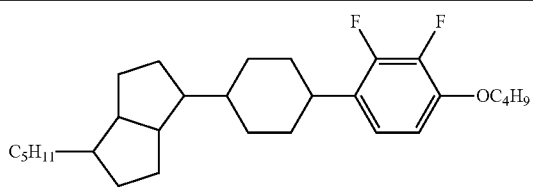 |
| 150 | 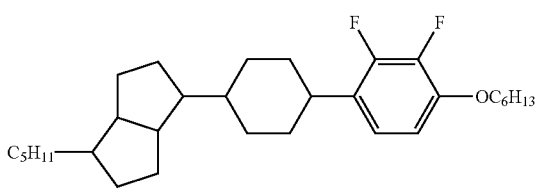 |
| 151 | 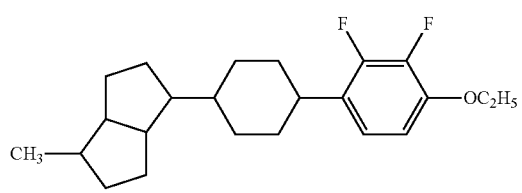 [SMILES: CCOc1ccc(C2CCC(C3CCC4C(C)CCC43)CC2)c(F)c1F] |
| 152 | 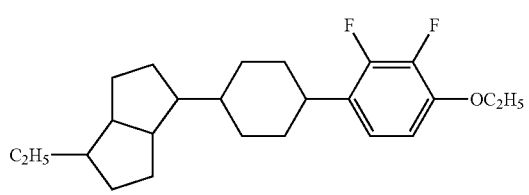 |
| 153 | 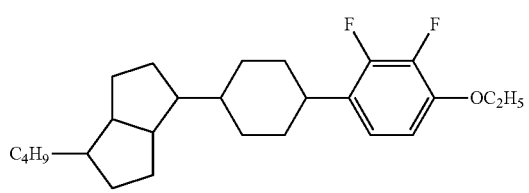 |
| 154 | 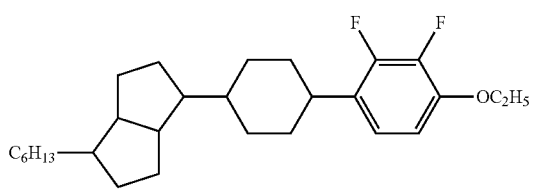 |
| 155 | 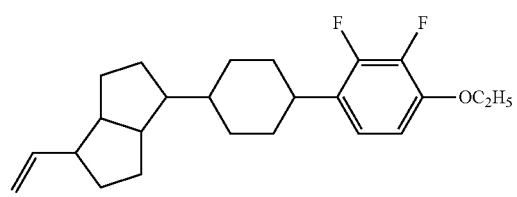 [SMILES: C=CC1CCC2C1CCC2C1CCC(c2ccc(OCC)c(F)c2F)CC1] |
| 156 | 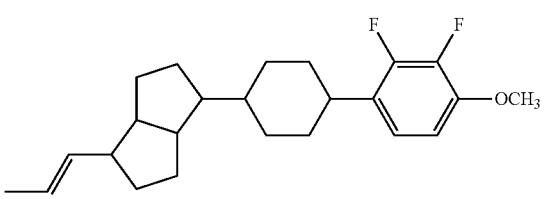 [SMILES: C/C=C/C1CCC2C1CCC2C1CCC(c2ccc(OC)c(F)c2F)CC1] |

-continued
| No. | |
|---|---|
| 157 | 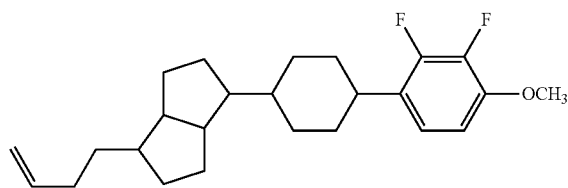 [SMILES: C=CCCC1CCC2C(C3CCC(c4ccc(OC)c(F)c4F)CC3)CCC12] |
| 158 | 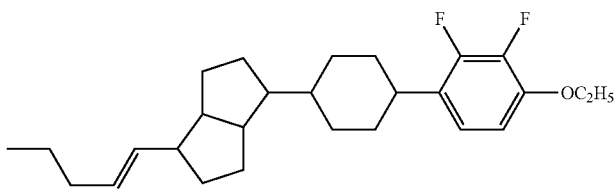 [SMILES: CCC/C=C/C1CCC2C1CCC2C1CCC(c2ccc(OCC)c(F)c2F)CC1] |
| 159 | 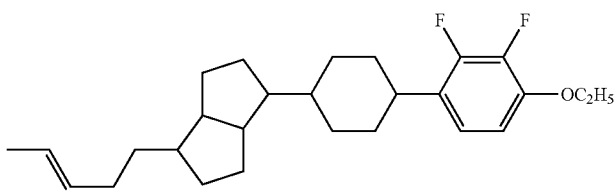 [SMILES: C/C=C/CCC1CCC2C(C3CCC(c4ccc(OCC)c(F)c4F)CC3)CCC12] |
| 160 | 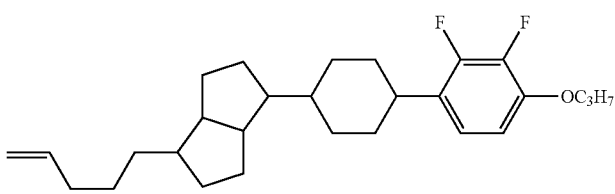 |
| 161 | 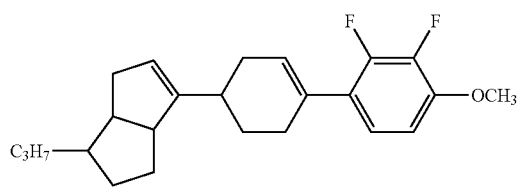 |
| 162 | 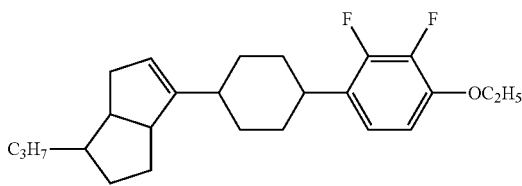 |
| 163 | 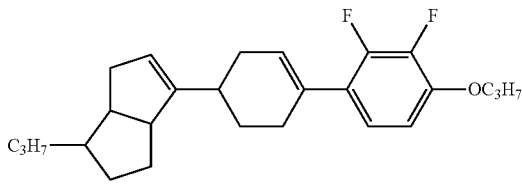 |
| 164 | 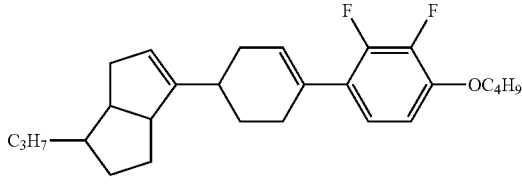 |

-continued
| No. |
|---|
| 165 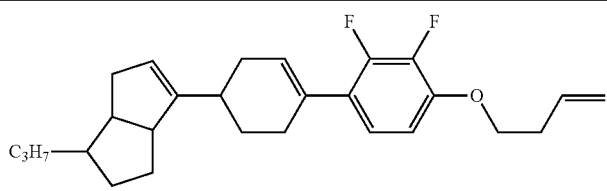 |
| 166 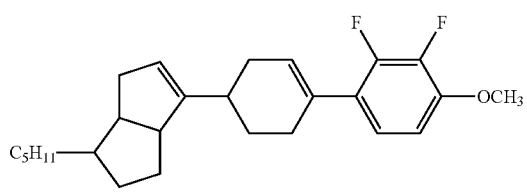 |
| 167 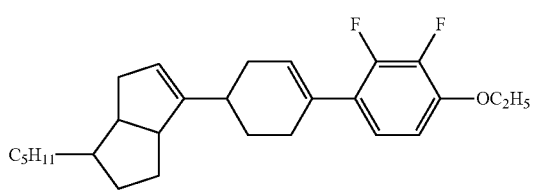 |
| 168 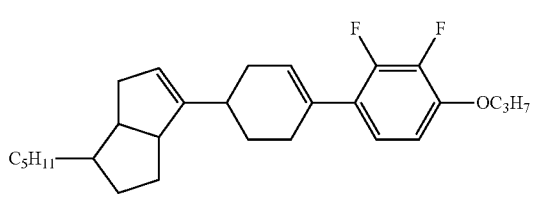 |
| 169 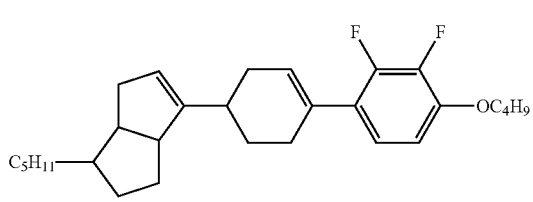 |
| 170 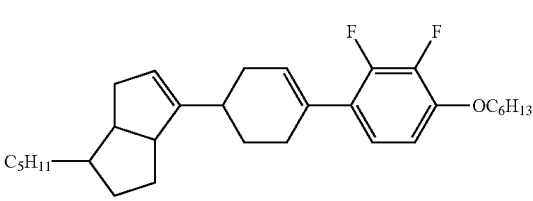 |
| 171 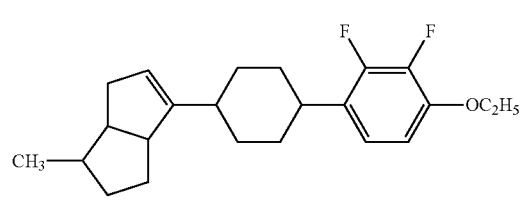 |
| 172 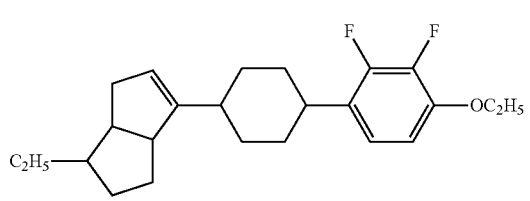 |

| No. |  |
|---|---|
| 173 | 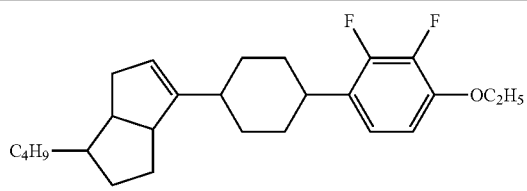 |
| 174 | 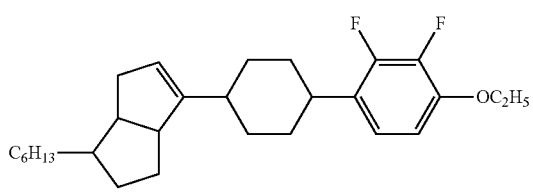 |
| 175 | 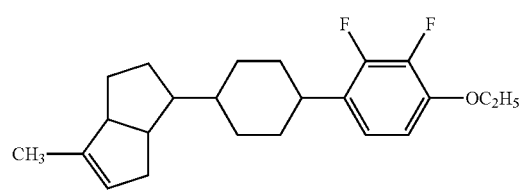 [SMILES: CCOc1ccc(C2CCC(C3CCC4C(C)=CCC43)CC2)c(F)c1F] |
| 176 | 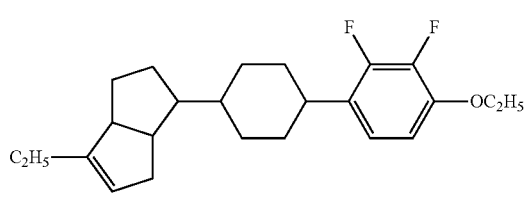 |
| 177 | 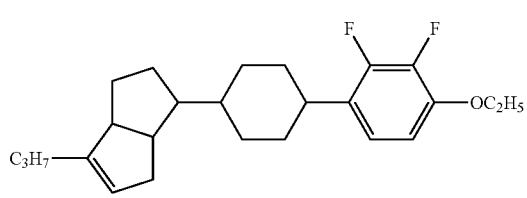 |
| 178 | 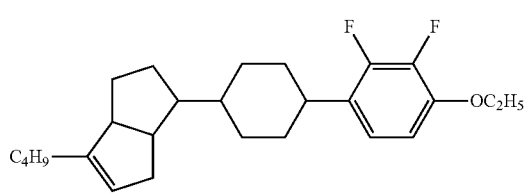 |
| 179 | 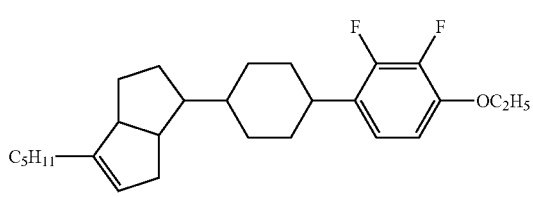 |
| 180 | 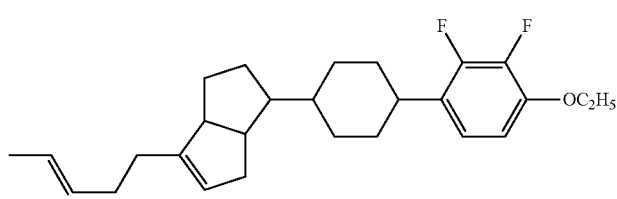 [SMILES: C/C=C/CCC1=CCC2C1CCC2C1CCC(c2ccc(OCC)c(F)c2F)CC1] |

-continued
| No. | |
|---|---|
| 181 | 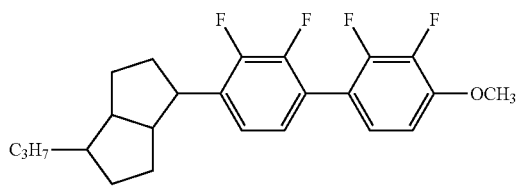 |
| 182 | 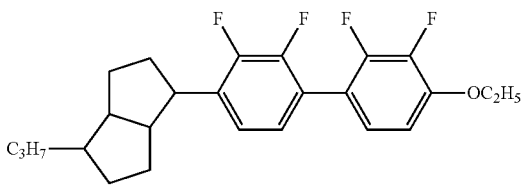 |
| 183 | 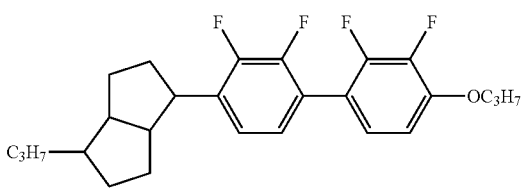 |
| 184 | 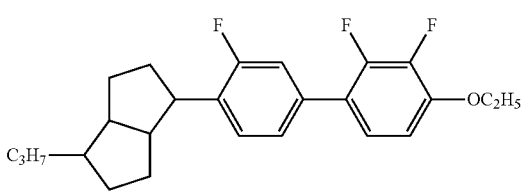 |
| 185 | 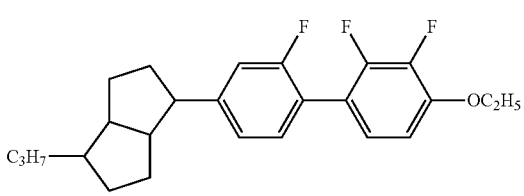 |
| 186 | 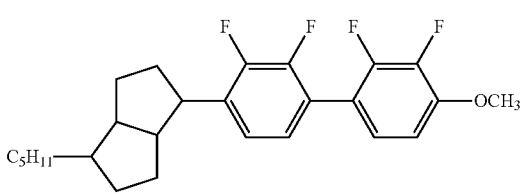 |
| 187 | 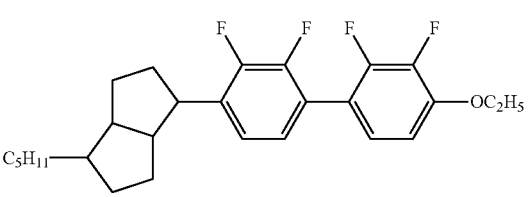 |
| 188 | 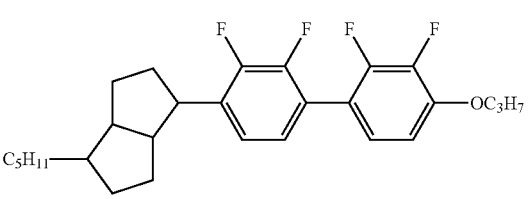 |

| No. | |
|---|---|
| 189 | 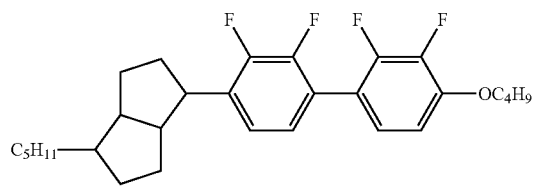 |
| 190 | 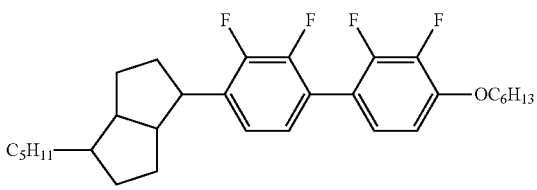 |
| 191 | 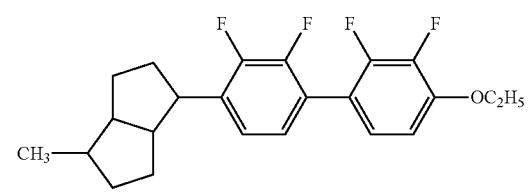 [SMILES: CCOc1ccc(-c2ccc(C3CCC4C(C)CCC34)c(F)c2F)c(F)c1F] |
| 192 | 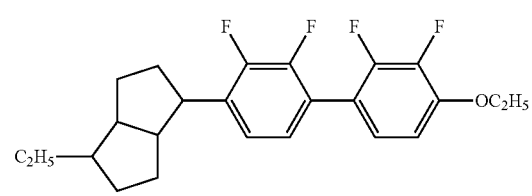 |
| 193 | 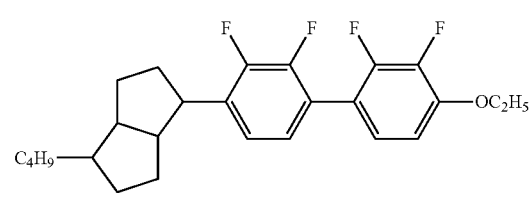 |
| 194 | 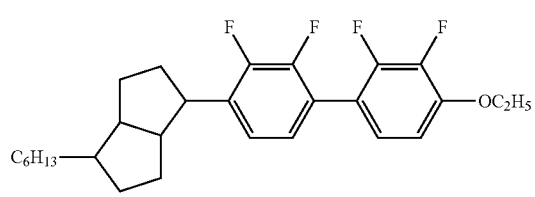 |
| 195 | 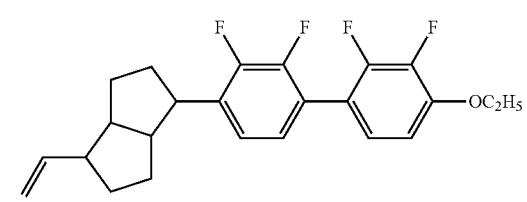 |
| 196 | 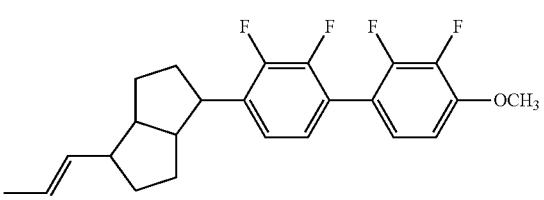 [SMILES: C/C=C/C1CCC2C(c3ccc(-c4ccc(OC)c(F)c4F)c(F)c3F)CCC12] |

-continued
| No. | |
|---|---|
| 197 | 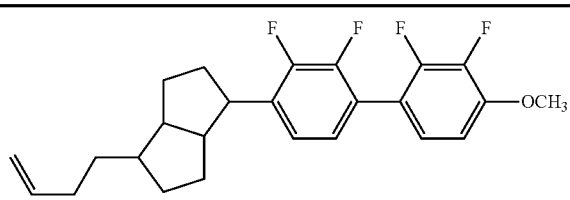 |
| 198 | 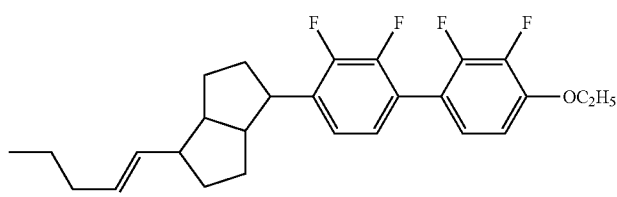 [SMILES: C/C=C/CCC1CCC2C(c3ccc(-c4ccc(OCC)c(F)c4F)c(F)c3F)CCC12] |
| 199 | 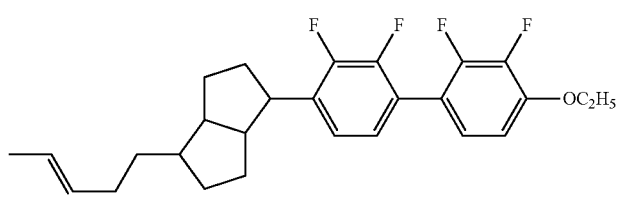 |
| 200 | 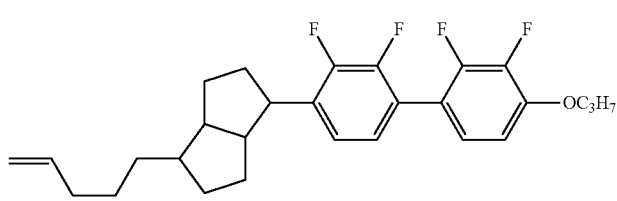 |
| 201 | 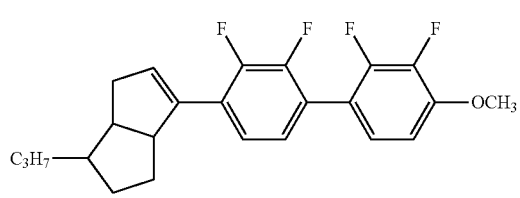 |
| 202 | 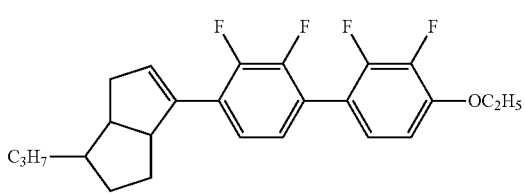 |
| 203 | 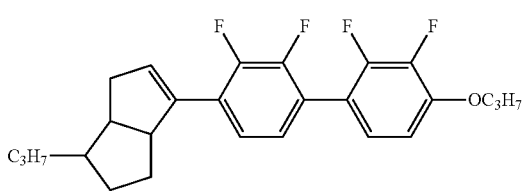 |
| 204 | 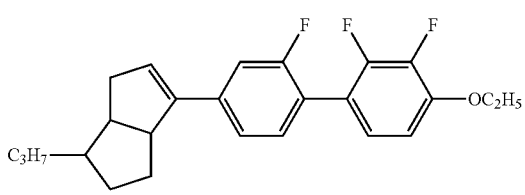 |

| No. | |
|---|---|
| 205 | 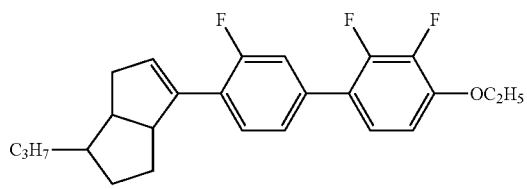 |
| 206 | 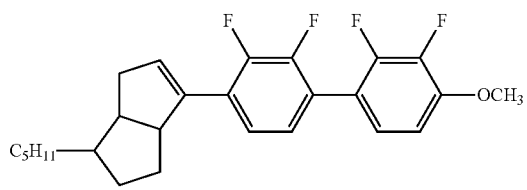 |
| 207 | 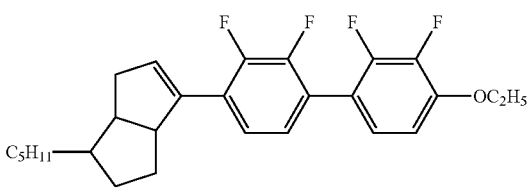 |
| 208 | 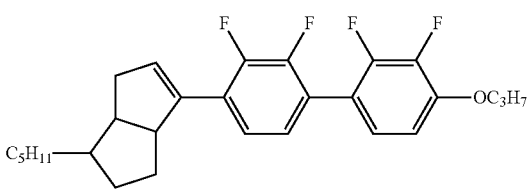 |
| 209 | 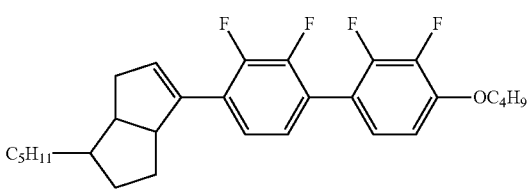 |
| 210 | 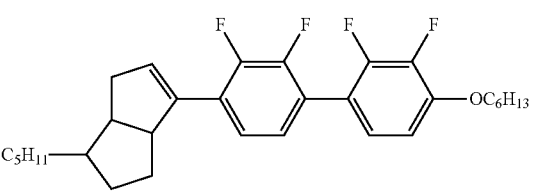 |
| 211 | 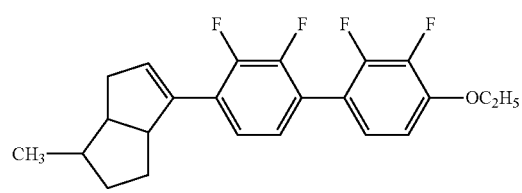 [SMILES: CCOc1ccc(-c2ccc(C3=CCC4C(C)CCC34)c(F)c2F)c(F)c1F] |
| 212 | 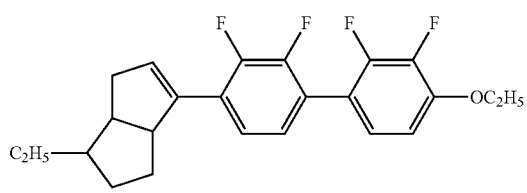 |

| No. | |
|---|---|
| 213 | 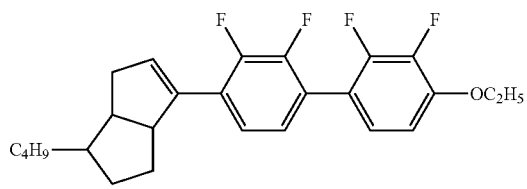 |
| 214 | 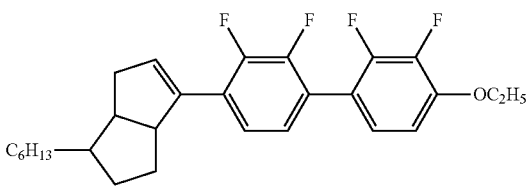 |
| 215 | 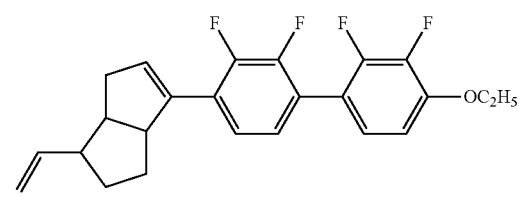 |
| 216 | 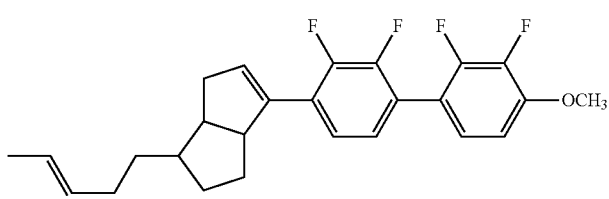 [SMILES: C/C=C/CCC1CCC2C(c3ccc(-c4ccc(OC)c(F)c4F)c(F)c3F)=CCC12] |
| 217 | 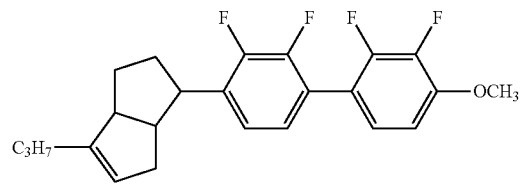 |
| 218 | 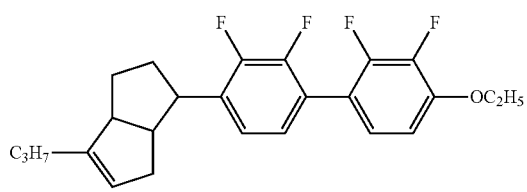 |
| 219 | 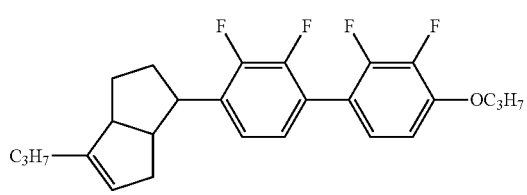 |
| 220 | 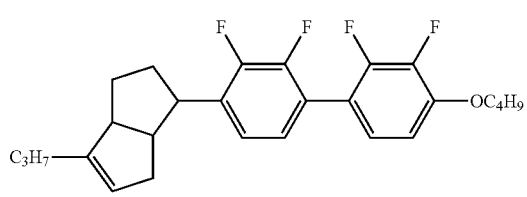 |

-continued
| No. | |
|---|---|
| 221 | 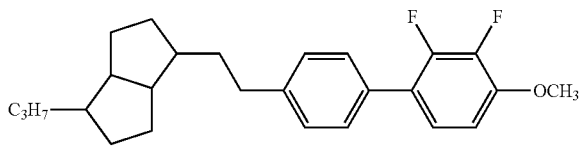 |
| 222 | 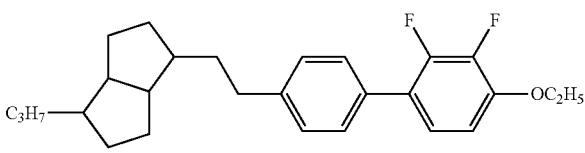<br>C 45.2 N 57.4 I<br>$T_{NI}$; 53.3° C., Δ ϵ; −3.98, Δ n; 0.104 |
| 223 | 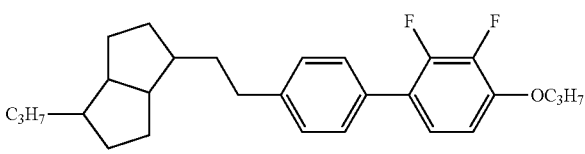 |
| 224 | 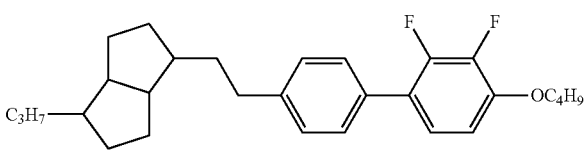 |
| 225 | 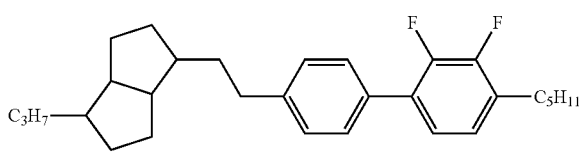 |
| 226 | 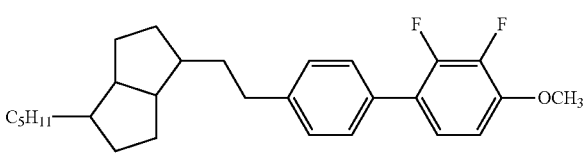 |
| 227 | 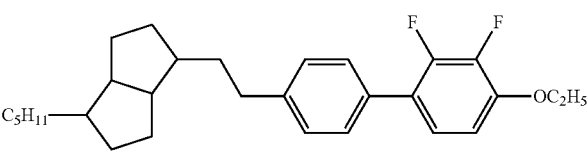 |
| 228 | 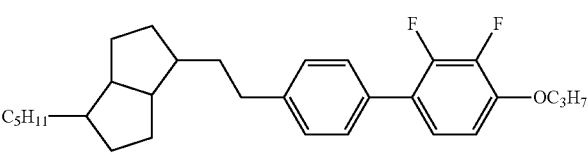 |
| 229 | 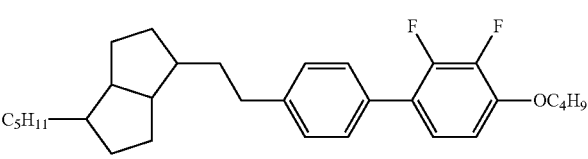 |

-continued
| No. | |
|---|---|
| 230 | 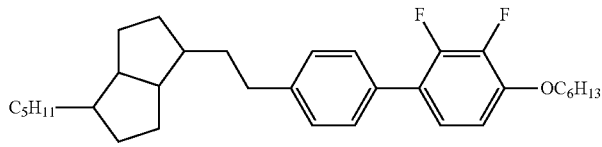 |
| 231 | 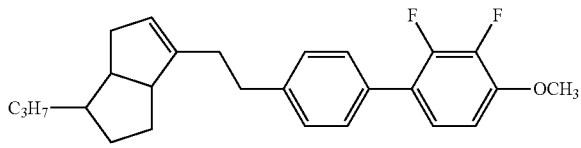 |
| 232 | 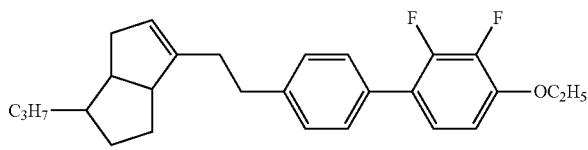 |
| 233 | 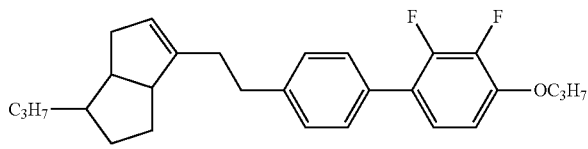 |
| 234 | 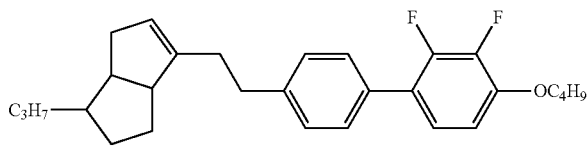 |
| 235 | 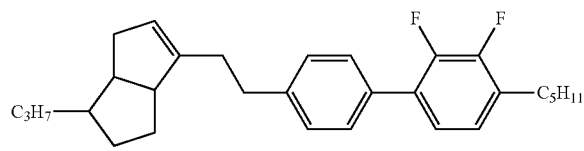 |
| 236 | 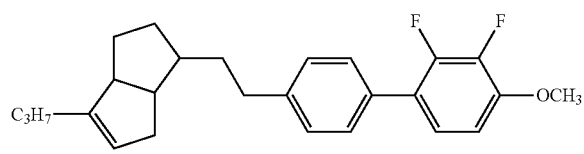 |
| 237 | 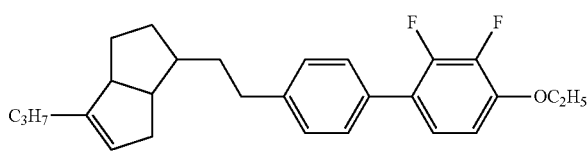 |
| 238 | 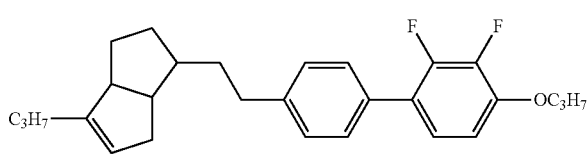 |
| 239 | 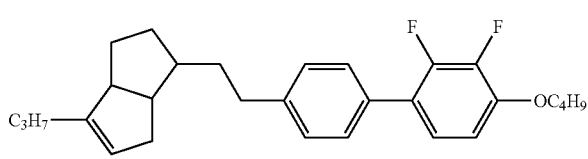 |

-continued
| No. | |
|---|---|
| 240 | 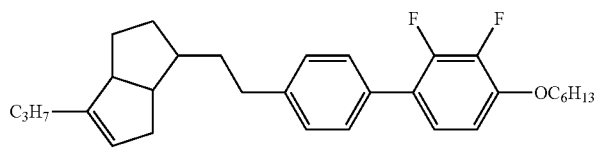 |
| 241 | 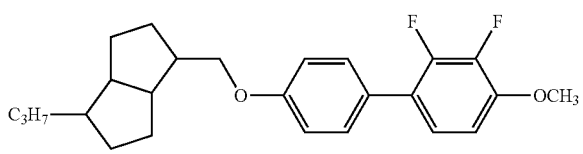 |
| 242 | 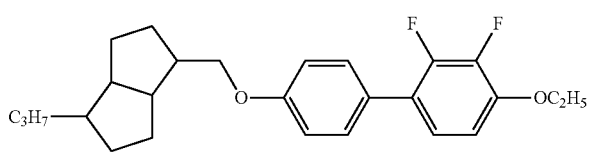
C 66.8 N 105.4 I
$T_{NI}$; 103.9° C., Δ ε; −4.98, Δ n; 0.158 |
| 243 | 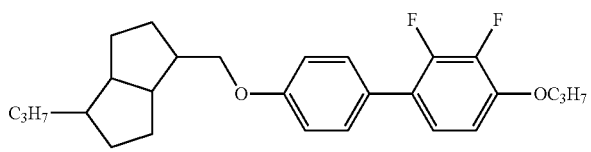 |
| 244 | 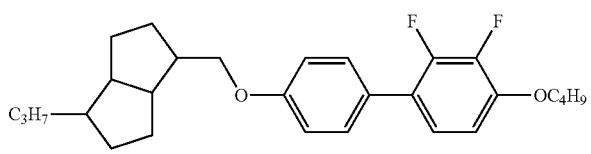 |
| 245 | 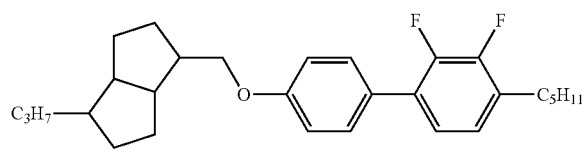 |
| 246 | 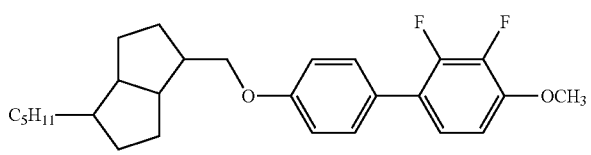 |
| 247 | 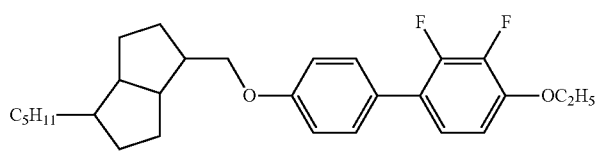 |
| 248 | 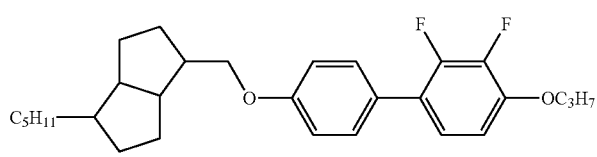 |

-continued
| No. | |
|---|---|
| 249 | 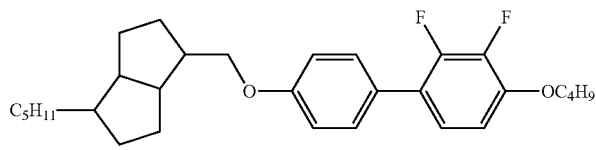 |
| 250 | 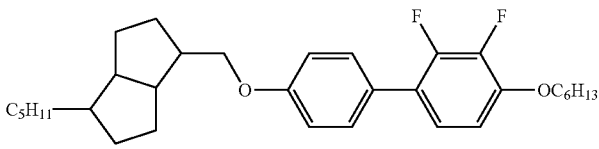 |
| 251 | 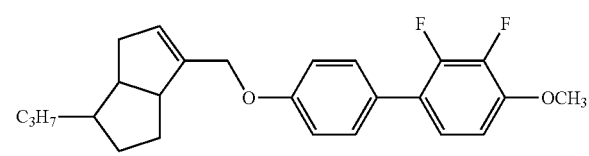 |
| 252 | 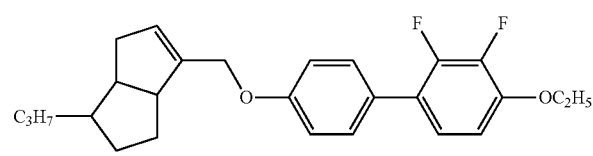 |
| 253 | 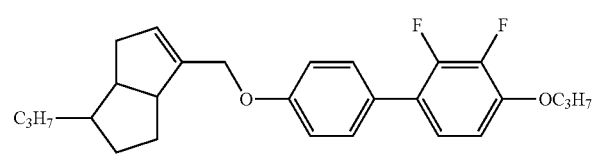 |
| 254 | 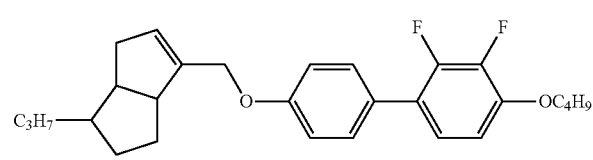 |
| 255 | 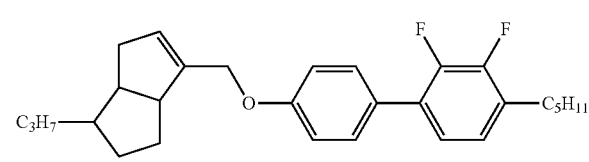 |
| 256 | 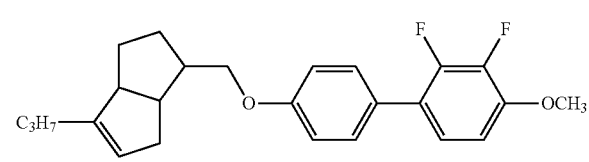 |
| 257 | 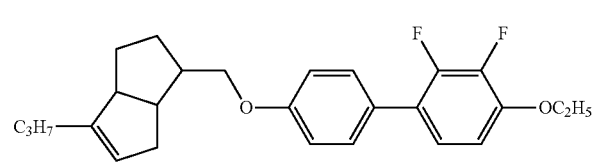 |
| 258 | 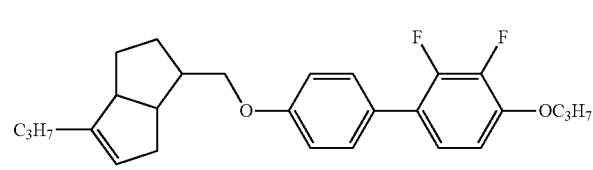 |

-continued
| No. | |
|---|---|
| 259 | 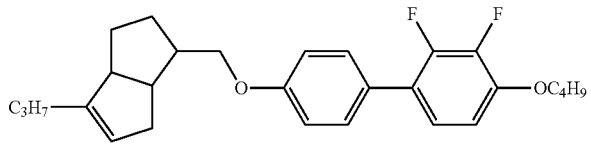 |
| 260 | 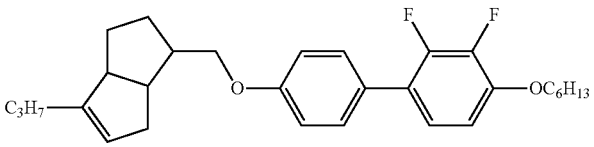 |
| 261 | 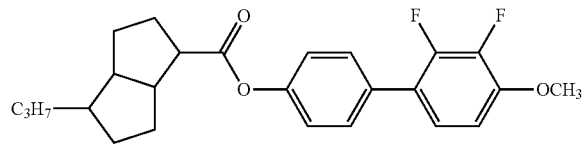 |
| 262 | 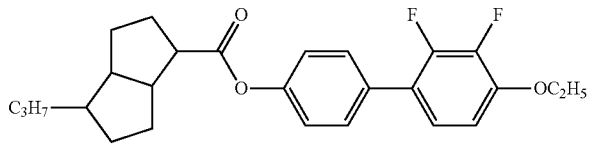 |
| 263 | 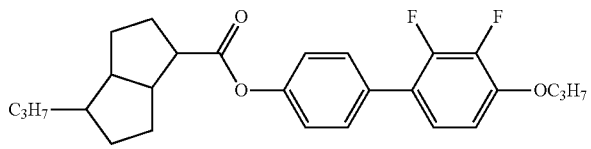 |
| 264 | 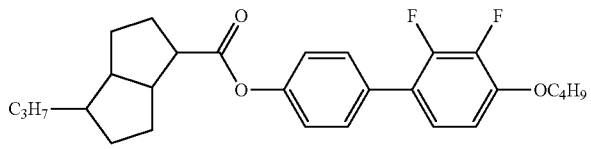 |
| 265 | 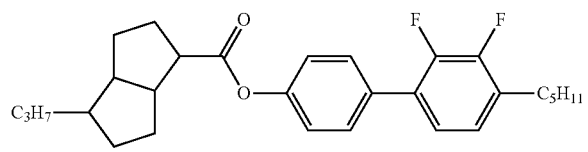 |
| 266 | 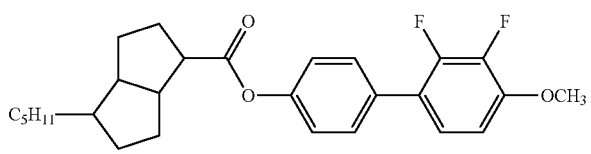 |
| 267 | 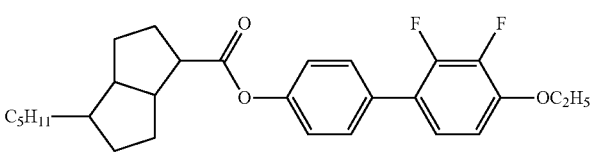 |
| 268 | 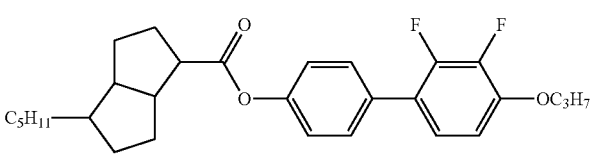 |

-continued
| No. | |
|---|---|
| 269 | 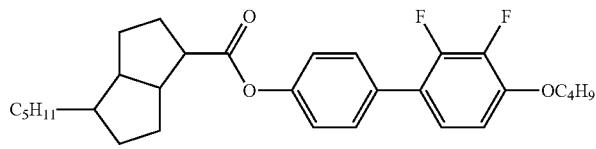 |
| 270 | 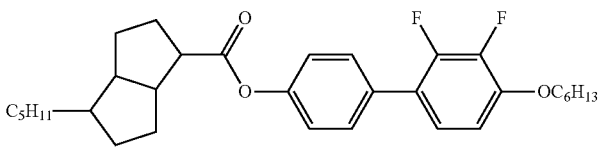 |
| 271 | 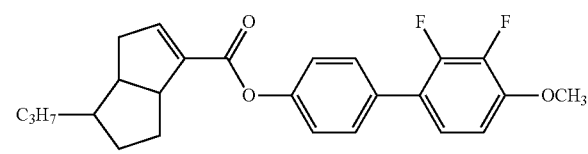 |
| 272 | 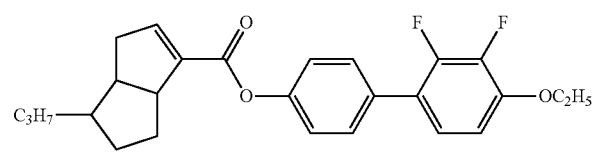 |
| 273 | 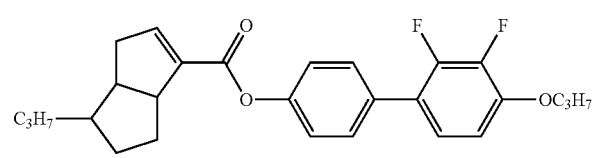 |
| 274 | 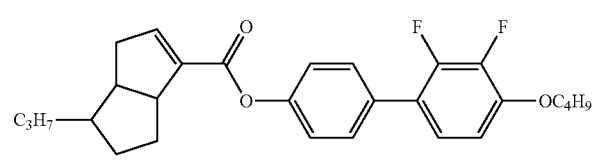 |
| 275 | 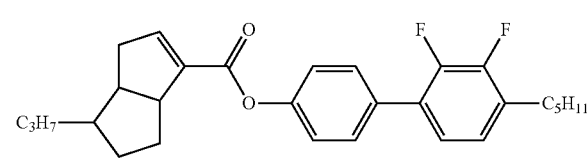 |
| 276 | 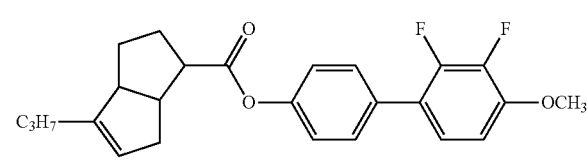 |
| 277 | 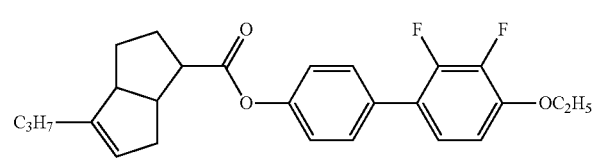 |
| 278 | 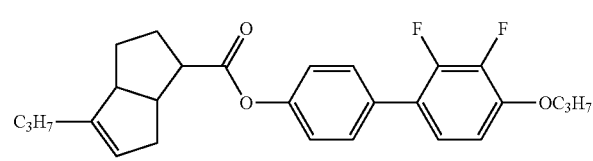 |

| No. | |
|---|---|
| 279 | 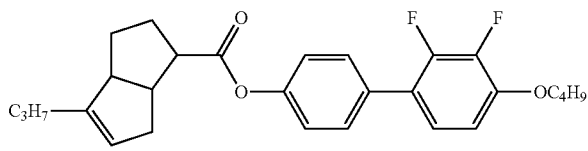 |
| 280 | 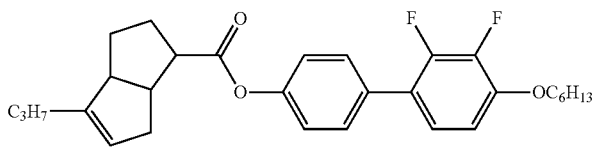 |
| 281 | 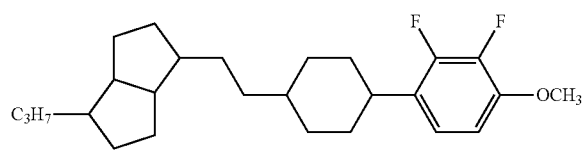 |
| 282 | 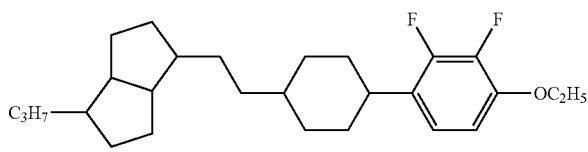 |
| 283 | 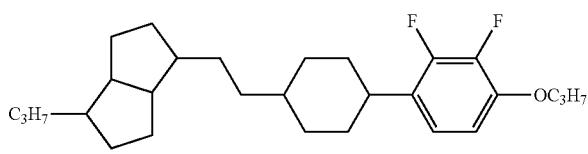 |
| 284 | 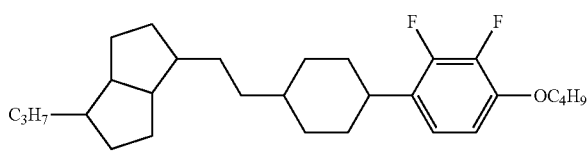 |
| 285 | 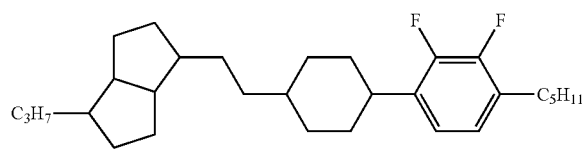 |
| 286 | 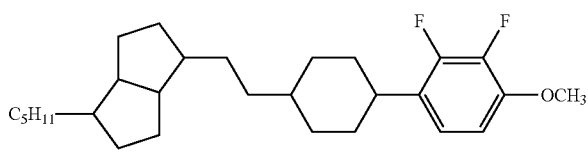 |
| 287 | 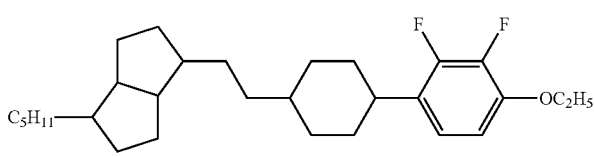 |
| 288 | 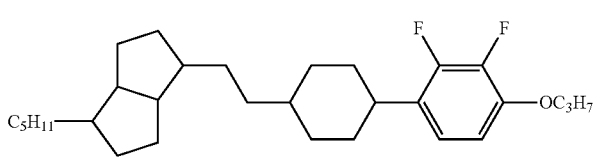 |

-continued
| No. | |
|---|---|
| 289 | 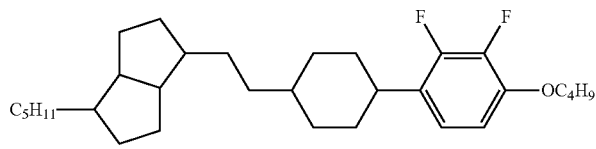 |
| 290 | 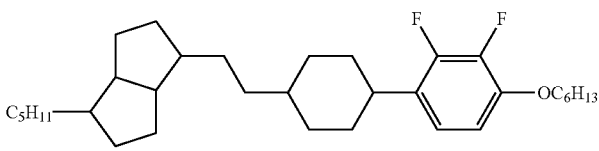 |
| 291 | 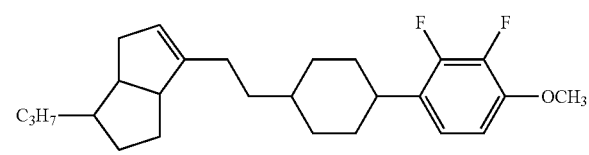 |
| 292 | 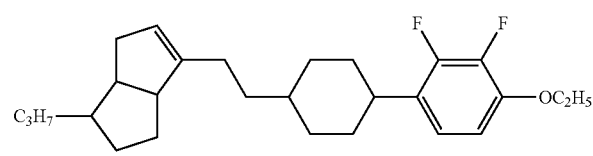 |
| 293 | 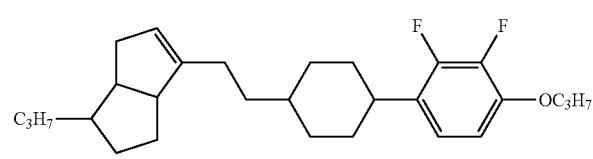 |
| 294 | 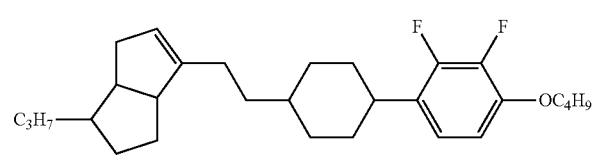 |
| 295 | 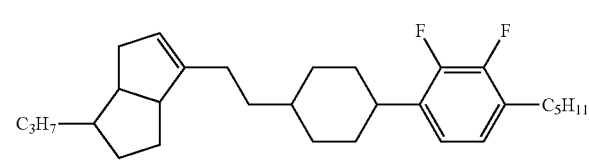 |
| 296 | 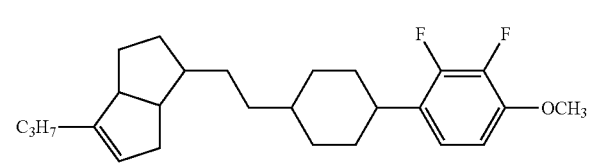 |
| 297 | 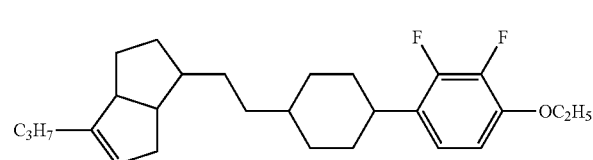 |
| 298 | 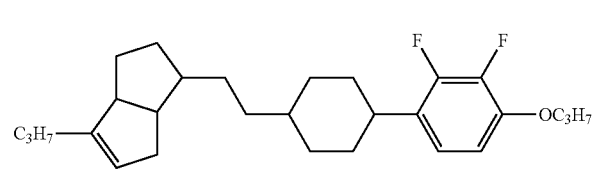 |

-continued
| No. | |
|---|---|
| 299 | 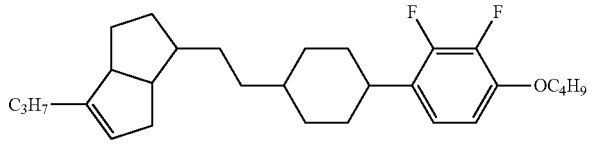 |
| 300 | 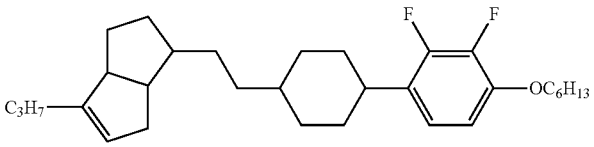 |
| 301 | 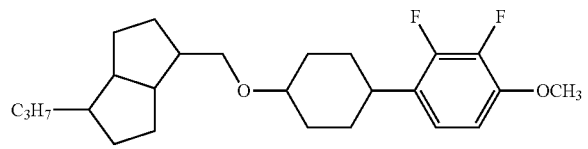 |
| 302 | 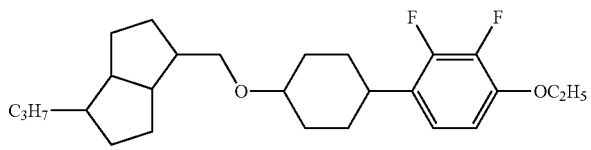 |
| 303 | 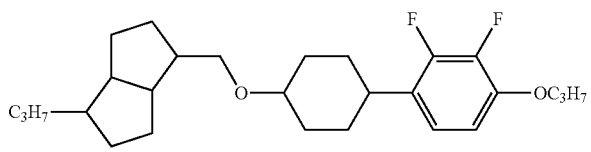 |
| 304 | 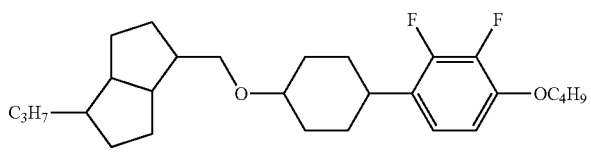 |
| 305 | 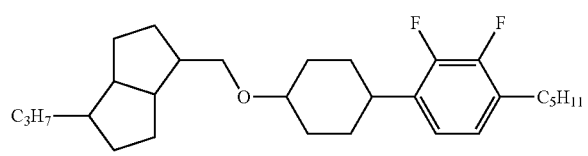 |
| 306 | 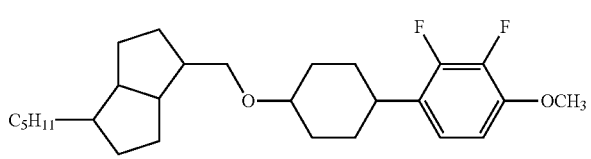 |
| 307 | 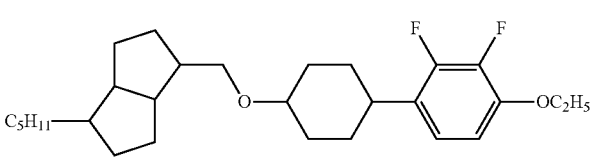 |
| 308 | 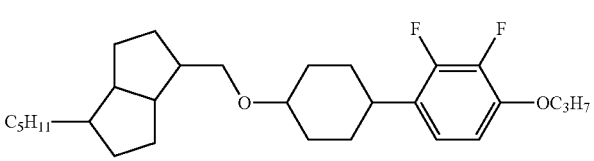 |

-continued
| No. | |
|---|---|
| 309 | 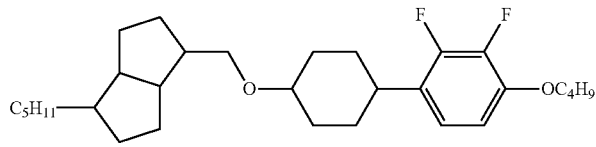 |
| 310 | 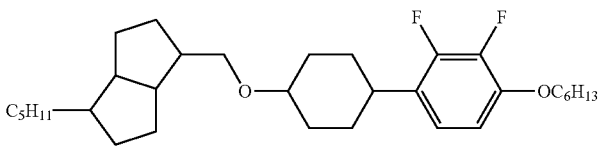 |
| 311 | 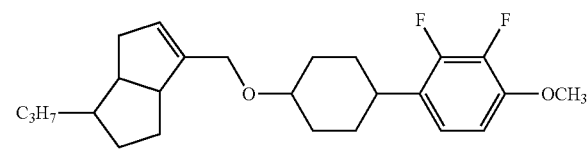 |
| 312 | 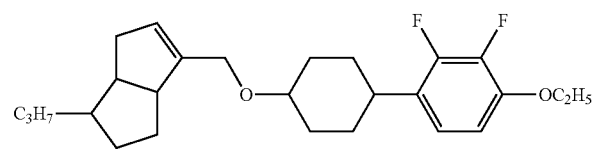 |
| 313 | 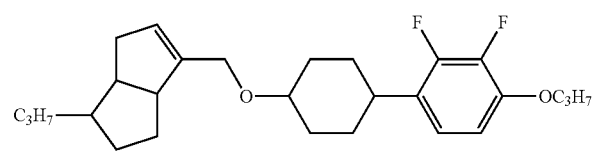 |
| 314 | 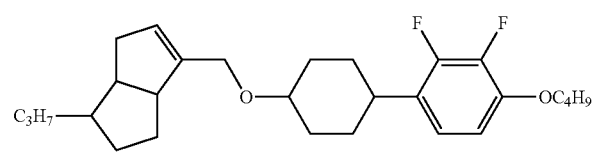 |
| 315 | 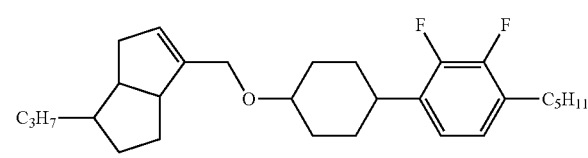 |
| 316 | 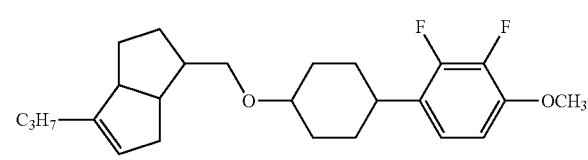 |
| 317 | 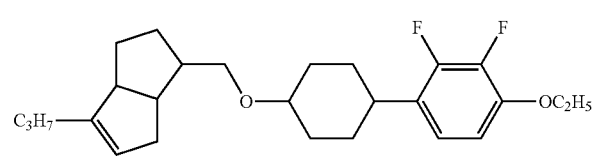 |
| 318 | 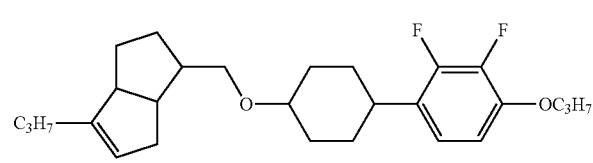 |

| No. | |
|---|---|
| 319 | 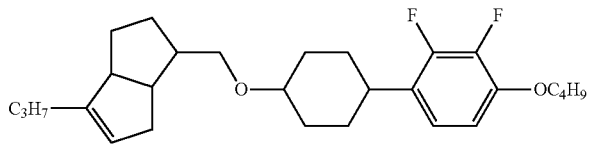 |
| 320 | 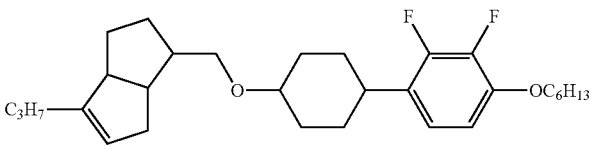 |
| 321 | 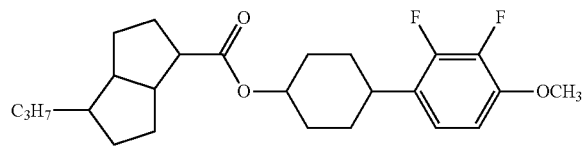 |
| 322 | 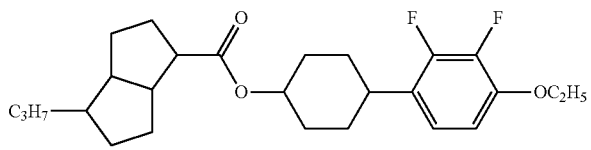 |
| 323 | 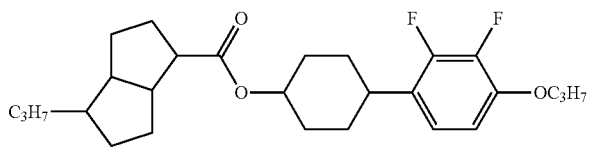 |
| 324 | 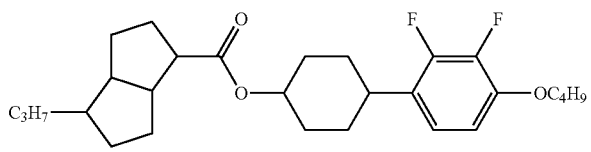 |
| 325 | 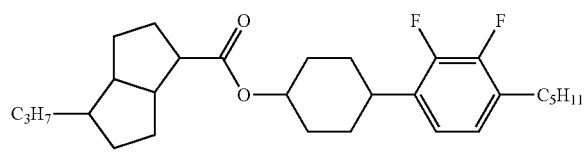 |
| 326 | 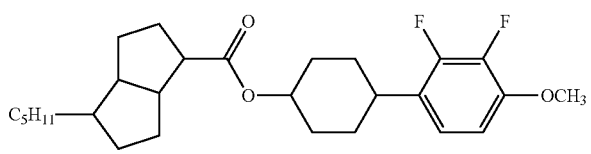 |
| 327 | 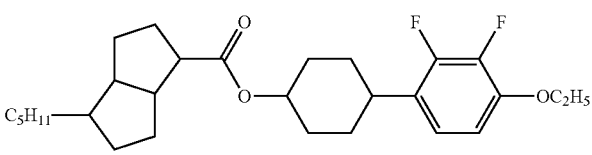 |
| 328 | 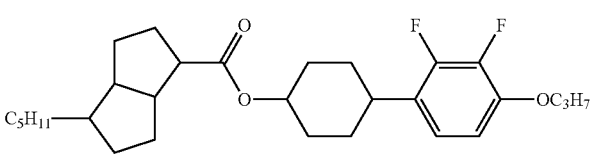 |

-continued
| No. | |
|---|---|
| 329 | 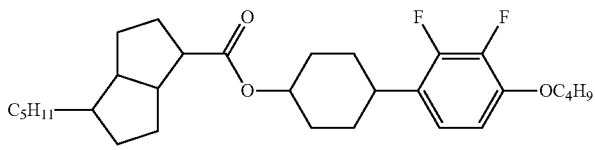 |
| 330 | 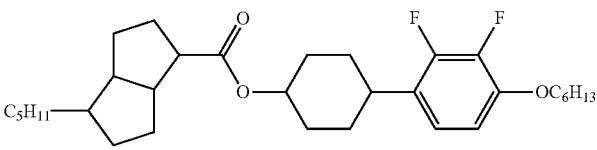 |
| 331 | 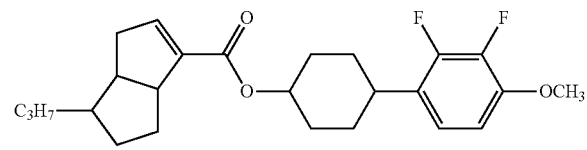 |
| 332 | 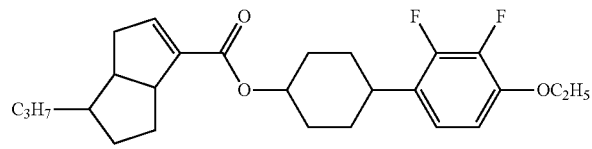 |
| 333 | 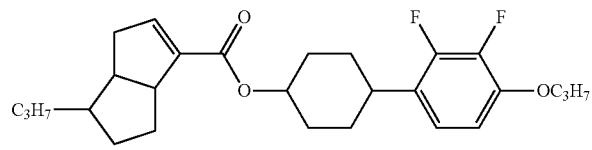 |
| 334 | 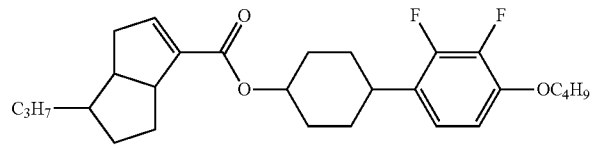 |
| 335 | 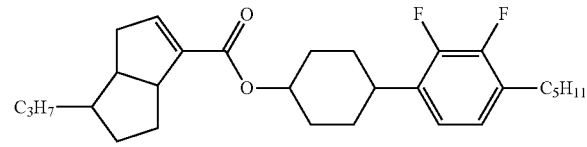 |
| 336 | 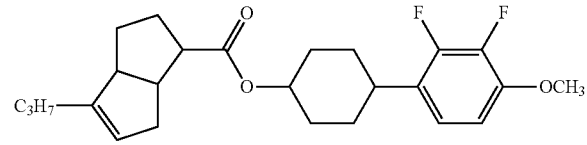 |
| 337 | 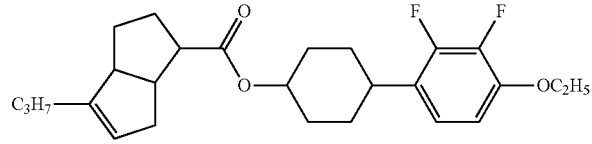 |
| 338 | 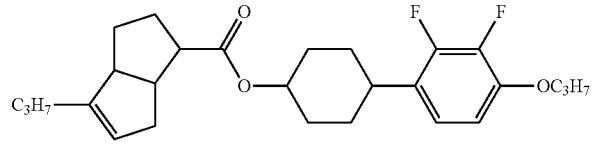 |

-continued
| No. | |
|---|---|
| 339 | 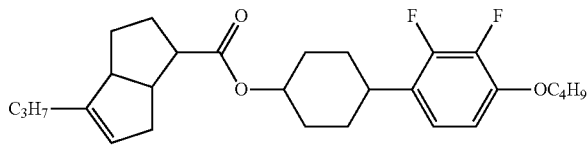 |
| 340 | 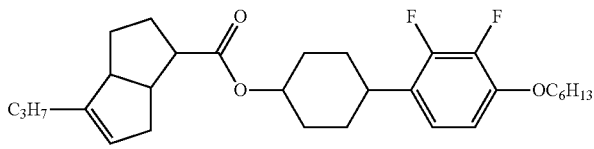 |
| 341 | 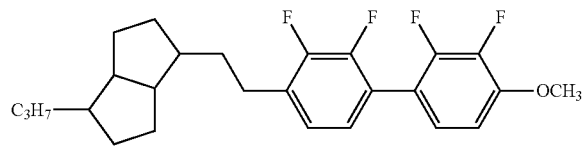 |
| 342 | 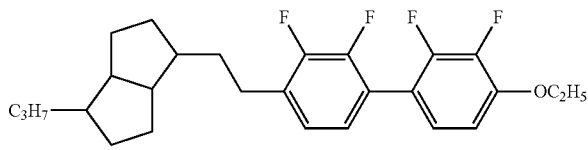 |
| 343 | 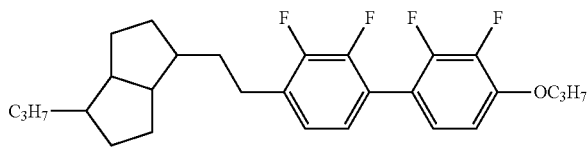 |
| 344 | 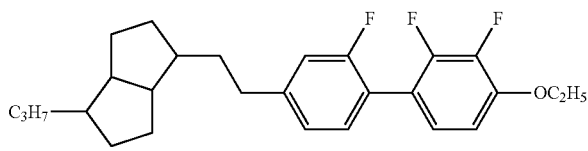 |
| 345 | 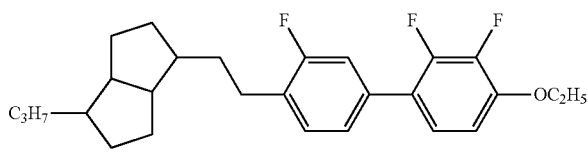 |
| 346 | 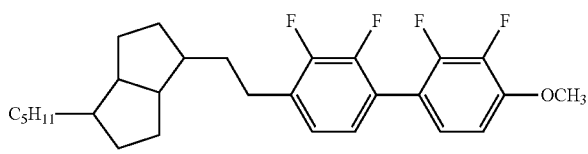 |
| 347 | 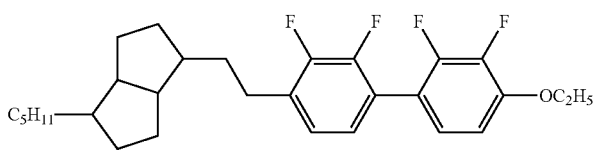 |
| 348 | 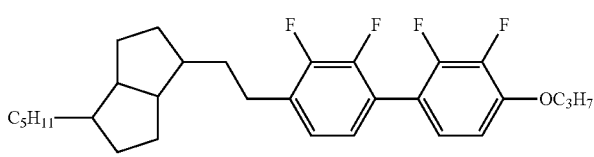 |

-continued
| No. | |
|---|---|
| 349 | 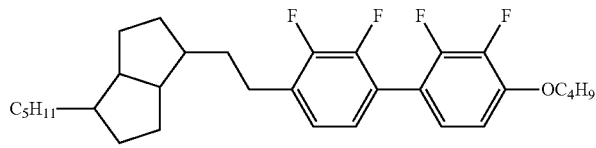 |
| 350 | 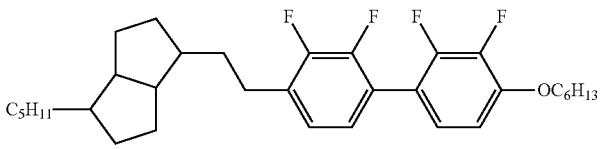 |
| 351 | 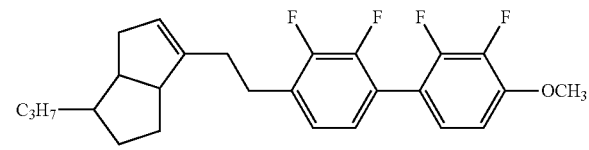 |
| 352 | 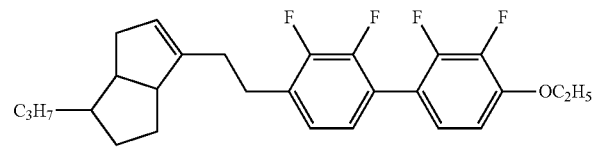 |
| 353 | 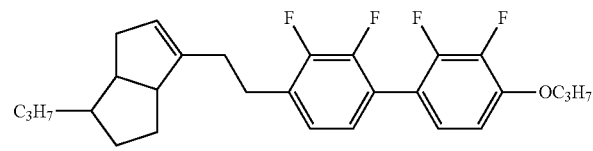 |
| 354 | 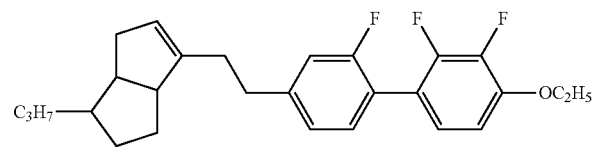 |
| 355 | 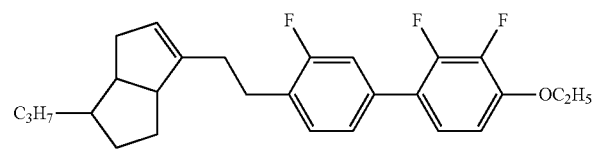 |
| 356 | 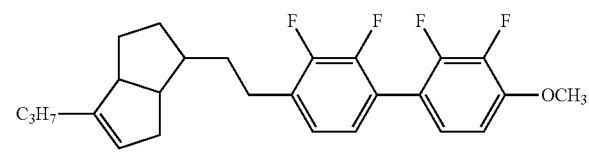 |
| 357 | 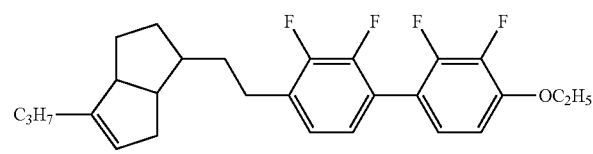 |
| 358 | 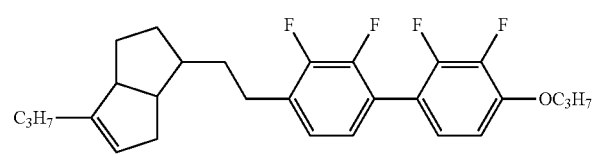 |

-continued
| No. | |
|---|---|
| 359 | 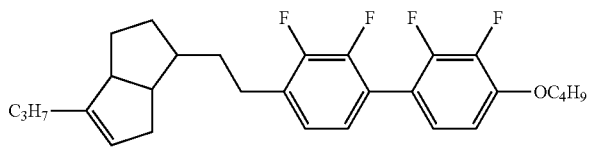 |
| 360 | 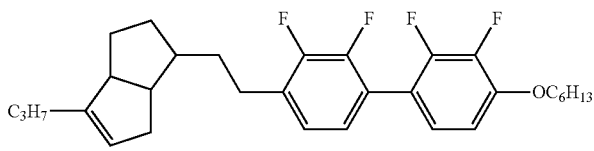 |
| 361 | 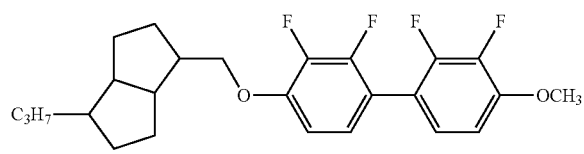 |
| 362 | 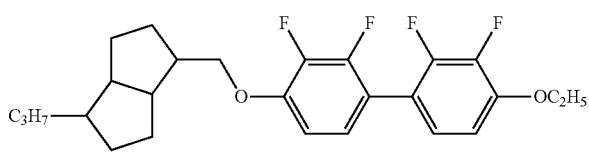 |
C 86.6 (N 75.1) I
$T_{NI}$; 71.3° C., Δ ε; −10.75, Δ n; 0.142
| 363 | 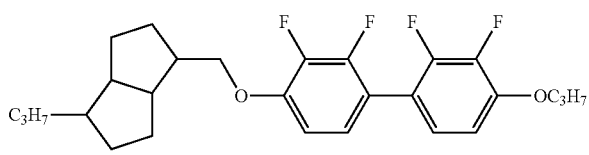 |
|---|---|
| 364 | 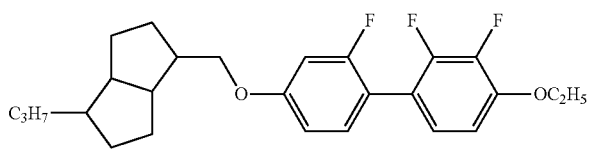 |
| 365 | 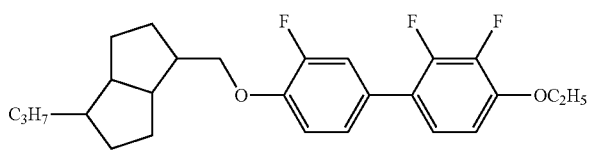 |
| 366 | 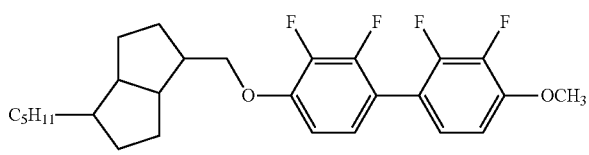 |
| 367 | 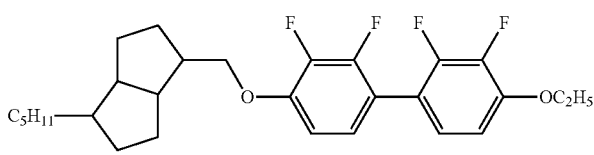 |

| No. | |
|---|---|
| 368 | 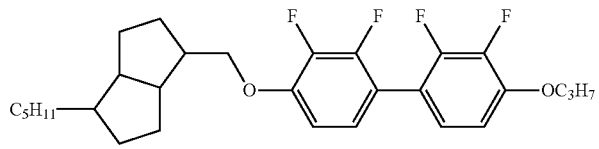 |
| 369 | 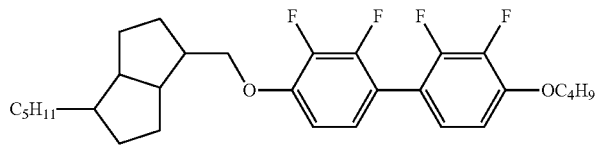 |
| 370 | 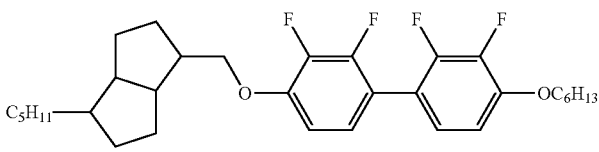 |
| 371 | 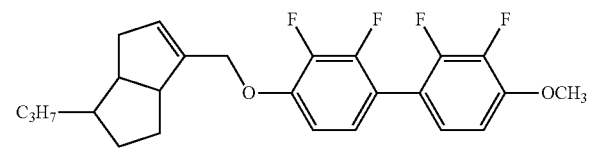 |
| 372 | 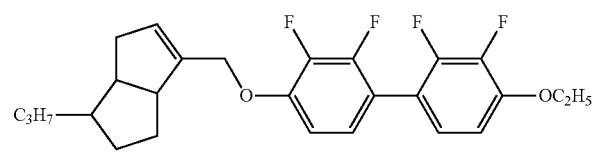 |
| 373 | 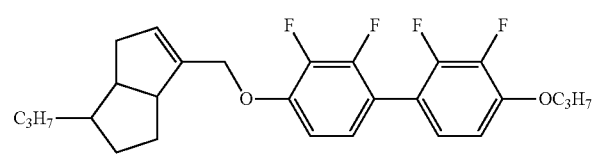 |
| 374 | 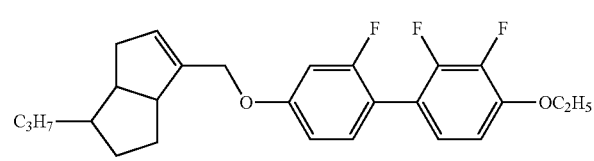 |
| 375 | 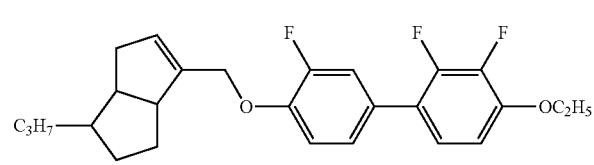 |
| 376 | 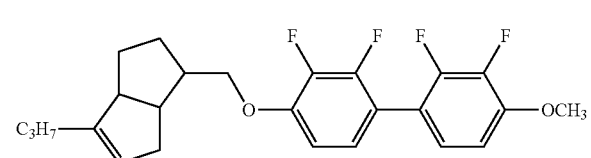 |
| 377 | 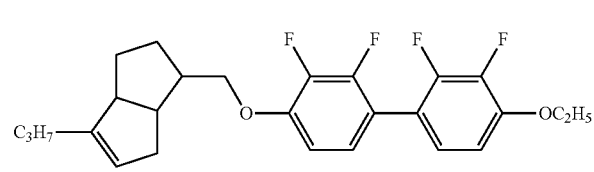 |

-continued
| No. | |
|---|---|
| 378 | 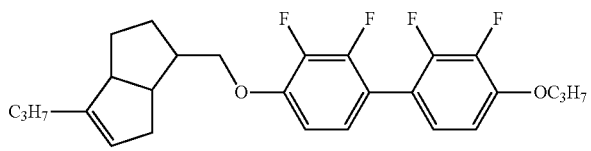 |
| 379 | 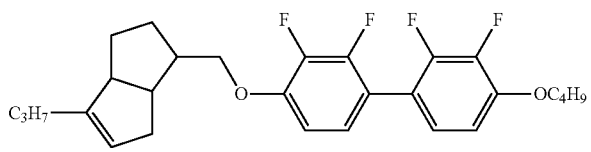 |
| 380 | 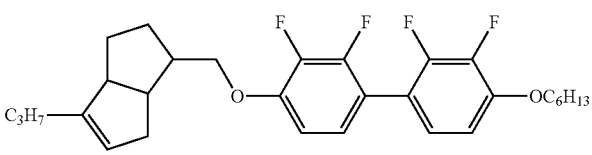 |
| 381 | 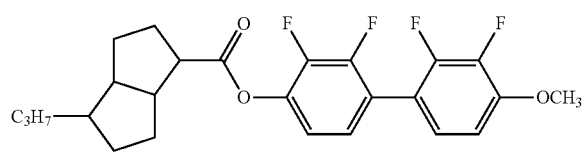 |
| 382 | 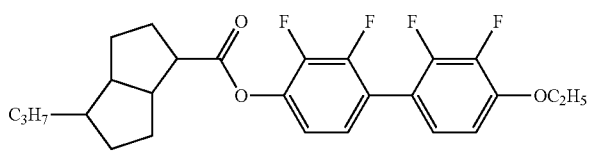 |
C 70.1 N 102.4 I
$T_{NI}$; 91.3° C., Δ ε; −7.89, Δ n; 0.134
| | |
|---|---|
| 383 | 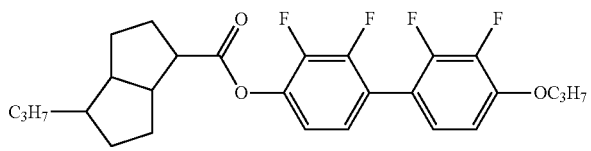 |
| 384 | 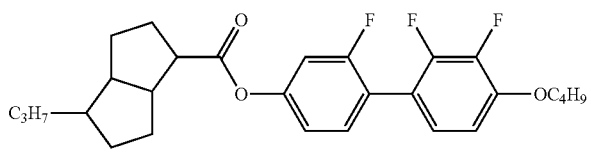 |
| 385 | 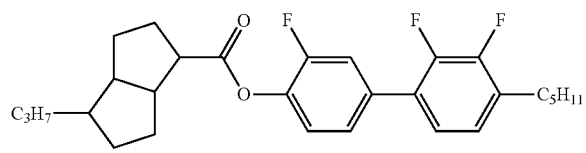 |
| 386 | 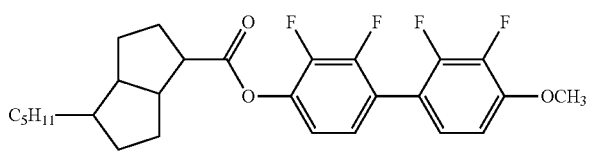 |

-continued
| No. | |
|---|---|
| 387 | 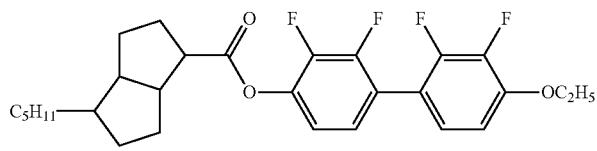 |
| 388 | 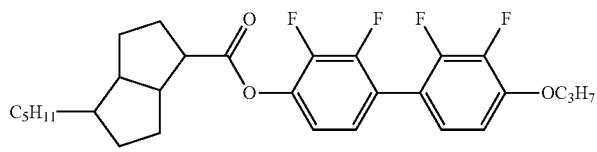 |
| 389 | 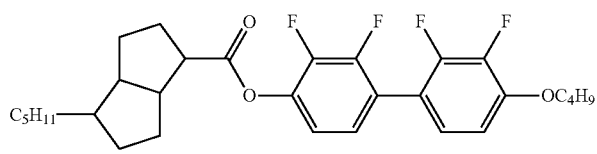 |
| 390 | 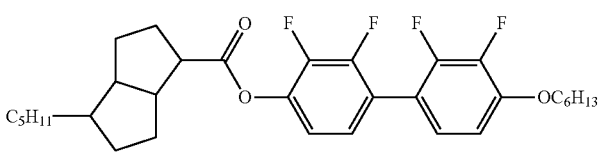 |
| 391 | 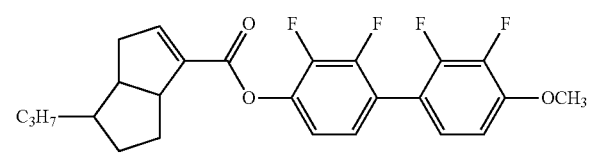 |
| 392 | 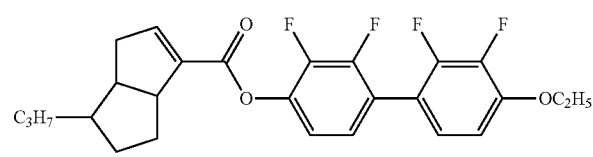 |
| 393 | 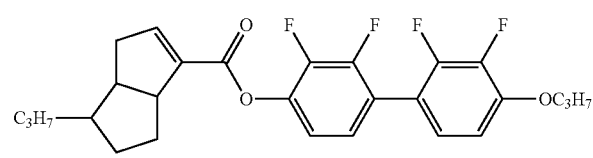 |
| 394 | 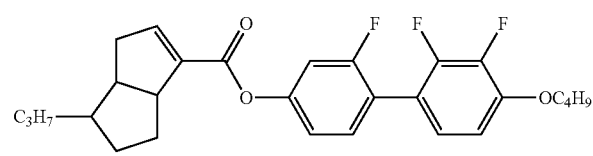 |
| 395 | 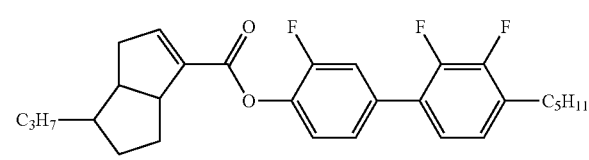 |
| 396 | 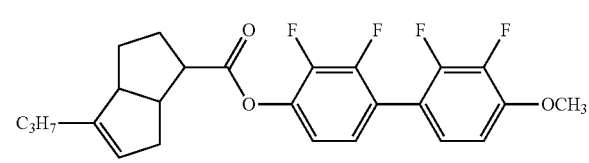 |

-continued
| No. | |
|---|---|
| 397 | 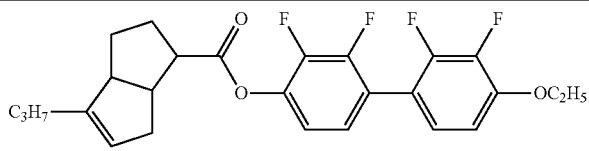 |
| 398 | 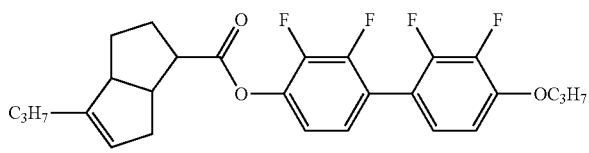 |
| 399 | 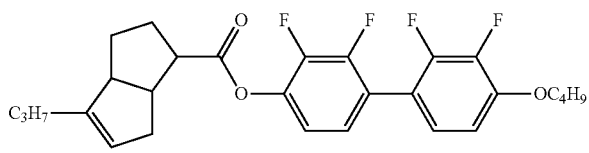 |
| 400 | 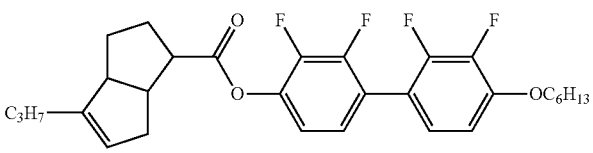 |
| 401 | 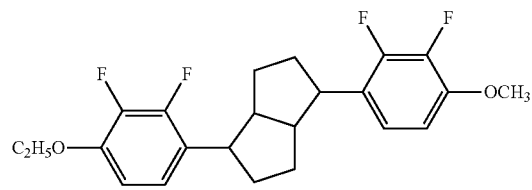 |
| 402 | 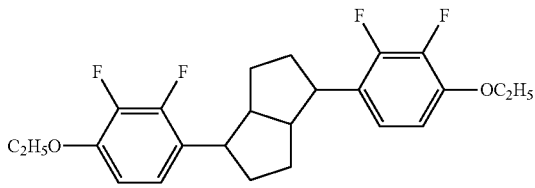 |
| 403 | 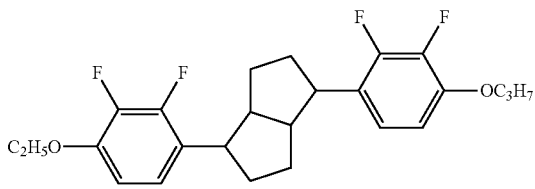 |
| 404 | 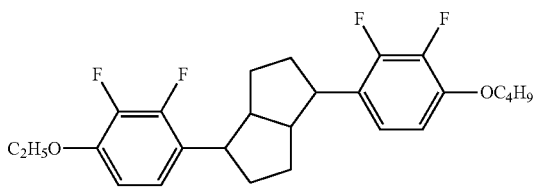 |
| 405 | 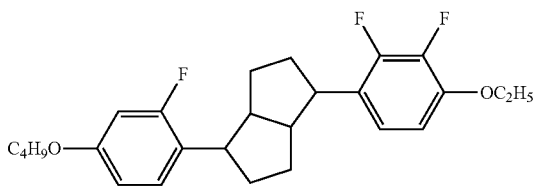 |

-continued
| No. | |
|---|---|
| 406 | 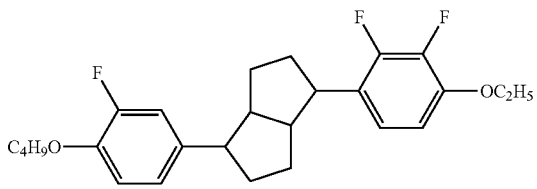 |
| 407 | 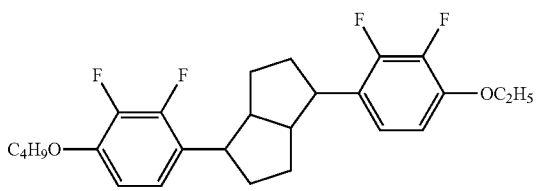
C 97.8 I
$T_{NI}$; 27.3° C., Δ ϵ; −12.69, Δ n; 0.074 |
| 408 | 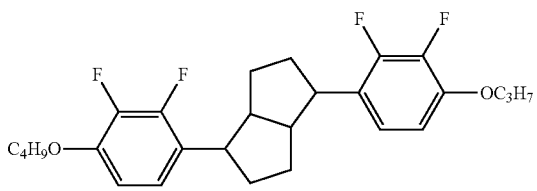 |
| 409 | 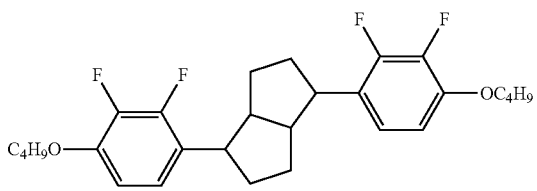 |
| 410 | 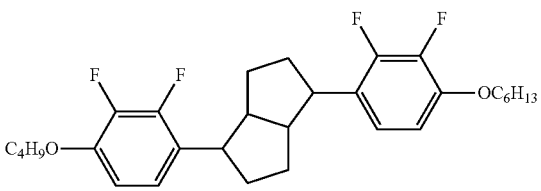 |
| 411 | 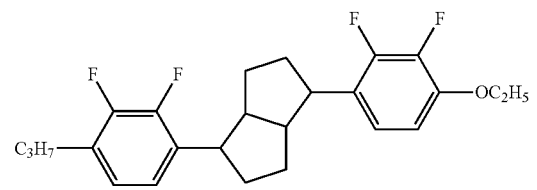 |
| 412 | 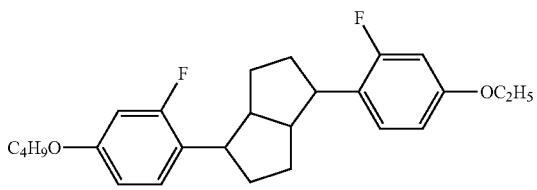 |

-continued
| No. | |
|---|---|
| 413 | 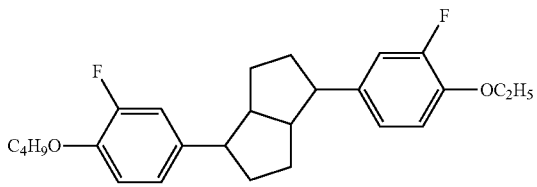 |
| 414 | 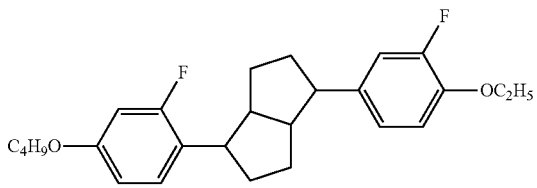 |
| 415 | 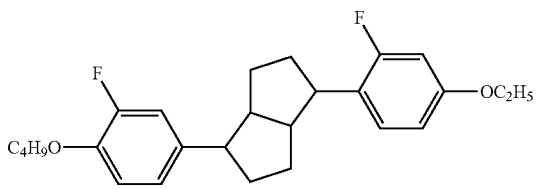 |
| 416 | 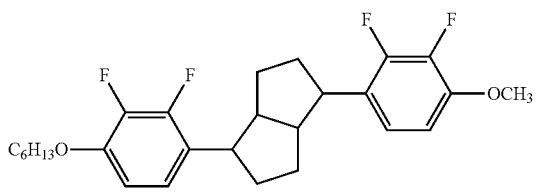 |
| 417 | 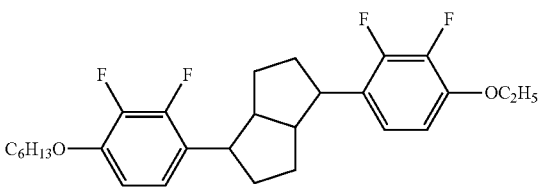 |
| 418 | 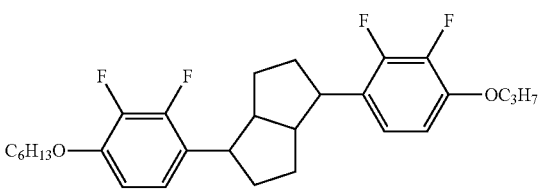 |
| 419 | 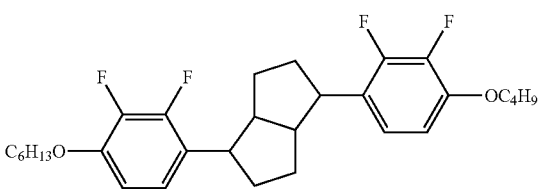 |
| 420 | 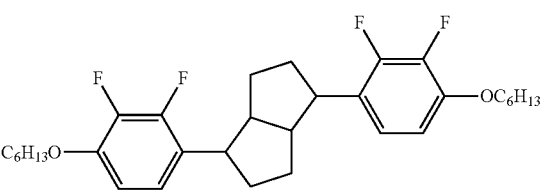 |

-continued
| No. | |
|---|---|
| 421 | 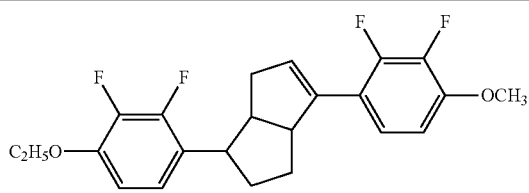 |
| 422 | 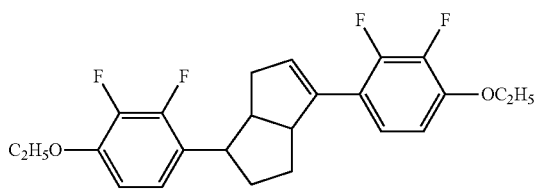 |
| 423 | 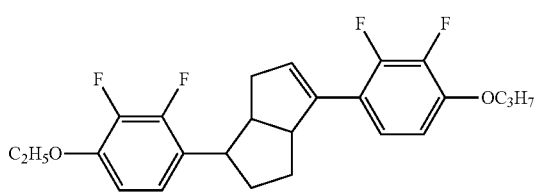 |
| 424 | 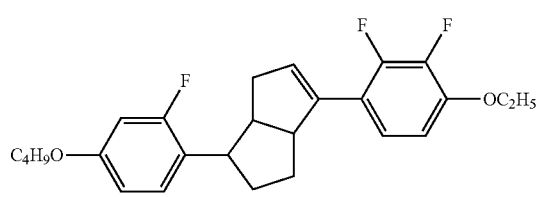 |
| 425 | 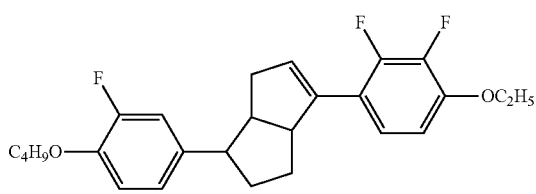 |
| 426 | 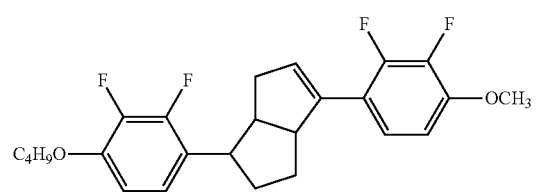 |
| 427 | 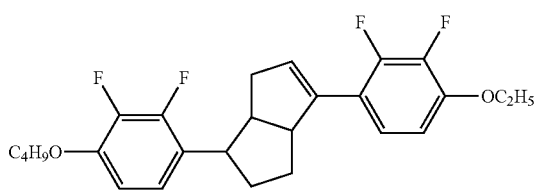 |
| 428 | 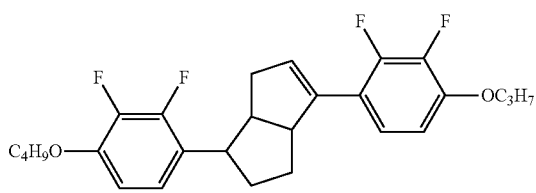 |

-continued
| No. | |
|---|---|
| 429 | 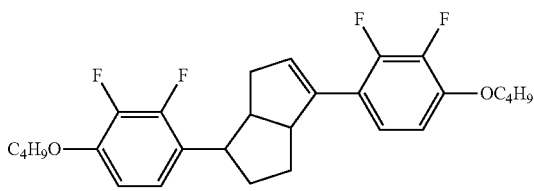 |
| 430 | 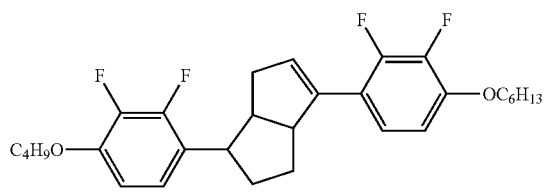 |
| 431 | 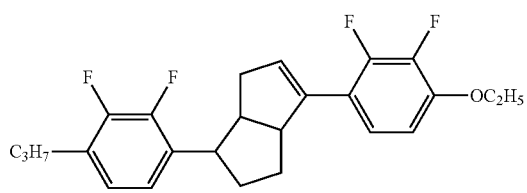 |
| 432 | 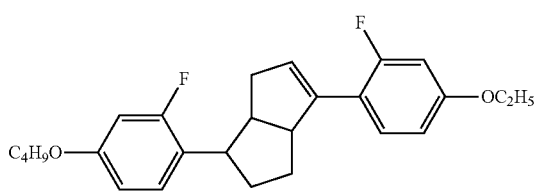 |
| 433 | 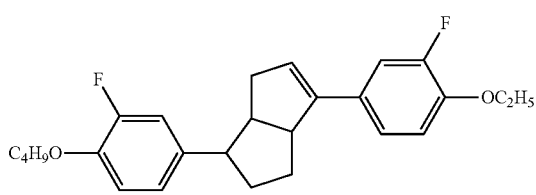 |
| 434 | 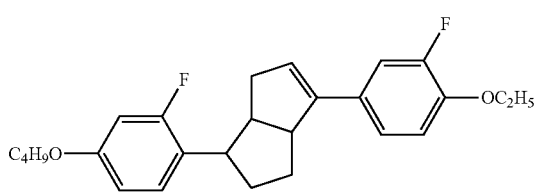 |
| 435 | 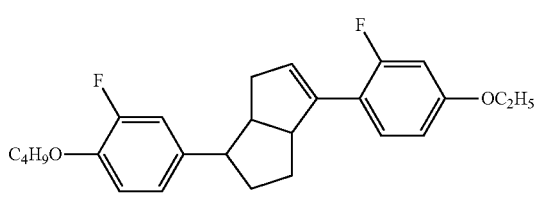 |
| 436 | 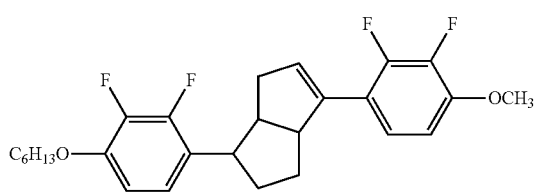 |

-continued
| No. |
|---|
| 437 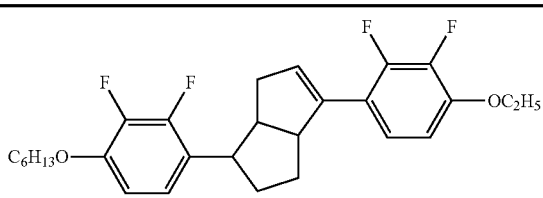 |
| 438 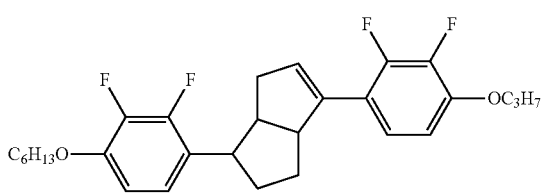 |
| 439 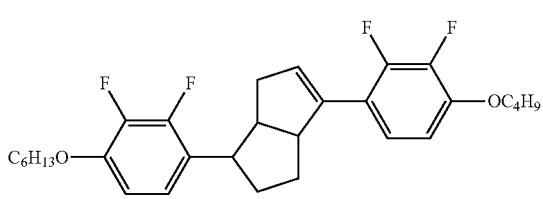 |
| 440 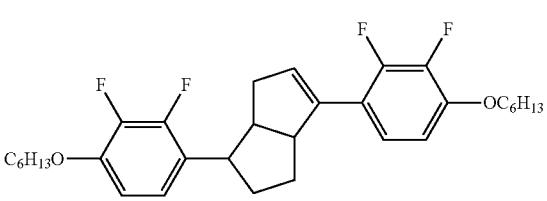 |
| 441 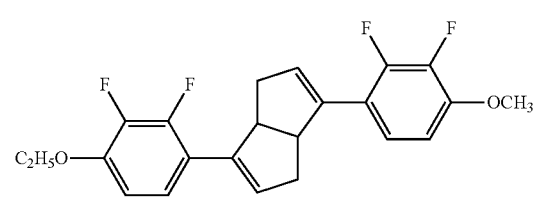 |
| 442 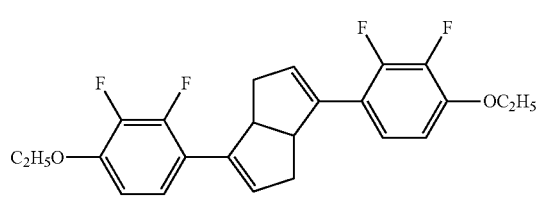 |
| 443 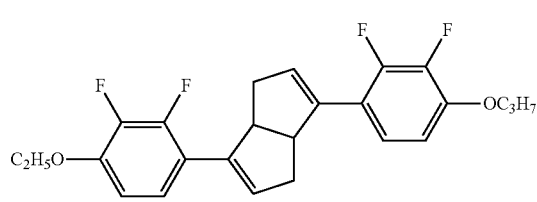 |
| 444 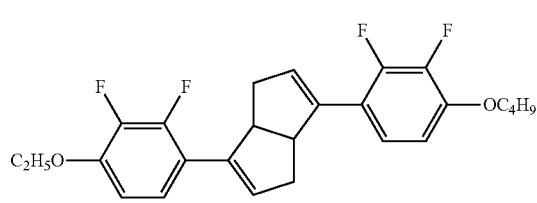 |

-continued
| No. | |
|---|---|
| 445 | 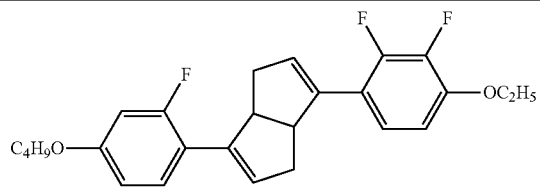 |
| 446 | 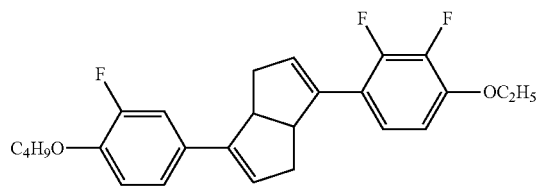 |
| 447 | 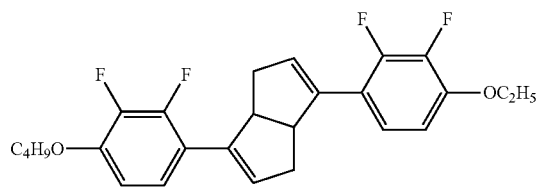 |
C 113.4 N 123.3 I
$T_{NI}$; 112.6° C., $\Delta \epsilon$; −7.67, $\Delta$ n; 0.202
| | |
|---|---|
| 448 | 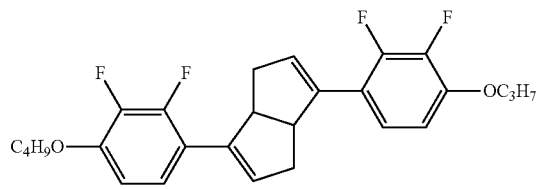 |
| 449 | 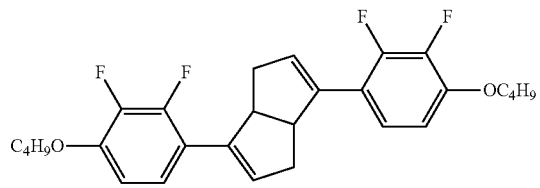 |
| 450 | 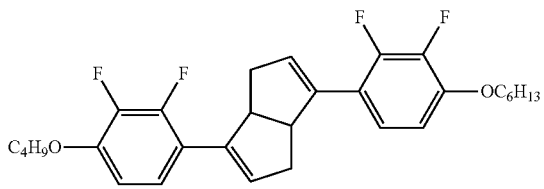 |
| 451 | 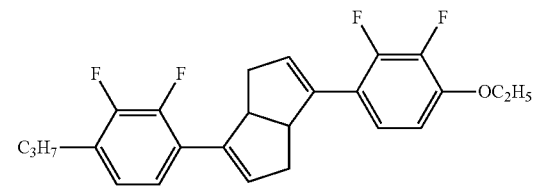 |
| 452 | 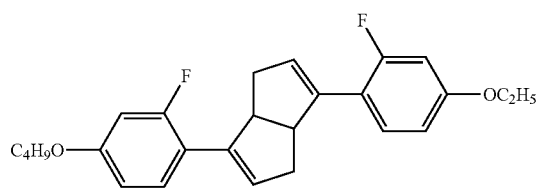 |

-continued
| No. | |
|---|---|
| 453 | 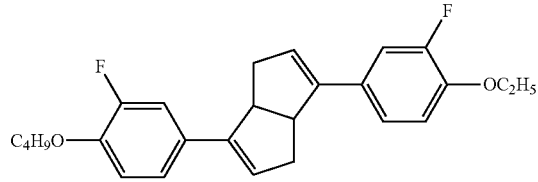 |
| 454 | 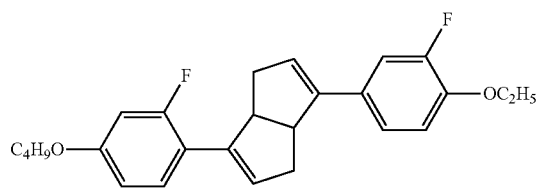 |
| 455 | 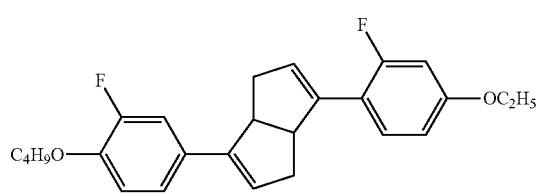 |
| 456 | 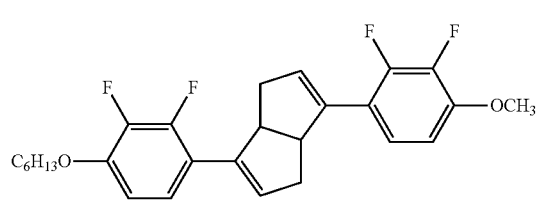 |
| 457 | 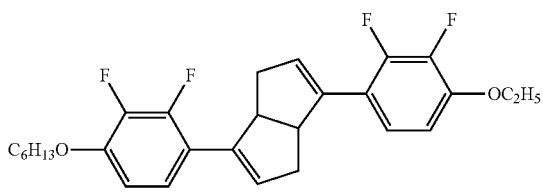 |
| 458 | 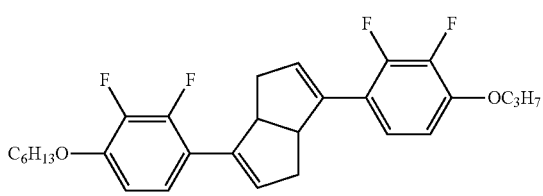 |
| 459 | 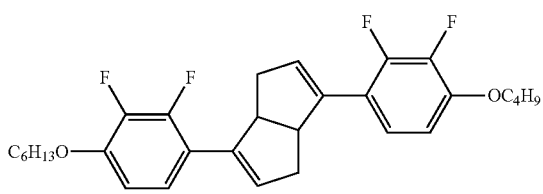 |
| 460 | 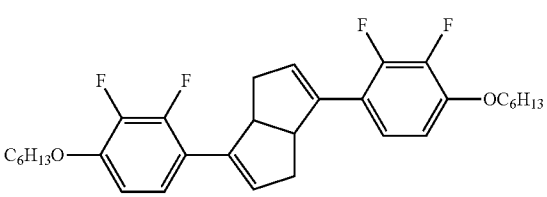 |

1-2. Examples of the Composition (1)

The liquid crystal composition (1) of the invention will be explained in detail by way of Examples. The invention is not limited by Examples described below. The compounds described in Examples were expressed in terms of symbols according to the definition in the following table. In the table, the configuration of 1,4-cyclohexylene is trans. The parenthesized number next to a symbolized compound in Example indicates the number of the compound. The symbol (—) means any other liquid crystal compound. The ratios (percentage) of liquid crystal compounds mean the percentages by weight (% by weight) based on the total weight of the liquid crystal composition. Last, the values of physical properties of the composition were summarized. The physical properties were measured according to the method described above, and measured values were reported here without extrapolation.

TABLE

| Method of Description of Compounds using Symbols R—($A_1$)—$Z_1$—...—$Z_n$—($A_n$)—R' | |
|---|---|
| 1) Left-terminal Group R— | Symbol |
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| 2) Right-terminal Group —R' | Symbol |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —$COOCH_3$ | —EMe |
| —CN | —C |
| —F | —F |
| —Cl | —CL |
| —$OCF_3$ | —$OCF_3$ |
| 3) Bonding Group —$Z_n$— | Symbol |
| —$C_nH_{2n}$— | n |
| —COO— | E |
| —$CH_2O$— | 1O |
| —$CF_2O$— | X |
| —C≡C— | T |
| Ring Structure —$A_n$— | Symbol |
| (bicyclic structure) | bp |
| 4) Ring Structure —$A_n$— | Symbol |
| (cyclohexyl) | H |
| (cyclohexenyl) | Ch |

TABLE-continued

| Method of Description of Compounds using Symbols R—($A_1$)—$Z_1$—...—$Z_n$—($A_n$)—R' | |
|---|---|
| (tetrahydropyran) | Dh |
| (dioxane) | G |
| (phenyl) | B |
| (pyrimidine) | Py |
| (2-fluorophenyl) | B(2F) |
| (3-fluorophenyl) | B(F) |
| (2,6-difluorophenyl) | B(F,F) |
| (2,3-difluorophenyl) | B(2F,3F) |
| (2-fluoro-3-chlorophenyl) | B(2F,3CL) |
| (bicyclic alkene structure) | hp |
| (bicyclic alkane structure) | op |

| TABLE-continued | | |
|---|---|---|
| Method of Description of Compounds using Symbols $R—(A_1)—Z_1—\ldots—Z_n—(A_n)—R'$ | | |
| 5) Examples of Description | | |

Example 1. 3-hpB(2F,3F)—O2

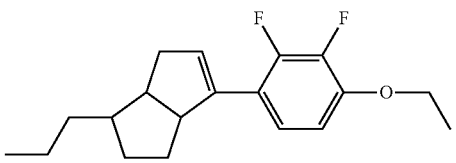 [SMILES: CCCC1CCC2C(c3ccc(OCC)c(F)c3F)=CCC12]

Example 2. 3-HHB(2F,3F)—O2

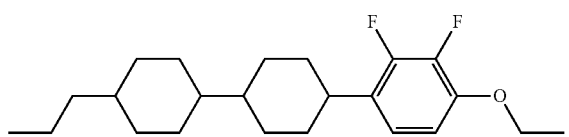

Example 3. 3-HHB-3

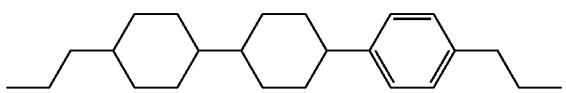

Example 4. 3-HH-2

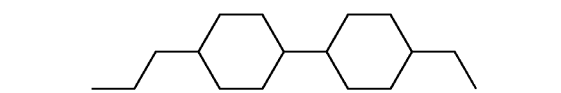

Example 9

| 3-hpB(2F,3F)-O2 | (No. 22) | 9% |
|---|---|---|
| 3-opB(2F,3F)-O2 | (No. 2) | 3% |
| 3-HB-O1 | (8-5) | 15% |
| 3-HH-4 | (8-1) | 5% |
| 3-HB(2F,3F)-O2 | (2-1) | 10% |
| 5-HB(2F,3F)-O2 | (2-1) | 2% |
| 2-HHB(2F,3F)-1 | (3-1) | 12% |
| 3-HHB(2F,3F)-1 | (3-1) | 12% |
| 3-HHB(2F,3F)-O2 | (3-1) | 13% |
| 5-HHB(2F,3F)-O2 | (3-1) | 13% |
| 3-HHB-1 | (9-1) | 6% |

NI = 84.3° C.;
$\Delta n = 0.093$;
$\eta = 37.9$ mPa · s;
$\Delta \epsilon = -3.5$.

Example 10

| 3-op10B(2F,3F)-O2 | (No. 62) | 4% |
|---|---|---|
| 3-hpBB(2F,3F)-O2 | (No. 122) | 3% |
| 3-HH-4 | (8-1) | 8% |
| 3-H2B(2F,3F)-O2 | (2-4) | 18% |
| 5-H2B(2F,3F)-O2 | (2-4) | 19% |
| 2-HHB(2F,3CL)-O2 | (3-12) | 2% |
| 3-HHB(2F,3CL)-O2 | (3-12) | 3% |
| 4-HHB(2F,3CL)-O2 | (3-12) | 2% |
| 5-HHB(2F,3CL)-O2 | (3-12) | 2% |
| 3-HBB(2F,3F)-O2 | (3-7) | 9% |
| 5-HBB(2F,3F)-O2 | (3-7) | 9% |
| V-HHB-1 | (9-1) | 6% |
| 3-HHB-3 | (9-1) | 6% |
| 3-HHEBH-3 | (10-6) | 3% |
| 3-HHEBH-4 | (10-6) | 3% |
| 3-HHEBH-5 | (10-6) | 3% |

NI = 94.0° C.;
$\Delta n = 0.104$;
$\eta = 33.0$ mPa · s;
$\Delta \epsilon = -4.1$.

The helical pitch was 61.1 μm when 0.25 part by weight of the optically active compound (Op-5) was added to 100 parts by weight of the preceding composition.

Example 11

| 3-opBB(2F,3F)-O2 | (No. 102) | 3% |
|---|---|---|
| 3-op2BB(2F,3F)-O2 | (No. 222) | 3% |
| 3-HB-O1 | (8-5) | 15% |
| 3-HH-4 | (8-1) | 5% |
| 3-HB(2F,3F)-O2 | (2-1) | 12% |
| 5-HB(2F,3F)-O2 | (2-1) | 12% |
| 2-HHB(2F,3F)-1 | (3-1) | 7% |
| 3-HHB(2F,3F)-1 | (3-1) | 11% |
| 3-HHB(2F,3F)-O2 | (3-1) | 13% |
| 5-HHB(2F,3F)-O2 | (3-1) | 13% |
| 6-HEB(2F,3F)-O2 | (2-6) | 6% |

NI = 80.3° C.;
$\Delta n = 0.090$;
$\eta = 37.7$ mPa · s;
$\Delta \epsilon = -3.8$.

Example 12

| 4O-B(2F,3F)bpB(2F,3F)-O2 | (No. 447) | 3% |
|---|---|---|
| 4O-B(2F,3F)opB(2F,3F)-O2 | (No. 407) | 5% |
| 2-HH-5 | (8-1) | 3% |
| 3-HH-4 | (8-1) | 15% |
| 3-HH-5 | (8-1) | 4% |
| 3-HB-O2 | (8-5) | 12% |
| 3-H2B(2F,3F)-O2 | (2-4) | 10% |
| 5-H2B(2F,3F)-O2 | (2-4) | 15% |
| 3-HHB(2F,3CL)-O2 | (3-12) | 2% |
| 2-HBB(2F,3F)-O2 | (3-7) | 3% |
| 3-HBB(2F,3F)-O2 | (3-7) | 9% |
| 5-HBB(2F,3F)-O2 | (3-7) | 9% |
| 3-HHB-1 | (9-1) | 3% |
| 3-HHB-3 | (9-1) | 4% |
| 3-HHB-O1 | (9-1) | 3% |

NI = 75.7° C.;
$\Delta n = 0.096$;
$\eta = 26.8$ mPa · s;
$\Delta \epsilon = -4.5$.

Example 13

| 3-hpB(2F,3F)-O2 | (No. 2) | 3% |
|---|---|---|
| 3-opBB(2F,3F)-O2 | (No. 102) | 3% |
| 3-HB-O1 | (8-5) | 5% |
| 3-HH-V | (8-1) | 15% |
| 3-HB(2F,3F)-O2 | (2-1) | 12% |

-continued

| | | |
|---|---|---|
| 5-HB(2F,3F)-O2 | (2-1) | 9% |
| 2-HHB(2F,3F)-1 | (3-1) | 9% |
| 3-HHB(2F,3F)-1 | (3-1) | 12% |
| 3-HHB(2F,3F)-O2 | (3-1) | 13% |
| 5-HHB(2F,3F)-O2 | (3-1) | 13% |
| 3-HHB-1 | (9-1) | 6% |

NI = 88.1° C.;
Δn = 0.090;
η = 35.3 mPa · s;
Δε = −3.4.

Example 14

| | | |
|---|---|---|
| 3-op1OBB(2F,3F)-O2 | (No. 242) | 8% |
| 3-op1OB(2F,3F)B(2F,3F)-O2 | (No. 362) | 8% |
| 3-HB-O1 | (8-5) | 15% |
| 3-HH-V | (8-1) | 5% |
| 3-HB(2F,3F)-O2 | (2-1) | 12% |
| 5-HB(2F,3F)-O2 | (2-1) | 3% |
| 2-HHB(2F,3F)-1 | (3-1) | 12% |
| 3-HHB(2F,3F)-1 | (3-1) | 12% |
| 3-HHB(2F,3F)-O2 | (3-1) | 6% |
| 5-HHB(2F,3F)-O2 | (3-1) | 13% |
| 3-HHB-1 | (9-1) | 6% |

NI = 87.7° C.;
Δn = 0.099;
Δε = −3.8.

Example 15

| | | |
|---|---|---|
| 3-op1OBB(2F,3F)-O2 | (No. 242) | 7% |
| 3-opEB(2F,3F)B(2F,3F)-O2 | (No. 382) | 3% |
| 3-HH-4 | (8-1) | 8% |
| 3-H2B(2F,3F)-O2 | (2-4) | 22% |
| 5-H2B(2F,3F)-O2 | (2-4) | 18% |
| 3-HHB(2F,3CL)-O2 | (3-12) | 3% |
| 3-HBB(2F,3F)-O2 | (3-7) | 9% |
| 5-HBB(2F,3F)-O2 | (3-7) | 9% |
| V-HHB-1 | (9-1) | 6% |
| 3-HHB-3 | (9-1) | 6% |
| 3-HHEBH-3 | (10-6) | 3% |
| 3-HHEBH-4 | (10-6) | 3% |
| 3-HHEBH-5 | (10-6) | 3% |

NI = 92.4° C.;
Δn = 0.106;
η = 35.2 mPa · s;
Δε = −4.1.

Industrial Applicability

The liquid crystal compound of the invention has a high stability to heat, light or the like, a high clearing point, a low minimum temperature of a liquid crystal phase, a small viscosity, a suitable optical anisotropy, a large negative dielectric anisotropy, a suitable elastic constant and an excellent compatibility with other liquid crystal compounds. The liquid crystal composition of the invention includes this compound and has a high maximum temperature of a nematic phase, a low minimum temperature of a nematic phase, a small viscosity, a suitable optical anisotropy, a large negative dielectric anisotropy and a suitable elastic constant. This composition has a suitable balance regarding at least two of the physical properties. The liquid crystal display device of the invention contains this composition and has a wide temperature range in which the device can be used, a short response time, a large voltage holding ratio, a large contrast ratio and a long service life. Accordingly, the device can widely be utilized for the display of personal computers, televisions and so forth.

What is claimed is:

1. A compound represented by formula (1-1):

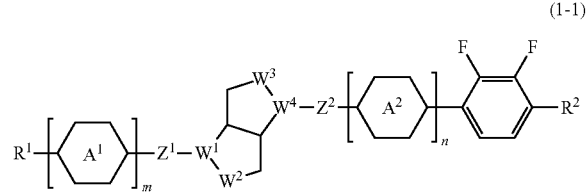

(1-1)

wherein
R$^1$ and R$^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons;
ring A$^1$ and ring A$^2$ are independently 1,4-cyclohexylene, 1,4-cyclohexenylene, 1,4-phenylene, 2-fluoro-1,4-phenylene or 2,3-difluoro-1,4-phenylene;
Z$^1$ and Z$^2$ are independently a single bond, —(CH$_2$)$_2$—, —CH$_2$O—, —OCH$_2$—, —COO— or —OCO—;
>W$^1$—W$^2$— and >W$^4$—W$^3$— are independently >CH—CH$_2$— or >C=CH—; and
m and n are independently 0, 1 or 2, and the sum of m and n is 1 or 2.

2. The compound according to claim 1, wherein the compound is represented by formula (1-2):

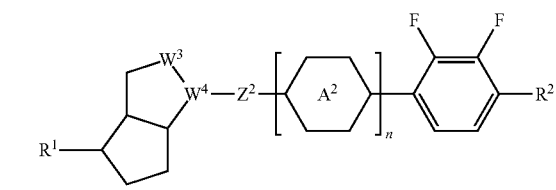

(1-2)

wherein R$^1$ and R$^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; ring A$^2$ is 1,4-cyclohexylene, 1,4-cyclohexenylene, 1,4-phenylene, 2-fluoro-1,4-phenylene or 2,3-difluoro-1,4-phenylene; Z$^2$ is a single bond, —(CH$_2$)$_2$—, —CH$_2$O—, —OCH$_2$—, —COO— or —OCO—; >W$^4$—W$^3$— is >CH—CH$_2$— or >C=CH—; and n is 0 or 1.

3. The compound according to claim 2, wherein in formula (1-2), Z$^2$ is a single bond.

4. The compound according to claim 2, wherein the compound is represented by formula (1-3):

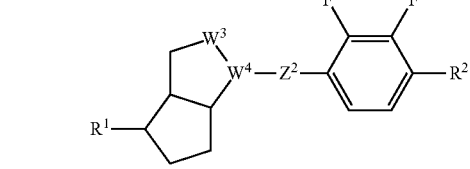

(1-3)

wherein R$^1$ and R$^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; Z$^2$ is a single bond, —(CH$_2$)$_2$—, —CH$_2$O—, —OCH$_2$—, —COO— or —OCO—; and >W$^4$—W$^3$— is >CH—CH$_2$— or >C=CH—.

5. The compound according to claim 2, wherein the compound is represented by formula (1-4):

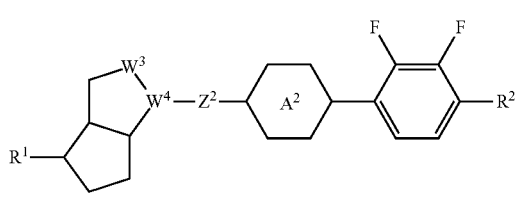
(1-4)

wherein $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; ring $A^2$ is 1,4-cyclohexylene, 1,4-cyclohexenylene, 1,4-phenylene or 2,3-difluoro-1,4-phenylene; $Z^2$ is a single bond, —(CH$_2$)$_2$—, —CH$_2$O—, —OCH$_2$—, —COO— or —OCO—; and $>W^4$—$W^3$— is $>$CH—CH$_2$— or $>$C=CH—.

6. The compound according to claim 1, wherein the compound is represented by formula (1-5):

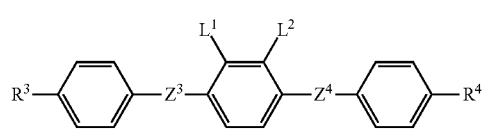
(1-5)

wherein $R^1$ and $R^2$ are independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $>W^1$—$W^2$— and $>W^4$—$W^3$— are independently $>$CH—CH$_2$— or $>$C=CH—.

7. A liquid crystal composition including at least one of compounds according to claim 1.

8. The liquid crystal composition according to claim 7, further including at least one compound selected from the group of compounds represented by formulas (2) to (7):

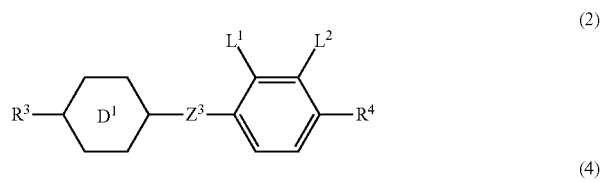
(2)

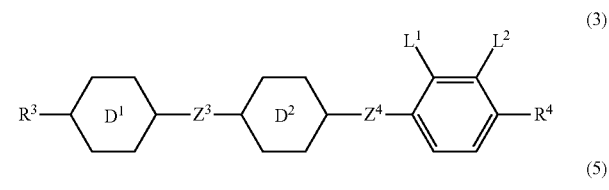
(3)

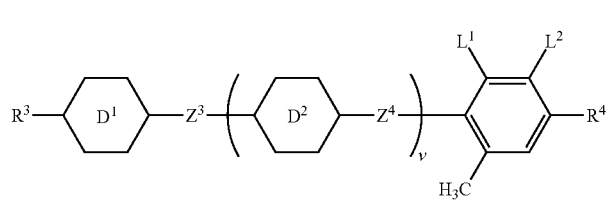
(4)

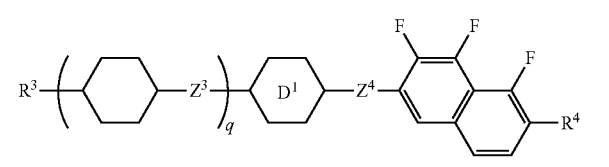
(5)

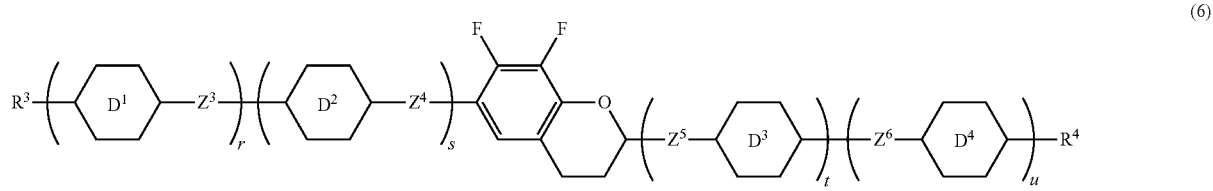
(6)

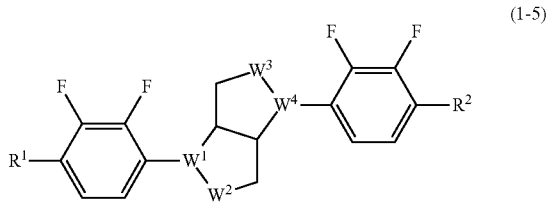
(7)

wherein
$R^3$ and $R^4$ are independently alkyl having 1 to 10 carbons or alkenyl having 2 to 10 carbons, and in the alkyl and the alkenyl, at least one of hydrogen may be replaced by fluorine, and at least one of —CH$_2$— may be replaced by —O—;
ring $D^1$, ring $D^2$, ring $D^3$ and ring $D^4$ are independently 1,4-cyclohexylene, 1,4-cyclohexenylene, 1,4-phenylene in which at least one of hydrogen may be replaced by fluorine, tetrahydropyran-2,5-diyl or decahydronaphthalene-2,6-diyl;
$Z^3$, $Z^4$, $Z^5$ and $Z^6$ are independently a single bond, —(CH$_2$)$_2$—, —OCO—, —CH$_2$O—, —OCF$_2$— or —OCF$_2$(CH$_2$)$_2$—;
$L^1$ and $L^2$ are independently fluorine or chlorine; and
q, r, s, t, u and v are independently 0 or 1, and the sum of r, s, t and u is 1 or 2.

9. The liquid crystal composition according to claim 7, further including at least one compound selected from the group of compounds represented by formulas (8) to (10):

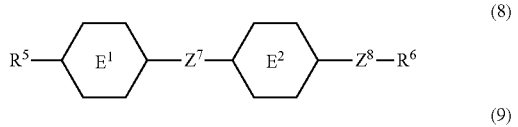 (8)

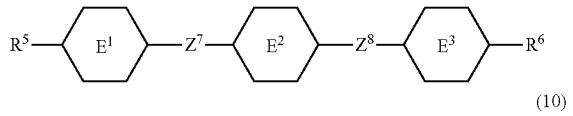 (9)

(10)

wherein
R⁵ and R⁶ are independently alkyl having 1 to 10 carbons or alkenyl having 2 to 10 carbons, and in the alkyl and the alkenyl, at least one of —$CH_2$— may be replaced by —O—;
ring $E^1$, ring $E^2$ and ring $E^3$ are independently 1,4-cyclohexylene, 1,4-phenylene, 2-fluoro-1,4-phenylene, 2,5-difluoro-1,4-phenylene or pyrimidine-2,5-diyl; and
$Z^7$ and $Z^8$ are independently a single bond, —$(CH_2)_2$—, —CH=CH—, —C≡C— or —COO—.

10. The liquid crystal composition according to claim 8, further including at least one compound selected from the group of compounds represented by formulas (8) to (10).

11. The liquid crystal composition according to claim 7, further including at least one optically active compound and/or at least one polymerizable compound.

12. The liquid crystal composition according to claim 7, further including at least one antioxidant and/or at least one ultraviolet light absorber.

13. A liquid crystal display device containing the liquid crystal composition according to claim 7.

* * * * *